(12) United States Patent
Thornton et al.

(10) Patent No.: US 7,650,497 B2
(45) Date of Patent: Jan. 19, 2010

(54) AUTOMATED DIGITAL CERTIFICATE RENEWER

(75) Inventors: Russell S. Thornton, Cedar Hills, UT (US); Benjamin Hodson, Cedar Hills, UT (US); Jayson Seegmiller, Orem, UT (US); Timothy Hollobon, Woodinville, WA (US)

(73) Assignee: Venafi, Inc., Sandy, UT (US)

( * ) Notice: Subject to any disclaimer, the term of this patent is extended or adjusted under 35 U.S.C. 154(b) by 886 days.

(21) Appl. No.: 10/918,665

(22) Filed: Aug. 13, 2004

(65) Prior Publication Data

US 2005/0069136 A1  Mar. 31, 2005

Related U.S. Application Data

(60) Provisional application No. 60/495,864, filed on Aug. 15, 2003, provisional application No. 60/586,429, filed on Jul. 8, 2004.

(51) Int. Cl.
*H04L 9/00* (2006.01)
(52) U.S. Cl. .......................................... 713/158; 726/6
(58) Field of Classification Search ......... 713/155–156, 713/158, 175, 180, 201; 380/30, 277; 715/741; 709/207; 726/5–7
See application file for complete search history.

(56) References Cited

U.S. PATENT DOCUMENTS

| | | | |
|---|---|---|---|
| 5,903,882 A | 5/1999 | Asay et al. |
| 6,044,462 A | 3/2000 | Zubeldia et al. |
| 6,134,658 A | 10/2000 | Multerer et al. |
| 6,185,678 B1 | 2/2001 | Arbaugh et al. |
| 6,269,456 B1 | 7/2001 | Hodges et al. |
| 6,304,974 B1 | 10/2001 | Samar |
| 6,367,013 B1 | 4/2002 | Bisbee et al. |
| 6,438,690 B1 | 8/2002 | Patel et al. |
| 6,615,347 B1 | 9/2003 | de Silva et al. |
| 6,640,301 B1 | 10/2003 | Ng |
| 6,662,217 B1 | 12/2003 | Godfrey et al. |
| 6,853,988 B1 | 2/2005 | Dickinson et al. |
| 7,120,929 B2 | 10/2006 | Beattie et al. |

(Continued)

OTHER PUBLICATIONS

"Protest Under 37 C.F.R. 1.291(a) by James Nickerson dated Aug. 9, 2006".

(Continued)

*Primary Examiner*—Gilberto Barron, Jr.
*Assistant Examiner*—Hadi Armouche
(74) *Attorney, Agent, or Firm*—Everett D. Robinson; Echelon IP, LLC

(57) ABSTRACT

The disclosure relates to the management of PKI digital certificates, including certificate discovery, installation, verification and replacement for endpoints over an insecure network. A database of certificates may be maintained through discovery, replacement and other activities. Certificate discovery identifies certificates and associated information including network locations, methods of access, applications of use and non-use, and may produce logs and reports. Automated requests to certificate authorities for new certificates, renewals or certificate signing requests may precede the installation of issued certificates to servers using installation scripts directed to a particular application or product, which may provide notification or require approval or intervention. An administrator may be notified of expiring certificates, using a database or scanning or server agents. Interaction with certificate authorities may be by an abstractor providing a common interface for issuing signing requests to disparate certificate authorities. Digital certificate management may also be applied to network-connecting client devices.

28 Claims, 59 Drawing Sheets

U.S. PATENT DOCUMENTS

| | | | |
|---|---|---|---|
| 7,209,479 | B2 | 4/2007 | Larson |
| 7,209,563 | B1 | 4/2007 | Calvez et al. |
| 7,275,155 | B1 | 9/2007 | Aull |
| 2001/0011255 | A1 | 8/2001 | Asay et al. |
| 2002/0023037 | A1 | 2/2002 | White, Jr. |
| 2002/0062438 | A1* | 5/2002 | Asay et al. .................. 713/157 |
| 2002/0071563 | A1 | 6/2002 | Kurn et al. |
| 2002/0087479 | A1 | 7/2002 | Malcolm |
| 2002/0147746 | A1* | 10/2002 | Lee ............................ 707/513 |
| 2002/0152382 | A1 | 10/2002 | Xiao |
| 2002/0184493 | A1 | 12/2002 | Rees |
| 2003/0035547 | A1 | 2/2003 | Newton |
| 2003/0037234 | A1* | 2/2003 | Fu et al. ..................... 713/158 |
| 2003/0110374 | A1* | 6/2003 | Yamamoto et al. .......... 713/155 |
| 2003/0126431 | A1 | 7/2003 | Beattie et al. |
| 2003/0126433 | A1* | 7/2003 | Hui ............................ 713/158 |
| 2003/0131233 | A1 | 7/2003 | Garstin et al. |
| 2003/0131244 | A1* | 7/2003 | Buoncristiani et al. ...... 713/176 |
| 2004/0030887 | A1 | 2/2004 | Harrisville-Wolff et al. |
| 2004/0080528 | A1 | 4/2004 | Rand et al. |
| 2005/0005097 | A1 | 1/2005 | Murakawa |

OTHER PUBLICATIONS

Desmond, John, "AutoCert Automates Certificate Renewal", esecurityplanet.com web page on the Internet, Sep. 18, 2003, three (3) pages.

"Client-Side Certificate Protection", AutoCert Security Automation, autocert.com web page on the Internet, May 2003, fourteen (14) pages.

CA.pl man page Jan. 11, 2001, two (2) pages.

"CenterCube", centercube.com web page on the Internet, Jul. 21, 2004, one (1) page.

Desmond, John, "AutoCert Automates Certificate Renewal", enterpriseitplanet.com web page on the Internet, Sep. 19, 2003, three (3) pages.

"Introduction to SSL", developer.netscape.com on the Internet, Oct. 9, 1998, eleven (11) pages.

Openssl man page, Aug. 8, 2001, three (3) pages.

Desmond, John, "AutoCert Automates Certificate Renewal", securesynergy.com on the Internet, Sep. 19. 2003, one (1) page.

Yasin, Rutrell, "Security Watch", fcw.com on the Internet, Sep. 22, 2003, three (3) pages.

Martin, Franck, "SSL Certificates Howto", Oct. 20, 2002, twenty-nine (29) pages.

* cited by examiner autocert management console

AutoCert Status
Certificates in Process ▲ 0
Critial Alerts ▲ 0

HOME | MANAGE CERTIFICATES | MANAGE SERVERS | HELP

Manage Certificates

→Click column headers to sort

Filter By: [CommonName ▼]  [Filter]

| Manage | Certificate ID ↓ | CommonName |
|---|---|---|
| View | Edit | Remove | History | 89214567 | dmztest.imcentric.com |
| View | Edit | Remove | History | 76213456 | iplanet01.imcentric.com |
| View | Edit | Remove | History | 88674322 | iplanet02.imcentric.com |
| View | Edit | Remove | History | 65778291 | f5bigip01.imcentric.com |
| View | Edit | Remove | History | 89221823 | f5bigip03.imcentric.com |
| View | Edit | Remove | History | 99345595 | ecommerce.imcentric.com |
| View | Edit | Remove | History | 20203404 | hr.imcentric.com |
| View | Edit | Remove | History | 51250533 | finance.imcentric.com |
| View | Edit | Remove | History | 89374855 | customer.imcentric.com |
| View | Edit | Remove | History | 92837456 | sonicwall.imcentric.com |

1                                                                                  1

Items Per Page: [10 ▼]

FIG. 16

*autocert management console*

HOME | MANAGE CERTIFICATES | MANAGE SERVERS | HELP

▲ AutoCert Status
Certificates in Process ▲ 0
Critial Alerts ▲ 0

Manage Servers

→Click column headers to sort

ServerID ▼     Search

| Manage | Server ID ↓ | HostName | IPAddress |
|---|---|---|---|
| View \| Edit \| Remove \| History | 12341234 | ecommerce | 11.22.33.44 |
| View \| Edit \| Remove \| History | 18298385 | apache01 | 123.123.123.1 |
| View \| Edit \| Remove \| History | 18282824 | Apache02 | 192.168.0.76 |
| View \| Edit \| Remove \| History | 12838347 | Sonic Wall | 11.22.33.45 |
| View \| Edit \| Remove \| History | 18273464 | iPlanet 01 | 192.168.0.73 |
| View \| Edit \| Remove \| History | 12838347 | Sonic Wall | 11.22.33.47 |
| View \| Edit \| Remove \| History | 18282824 | Apache02 | 192.168.0.72 |
| View \| Edit \| Remove \| History | 12838347 | Sonic Wall | 11.22.33.46 |
| View \| Edit \| Remove \| History | 18282824 | Apache02 | 192.168.0.78 |
| View \| Edit \| Remove \| History | 12838347 | Sonic Wall | 11.22.33.44 |

*autocert management console*

HOME | MANAGE CERTIFICATES | MANAGE SERVERS | HELP

▲ AutoCert Status
Certificates in Process ▲ 0
Critial Alerts ▲ 0

Manage Groups

→Click column headers to sort

[Add Group]

| Manage | Group ID ↓ | GroupName |
|---|---|---|
| View \| Edit \| Remove \| History | 1 | AutoCert Server Admin Group |
| 1 | | |
| 1 | | |

FIG. 18

*autocert management console*

HOME | MANAGE CERTIFICATES | MANAGE SERVERS | HELP

▲ AutoCert Status
Certificates in Process ▲ 0
Critial Alerts ▲ 0

Manage Users

→Click column headers to sort

[ Add User ]

| Manage | Username → | FirstName | LastName | Email |
|---|---|---|---|---|
| View | Edit | Remove | History | ralph.nader | Ralph | Nader | ralph.nader@imcentric.com |
| View | Edit | Remove | History | al.gore | Al | Gore | al.gore@dems.com |
| View | Edit | Remove | History | george.bush | George | Bush | george.bush@reps.com |

*autocert management console*

▲ AutoCert Status
Certificates in Process ▲ 0
Critial Alerts ▲ 0

HOME | MANAGE CERTIFICATES | MANAGE SERVERS | HELP

AutoCert Configuration

▲ Network Settings
▲ Customized Fields
▲ Database Backup Settings
▲ VeriSign Standard Setup
▲ Global VeriSign MPKI Administrator Certificate
▲ Windows 2003 CA Setup
▲ Replication Settings
▲ Network Discovery Settings
▲ Intermediate Root CA Settings
▲ Log Archival Settings Customized Fields AutoCert Server provides the ability to add up to 10 custom fields for each certificate record. These fields will be visible when adding, viewing and editing a certificate record. Checking the 'required?' checkbox will force the field to be required before saving a new certificate record. Checking the 'X509 Field?' checkbox will allow this field to be part of the X.509 certificate when a CSR (Certificate Signing Request) is generated.

| Field Name | Required? | X509 Field? |
|---|---|---|
| 1. | ☐ | ☐ |
| 2. | ☐ | ☐ |
| 3. | ☐ | ☐ |
| 4. | ☐ | ☐ |
| 5. | ☐ | ☐ |
| 6. | ☐ | ☐ |
| 7. | ☐ | ☐ |
| 8. | ☐ | ☐ |
| 9. | ☐ | ☐ |
| 10. | ☐ | ☐ |

[Save Changes]

FIG. 22

*autocert management console*

▲ AutoCert Status
Certificates in Process ▲ 0
Critial Alerts ▲ 0

HOME | MANAGE CERTIFICATES | MANAGE SERVERS | HELP

Database Backup Settings

The following information allows AutoCert Server to backup the database.

No database backup has been made.

Path to network share: \\server\share

Please specify a username and password to access the network share.

Username:
Password:
Confirm Password:

Select the number of days between database backups: 7 ▶

Save Settings

AutoCert Configuration

▲ Network Settings
▲ Customized Fields
▲ Database Backup Settings
▲ VeriSign Standard Setup
▲ Global VeriSign MPKI Administrator Certificate
▲ Windows 2003 CA Setup
▲ Replication Settings
▲ Network Discovery Settings
▲ Intermediate Root CA Settings
▲ Log Archival Settings

FIG. 23

*autocert management console*

▲ AutoCert Status
Certificates in Process ▲ 0
Critial Alerts ▲ 0

HOME | MANAGE CERTIFICATES | MANAGE SERVERS | HELP

Windows 2003 CA Setup

Network Path\ Certificate Authority Name: [          ]

Proxy Server (optional): http:// [          ] : [ 80 ]

Proxy Authentication: [✓]

Current Password: ●●●●●●●●
Confirm Password: [          ]

Notifications

Critical alerts and notifications will be sent to the following email address.

Critical Alert Email: [ email@yourdomain.com ]

AutoCert Configuration

▲ Network Settings
▲ Customized Fields
▲ Database Backup Settings
▲ VeriSign Standard Setup
▲ Global VeriSign MPKI Administrator Certificate
▲ Windows 2003 CA Setup
▲ Replication Settings
▲ Network Discovery Settings
▲ Intermediate Root CA Settings
▲ Log Archival Settings

FIG. 24

*autocert management console*

▲ AutoCert Status
Certificates in Process ▲ 0
Critial Alerts ▲ 0

HOME | MANAGE CERTIFICATES | MANAGE SERVERS | HELP

Replication Settings

The following information allows this AutoCert Server to act as a redundant subscriber. These settings cannot be updated. Use the 'Delete' button to remove a redundancy configuration, or the 'Save' button to create a new configuration.

Make AutoCert Redundant Subscriber: ☐

Replication Machine Name:

Failover Chain Parent Name:

Time in Minutes Before Failover:

[Save]

AutoCert Configuration

▲ Network Settings
▲ Customized Fields
▲ Database Backup Settings
▲ VeriSign Standard Setup
▲ Global VeriSign MPKI Administrator Certificate
▲ Windows 2003 CA Setup
▲ Replication Settings
▲ Network Discovery Settings
▲ Intermediate Root CA Settings
▲ Log Archival Settings

FIG. 27

*autocert management console*

▲ AutoCert Status
Certificates in Process ▲ 0
Critical Alerts ▲ 0

HOME | MANAGE CERTIFICATES | MANAGE SERVERS | HELP

AutoCert Configuration

▲ Network Settings
▲ Customized Fields
▲ Database Backup Settings
▲ VeriSign Standard Setup
▲ Global VeriSign MPKI Administrator Certificate
▲ Windows 2003 CA Setup
▲ Replication Settings
▲ Network Discovery Settings
▲ Intermediate Root CA Settings
▲ Log Archival Settings Log Archival Settings No error log entries have been archived Error log entries older than [14 ▼] days will be archived every [7 ▼] days at
[1 ▼] : [00 ▼] o'clock [AM ▼] to the network share [\\server\share]

Username: [            ]
Password: [            ]
Confirm Password: [            ]

Please specify a username and password to access the network share.

No history entries have been archived

History log entries older than [14 ▼] days will be archived every [7 ▼] days at
[1 ▼] : [00 ▼] o'clock [AM ▼] to the network share [\\server\share]

Username: [            ]
Password: [            ]
Confirm Password: [            ]

Please specify a username and password to access the network share.

[ Save Settings ]

FIG. 28

*autocert management console*

HOME | MANAGE CERTIFICATES | MANAGE SERVERS | HELP

▲ AutoCert Status
Certificates in Process ▲ 0
Critial Alerts ▲ 0

Manage Network Discovered Certificates

1 <u>2</u> 3 4 5 6 7 8 9 10 ...

| Manage | Certificate ID ↓ | CommonName |
|---|---|---|
| <u>Complete</u> \| <u>Remove</u> | 1 | IMC-DEV1.IMC-DEV1 |
| <u>Complete</u> \| <u>Remove</u> | 2 | WAMU1H-1021.IMCentric.com |
| <u>Complete</u> \| <u>Remove</u> | 3 | WAMU1H-1021.IMCentric.com |
| <u>Complete</u> \| <u>Remove</u> | 4 | IMC-DEV1.IMC-DEV1 |
| <u>Complete</u> \| <u>Remove</u> | 5 | bonjobeans.imcentric.com |
| <u>Complete</u> \| <u>Remove</u> | 6 | IMC-DEV1.IMC-DEV1 |
| <u>Complete</u> \| <u>Remove</u> | 7 | WAMU1H-1021.IMCentric.com |
| <u>Complete</u> \| <u>Remove</u> | 8 | bonjobeans.imcentric.com |
| <u>Complete</u> \| <u>Remove</u> | 9 | WAMU1H-1021.IMCentric.com |
| <u>Complete</u> \| <u>Remove</u> | 10 | IMC-DEV1.IMC-DEV1 |

1 2 3 4 5 6 7 8 9 <u>10</u> ...

*autocert management console*

HOME | MANAGE CERTIFICATES | MANAGE SERVERS | HELP

Manage Network Discovered Servers

▲ AutoCert Status

Certificates in Process ▲ 0

Critical Alerts ▲ 0

12

| Manage | Server ID ↓ | IP Address |
|---|---|---|
| Complete | Remove | 817 | 192.168.0.90 |
| Complete | Remove | 818 | 192.168.0.92 |
| Complete | Remove | 819 | 192.168.0.100 |
| Complete | Remove | 820 | 192.168.0.100 |
| Complete | Remove | 821 | 65.205.249.52 |
| Complete | Remove | 822 | 65.205.249.53 |
| Complete | Remove | 823 | 65.205.249.54 |
| Complete | Remove | 824 | 65.205.249.55 |
| Complete | Remove | 825 | 65.205.249.56 |
| Complete | Remove | 826 | 65.205.249.58 |

*autocert management console*

▲ AutoCert Status
Certificates in Process ▲ 0
Critial Alerts ▲ 0

HOME | MANAGE CERTIFICATES | MANAGE SERVERS | HELP

Intermediate Root CA Scan History

1 2 3

| Log ID ↓ | Change Date | Host Name | Status |
|---|---|---|---|
| 52 | 7/15/2004 4:20:14 PM | Apache01 | Successfully updated |
| 53 | 7/15/2004 4:20:14 PM | iPlanet 02 | Successfully updated |
| 55 | 7/15/2004 4:20:14 PM | iPlanet 01 | No update needed |
| 56 | 7/15/2004 4:20:14 PM | ecommerce | Successfully updated |
| 57 | 7/15/2004 4:20:14 PM | finance | No Update needed |
| 58 | 7/15/2004 4:20:14 PM | hr | No Update needed |
| 59 | 7/15/2004 4:20:14 PM | Sonic Wall | Successfully updated |
| 60 | 7/15/2004 4:20:14 PM | Sonic Wall 2 | No Update needed |
| 61 | 7/15/2004 4:20:14 PM | Sonic Wall 3 | No Update needed |
| 62 | 7/15/2004 4:20:14 PM | Apache01 | No Update needed |

*autocert management console*

▲ AutoCert Status
Certificates in Process ▲ 0
Critical Alerts ▲ 0

HOME | MANAGE CERTIFICATES | MANAGE SERVERS | HELP

Error Log

| Error Number ↓ | Error Date | Error Description |
|---|---|---|
| | 1 2 | |
| 1 | 7/15/2004 12:47:04 PM | Failure (1) |
| 1 | 7/15/2004 12:47:04 PM | Failure (1) |
| 1 | 7/15/2004 12:47:05 PM | Failure (1) |
| 1 | 7/15/2004 12:47:05 PM | Failure (1) |
| 1 | 7/15/2004 12:47:06 PM | Failure (1) |
| 1 | 7/15/2004 12:47:06 PM | Failure (1) |
| 1 | 7/15/2004 12:47:06 PM | Failure (1) |
| 1 | 7/15/2004 12:47:06 PM | Failure (1) |
| 1 | 7/15/2004 12:47:07 PM | Failure (1) |
| 1 | 7/15/2004 12:47:07 PM | Failure (1) |
| 1 | 7/15/2004 12:47:07 PM | Failure (1) |
| 1 | 7/15/2004 12:47:08 PM | Failure (1) |
| 1 | 7/15/2004 12:47:08 PM | Failure (1) |
| 1 | 7/15/2004 12:47:08 PM | Failure (1) |
| 1 | 7/15/2004 12:47:09 PM | Failure (1) |

Home | Manage Certificates | Manage Servers | AutoCert Configuration | Help

*autocert management console*

▲ AutoCert Status
Certificates in Process ▲ 0
Critial Alerts ▲ 0

HOME | MANAGE CERTIFICATES | MANAGE SERVERS | HELP

Generate Report

| Report Certificate Status ▼ | Go | Refresh Data | Print View |

Report All Certificates

| CertificateID | ServerID | SecureServerName | CommonName | StatusCodeName | AttemptCount | SerialNumber | ValidFrom | ValidTo | OrganizationName | OrganizationUnit | UserID |
|---|---|---|---|---|---|---|---|---|---|---|---|
| 1 | | | | | | | | | | | |
| 5 | 3 | DMZ-test | dmztest.imcentric.com | Certificate Valid (0) | 0 | | 7/15/2004 12:00:00 AM | 7/15/2005 12:00:00 AM | Non-Renewing | Development | 1 |
| 1 | | | | | | | | | | | |

*autocert management console*

HOME | MANAGE CERTIFICATES | MANAGE SERVERS | HELP

▲ AutoCert Status
Certificates in Process ▲ 0
Critial Alerts ▲ 0

Generate Report

Report All Servers ▼  | Go |   | Refresh Data | Print View |

Report All Servers

| ServerID | Host Name | IP Address | Port | Username | Server Platform | OS | Platform Protocol | Description | Group ID |
|---|---|---|---|---|---|---|---|---|---|
| 1 | Host Name | 11.22.33.44 | 22 | Username | F5 BigIP 4.2 | Proprietary | SSH | | 1 |
| 2 | | 123.123.123.1 | 0 | IIS6.0 | IIS6.0 | Windows 2003 Server | DCOM | IIS 6.0 | 1 |
| 3 | asdf | 192.168.0.72 | 8888 | asdf | Netscape 3.6 | Linux | HTTP | | 1 |
| 4 | Host Name | 11.22.33.44 | 22 | Username | F5 BigIP 4.2 | Proprietary | SSH | | 1 |
| 5 | sunbox | 192.168.0.73 | 8888 | admin | Netscape 3.6 | Solaris 2.6 | HTTP | sunbox | 1 |

FIG. 38

*autocert management console*

HOME | MANAGE CERTIFICATES | MANAGE SERVERS | HELP

▲ AutoCert Status
Certificates in Process ▶ 0
Critical Alerts ▶ 0

View User

Personal Information

User ID: fred.smith

| | | | |
|---|---|---|---|
| First Name:* | Fred | Username:* | fred.smith |
| Last Name:* | Smith | Password:* | ******** |
| Title:* | Level II - Sysadmin | Confirm Password:* | ******** |
| Company:* | IMCentric, Inc. | | |
| Department:* | Information Technology | | |
| Address:* | 123 Pine St. | Work Phone:* ( 801 ) 453 - 1111 | |
| City:* | Provo | State:* Utah ▼ | |
| ZIP:* | 89029 | Country:* United States ▼ | |
| Email:* | fred.smith@imcentric.com | Fax Phone: ( ) - | |

Import User(s) From Active Directory

Directory Import Path: [_____]

Directory Username: [_____]    Find

Directory Password: [_____]

Exit User    Back

* Required Fields

FIG. 39

*autocert management console*

▲ AutoCert Status
Certificates in Process ▲ 0
Critial Alerts ▲ 0

HOME | MANAGE CERTIFICATES | MANAGE SERVERS | HELP

Edit User

Personal Information

User ID: fred.smith

First Name:* [Fred]
Last Name:* [Smith]
Title:* [Level II - Sysadmin]
Company:* [IMCentric, Inc.]
Department:* [Information Technology]

Username:* [fred.smith]
Password:* [********]
Confirm Password:* [********]

Address:* [123 Pine St.]
City:* [Provo]
ZIP:* [89029]
Email:* [fred.smith@imcentric.com]

Work Phone:* ( [801] ) [453] - [1111]
State:* [Utah ▼]
Country:* [United States ▼]
Fax Phone: ( [ ] ) [ ] - [ ]

Import User(s) From Active Directory

Directory Import Path: [ ]
Directory Username: [ ]
Directory Password: [ ]

[Find]

[Exit User]  [Back]

* Required Fields

Home | Manage Certificates | Manage Servers | AutoCert Configuration | Help

FIG. 40

*autocert management console*

▲ AutoCert Status
Certificates in Process ▲ 0
Critical Alerts ▲ 0

HOME | MANAGE CERTIFICATES | MANAGE SERVERS | HELP

View Certificate for Automation

Certificate Properties

Common Name:*  [                    ]           Group:*  [AutoCert Server Admin Group ▶]
Organization Name:*  [Non-renewing ▶]           User:*  [Reagan, Ronald ▶]
Organization Unit:*  [                 ]        Valid From:*  [            ]
City:*  [                                ]       Valid To:*  [            ]
State:*  [-- select a state -- ▶]               Renewing Validity Period:*  [1 Year ▶]
Country:*  [-- select a country -- ▶]           Certificate Strength:*  [1024 ▶]
Renewing Certificate Authority:*  [Non-renewing ▶]   Server:*  [-- select a server -- ▶]  [Add]

Certificate Information

Certificate Text:*  [                                                                                 ]

CSR Text:*  [                                                                                         ]

* Denotes Required Fields

[History]    [Back]

FIG. 41

*autocert management console*

HOME | MANAGE CERTIFICATES | MANAGE SERVERS | HELP

▲ AutoCert Status
Certificates in Process ▲ 0
Critical Alerts ▲ 0

Edit Certificate for Automation

Certificate Properties

Common Name:* [ ]
Organization Name:* [Non-renewing ▶]
Organization Unit:* [ ]
City:* [ ]
State:* [-- select a state -- ▶]
Country:* [-- select a country -- ▶]
Renewing Certificate Authority:* [Non-renewing ▶]

Group:* [AutoCert Server Admin Group ▶]
User:* [Reagan, Ronald ▶]
Valid From:* [ ]
Valid To:* [ ]
Renewing Validity Period:* [1 Year ▶]
Certificate Strength:* [1024 ▶]
Server:* [-- select a server -- ▶] [Add]

[Save Certificate]   [Back]

* Denotes Required Fields

*autocert management console*

▲ AutoCert Status
Certificates in Process ▲ 0
Critial Alerts ▲ 0

HOME | MANAGE CERTIFICATES | MANAGE SERVERS | HELP

Group Information

Group Name:* [ AutoCert Server Admin Group ]

[ Back ]

Group Members

| | UserRole | UserID | FirstName | LastName | Email |
|---|---|---|---|---|---|
| 1 | Full Administrator | 4 | Jimmy | Carter | jimmy.carter@imcentric.com |
| 1 | | | | | |

Add Group Member

[ Add Member ]

FIG. 42 autocert management console

HOME | MANAGE CERTIFICATES | MANAGE SERVERS | HELP

▲ AutoCert Status
Certificates in Process ▲ 0
Critial Alerts ▲ 0

History

Server: asdf (192.168.0.72)

| Log ID ↓ | Change Date | Column Name | Change User | Old Value | New Value |
|---|---|---|---|---|---|
| 1 2 | | | | | |
| 3 | 6/25/2004 11:01:24 AM | HostName | Jimmy Carter | | asdf |
| 3 | 6/25/2004 11:01:24 AM | IPAddress | Jimmy Carter | | 192.168.0.72 |
| 3 | 6/25/2004 11:01:24 AM | Port | Jimmy Carter | | 8888 |
| 3 | 6/25/2004 11:01:24 AM | UserName | Jimmy Carter | | asdf |
| 3 | 6/25/2004 11:01:24 AM | Password | Jimmy Carter | | tdNcDH+H9y8= |
| 3 | 6/25/2004 11:01:24 AM | ServerTypeCode | Jimmy Carter | | 6 |
| 3 | 6/25/2004 11:01:24 AM | Description | Jimmy Carter | | |
| 3 | 6/25/2004 11:01:24 AM | Active | Jimmy Carter | | 1 |
| 3 | 6/25/2004 11:01:24 AM | PasswordConfig | Jimmy Carter | | uBuAxtaQi0s= |
| 3 | 6/25/2004 11:01:24 AM | GroupID | Jimmy Carter | | 1 |
| 1 2 | | | | | |

[Back]

FIG. 43

FIG. 44 autocert management console

▲ AutoCert Status

Certificates in Process ▲ 0

Critical Alerts ▲ 0

HOME | MANAGE CERTIFICATES | MANAGE SERVERS | HELP

History

Certificate: dmzteset.imcentric.com 1 2 3

| Log ID ↓ | Change Date | Column Name | Change User | Old Value | New Value |
|---|---|---|---|---|---|
| 5 | 7/15/2004 4:20:14 PM | CommonName | Jimmy Carter | | dmztest.imcentric.com |
| 5 | 7/15/2004 4:20:14 PM | ChallengePhrase | Jimmy Carter | | |
| 5 | 7/15/2004 4:20:14 PM | CertificateFriendlyName | Jimmy Carter | | |
| 5 | 7/15/2004 4:20:14 PM | CertificateStrength | Jimmy Carter | | 1024 |
| 5 | 7/15/2004 4:20:14 PM | OrganizationName | Jimmy Carter | | Non-Renewing |
| 5 | 7/15/2004 4:20:14 PM | OrganizationUnit | Jimmy Carter | | Development |
| 5 | 7/15/2004 4:20:14 PM | Country | Jimmy Carter | | US |
| 5 | 7/15/2004 4:20:14 PM | State | Jimmy Carter | | Illinois |
| 5 | 7/15/2004 4:20:14 PM | City | Jimmy Carter | | Chicago |
| 5 | 7/15/2004 4:20:14 PM | SerialNumber | Jimmy Carter | | |

1 2 3

[Back]

*autocert management console*

▲ AutoCert Status

Certificates in Process ▲ 0

Critial Alerts ▲ 0

HOME | MANAGE CERTIFICATES | MANAGE SERVERS | HELP

History

Server: sunbox (192.168.0.73)

| Log ID ↓ | Change Date | Column Name | Change User | Old Value | New Value |
|---|---|---|---|---|---|
| 12 | | | | | |
| 5 | 7/15/2004 1:15:14 PM | HostName | Jimmy Carter | | sunbox |
| 5 | 7/15/2004 1:15:14 PM | IPAddress | Jimmy Carter | | 192.168.0.73 |
| 5 | 7/15/2004 1:15:14 PM | Port | Jimmy Carter | | 8888 |
| 5 | 7/15/2004 1:15:14 PM | UserName | Jimmy Carter | | admin |
| 5 | 7/15/2004 1:15:14 PM | Password | Jimmy Carter | | ************ |
| 5 | 7/15/2004 1:15:14 PM | ServerTypeCode | Jimmy Carter | | 6 |
| 5 | 7/15/2004 1:15:14 PM | Description | Jimmy Carter | | sunbox |
| 5 | 7/15/2004 1:15:14 PM | Active | Jimmy Carter | | 1 |
| 5 | 7/15/2004 1:15:14 PM | PasswordConfig | Jimmy Carter | | ************ |
| 5 | 7/15/2004 1:15:14 PM | GroupID | Jimmy Carter | | 1 |
| 12 | | | | | |

[Back]

FIG. 45 autocert management console

HOME | MANAGE CERTIFICATES | MANAGE SERVERS | HELP

▲ AutoCert Status
Certificates in Process ▲ 0
Critial Alerts ▲ 0

Add Certificate for Automation

Certificate Properties

Common Name:*
Organization Name:* [Non-renewing ▶]
Organization Unit:*
City:*
State:* [-- select a state -- ▶]
Country:* [United States (US) ▶]
Renewing Certificate Authority:* [Non-renewing ▶]

Group:* [AutoCert Server Admin Group ▶]
User:* [Reagan, Ronald ▶]
Valid From:* [7/15/2004]
Valid To:* [7/15/2005]
Renewing Validity Period:* [1 Year ▶]
Certificate Strength:* [1024 ▶]
Server:* [-- select a server -- ▶] [Add]

[Save Certificate]  [Back]

* Denotes Required Fields

FIG. 47

| Secure Client Login |

*imcentric*

| Secure Client Login – Building Confidence in Internet Transactions |

Login to your Secure Client profile

Email: [_____]

Passphrase: [_____]

[ Login ]

Privacy policy here

Don't have a Secure Client profile? Get one

FIG 54

Secure Client Profile Management

You can manage your information below according to your comfort level. As you add more information to your Secure Client profile, you Verification Seal Rating increases. There are 3 levels to this rating: Bronze, Silver and Gold.

Your Verification Seal Rating allows you to access more secure features and receive benefits from Secure Client Service Providers. Learn more

🔒 Bronze Profile Information

- Email Address: john_doe@bogusmail.com
  (This is your Secure Client User Name)
- First Name: John
- Middle Name: L.
- Last Name: Doe
- Email Address Verified: yes

[Save Changes]

🔒 Silver Profile Information

- Street Address: 123 West Main Street
- City: Belvedeere
- State: WA
- Zip code: 98073
- Home phone: 801-555-1234
- Work phone: 801-555-4321
- Street Address Verified: yes

[Save Changes]

🔒 Silver Profile Information

- Card Type: 123 West Main Street
- Credit Card Number: 8594-9283-3948
- Full Name: WA
- Expiration: 98073
- Credit Card Verified: yes

[Save Changes]

FIG. 63

AUTOMATED DIGITAL CERTIFICATE RENEWER

CROSS-REFERENCE TO RELATED APPLICATIONS

This application claims the benefit of U.S. Provisional Application No. 60/495,864 filed Aug. 15, 2003 and U.S. Provisional Application No. 60/586,429 filed Jul. 8, 2004, both of which are hereby incorporated by reference in their entirety.

BACKGROUND

The claimed inventions relate generally to management of public key infrastructure server networks, and more particularly to systems that can automate the installation, renewal, detection or management of public key infrastructure digital certificates in a secure network system.

BRIEF SUMMARY

Disclosed herein are several digital certificate discovery and management systems. Detailed information on various example embodiments of the inventions are provided in the Detailed Description below, and the inventions are defined by the appended claims.

BRIEF DESCRIPTION OF THE DRAWINGS

FIG. 16 depicts a representation of a manage certificates screen for an exemplary certificate manager.

FIG. 17 shows a representation of a manage servers screen for an exemplary certificate manager.

FIG. 18 shows a sample screen for managing groups in an exemplary certificate manager.

FIG. 19 shows a representative screen for the management of registered users in the exemplary certificate management system.

FIG. 21 depicts a representative screen containing entries for custom fields for managed certificates in an exemplary certificate manager interface.

FIG. 22 depicts a representative screen by which the certificate database settings may be maintained in an exemplary certificate manager interface.

FIG. 23 shows a representative screen by which default certificate information may be configured in an exemplary certificate manager.

FIG. 24 shows an exemplary screen in which replicator settings may optionally be configured in an exemplary certificate manager.

FIG. 27 depicts a screen whereby the log archival settings may be set in an exemplary certificate manager.

FIG. 28 depicts a representative screen permitting the management of certificates discovered but not yet completed in an exemplary certificate manager.

FIG. 29 depicts a screen for completing or removing discovered server records to or from an exemplary certificate manager database.

FIG. 31 shows a historical report of intermediate root certificate authority scans as generated by an exemplary certificate manager.

FIG. 32 depicts a view of an error log generated by an exemplary certificate manager.

FIG. 35 shows a view reporting all managed certificates in an exemplary certificate manager interface.

FIG. 36 shows a view reporting all managed servers in an exemplary certificate manager interface.

FIG. 38 shows a representative screen for viewing the entries of particular users registered in an exemplary certificate manager.

FIG. 39 shows a representative screen for editing user entries in an exemplary certificate manager.

FIG. 40 shows a representative screen of a view of certificate information for an exemplary certificate manager.

FIG. 41 depicts a screen in which an existing certificate record may be edited for an exemplary certificate manager.

FIG. 42 depicts a screen for editing a group in an exemplary certificate manager.

FIG. 43 shows a report of user actions generated by an exemplary certificate manager.

FIG. 44 shows a report of changes to a certificate database generated by an exemplary certificate manager.

FIG. 45 shows a report of changes to a server database generated by an exemplary certificate manager.

FIG. 47 shows a screen whereby an administrator may enter information about a new certificate for an exemplary certificate manager.

FIGS. 54 and 55 show login screens to an exemplary secure client service.

FIG. 63 shows a screen for entering user information in an exemplary secure client service.

Reference will now be made in detail to systems and methods for discovering and managing digital certificates which may include some more specific embodiments of the claimed inventions, examples of which are illustrated in the accompanying drawings.

DETAILED DESCRIPTION

Public key infrastructure (PKI) has recently become widespread in use, particularly with the availability of public networks that provide access to confidential sources or sinks of information, for example e-commerce over the Internet. PKI is utilized in many network systems to encrypt data transacted between a user on a client device and a server, and also to verify that the client is linked to an authentic server device, particularly when the data transactions pass through an uncontrolled or insecure network portion.

Figure 1:
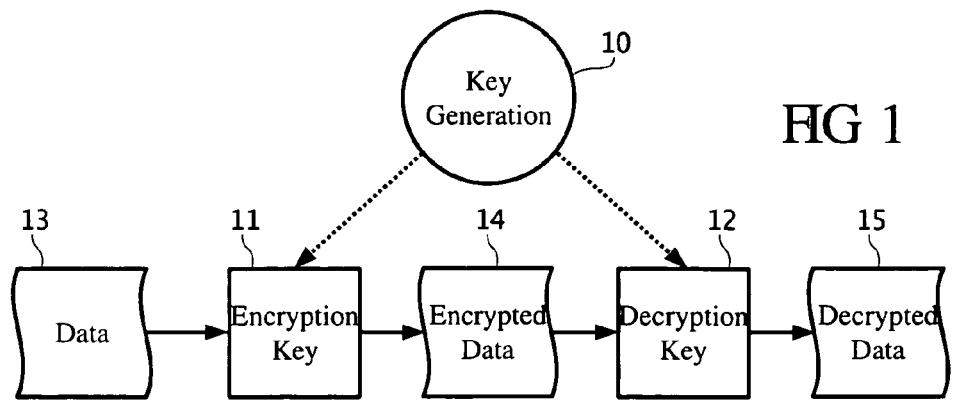
FIG. 1 depicts conceptual elements of asymmetric cryptography.

Data encryption generally is of one of two types, which are symmetric and asymmetric cryptography. Speaking at a basic level, in symmetric cryptography a single key is shared by the encryptor and the decryptor, i.e. the encryption key can be used to decrypt data encrypted with that key. In FIG. 1, the basic concepts of asymmetric cryptography are depicted. A key generation process 10 is used to generate a pair of related keys, which are an encryption key 11 and a decryption key 12. The cryptographic algorithms are selected such that if either one of the encryption key 11 or decryption key 12 is known, the other key is difficult to discover. The selection of appropriate algorithms and keys is well known in the art, and will not be expounded upon further here. Further in FIG. 1, the process of cryptography is shown. Data 13 is to be sent to a receiver in a secure fashion. Encryption key 11 is applied to data 13, producing encrypted data 14, perhaps in a single message or a group of packets. The encrypted data is sent to the receiver through the insecure network, thereby preventing access to the original data 13 by undesirable parties. A receiver applies decryption key 12 to the encrypted data 14, producing the original and decrypted data 15. Because the keys needed to encrypt and decrypt are different, this type of cryptography is called asymmetric.

Figure 2:
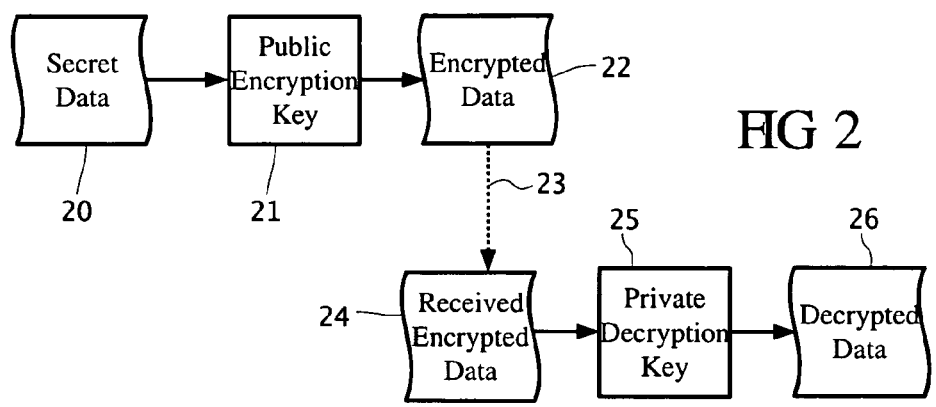
FIG. 2 shows conceptual elements of a process useful to secure data against unauthorized access.

In public key cryptography one of the keys may be made public, which may serve to either to secure data from unauthorized access or digitally sign transmitted data. By digitally signing data, the receiver may verify that the received data comes from a particular sender and that the data has arrived unmodified. Referring now to FIG. 2, concepts of a process useful to secure data against unauthorized access are depicted. In the process of FIG. 2, an asymmetric key pair is generated beforehand, which include encryption key 21 and decryption key 25. Encryption key 21 is made public, i.e. it is provided to others wishing to send encrypted data to a receiving party holding decryption key 25, which is held private by that receiving party. A sending party uses the public key 21 to encrypt secret data 20, producing encrypted data 22. Encrypted data is sent to the receiving party by way of a network link 23, which might be insecure and/or subject to interception. The received encrypted data 24 is then applied to the private decryption key 25, producing decrypted data 26 identical to the original secret data 20. In this process, the security of the data relies on the difficulty of producing the decryption key 25 from the public encryption key 21 and the inaccessibility of private key 25.

Figure 3:
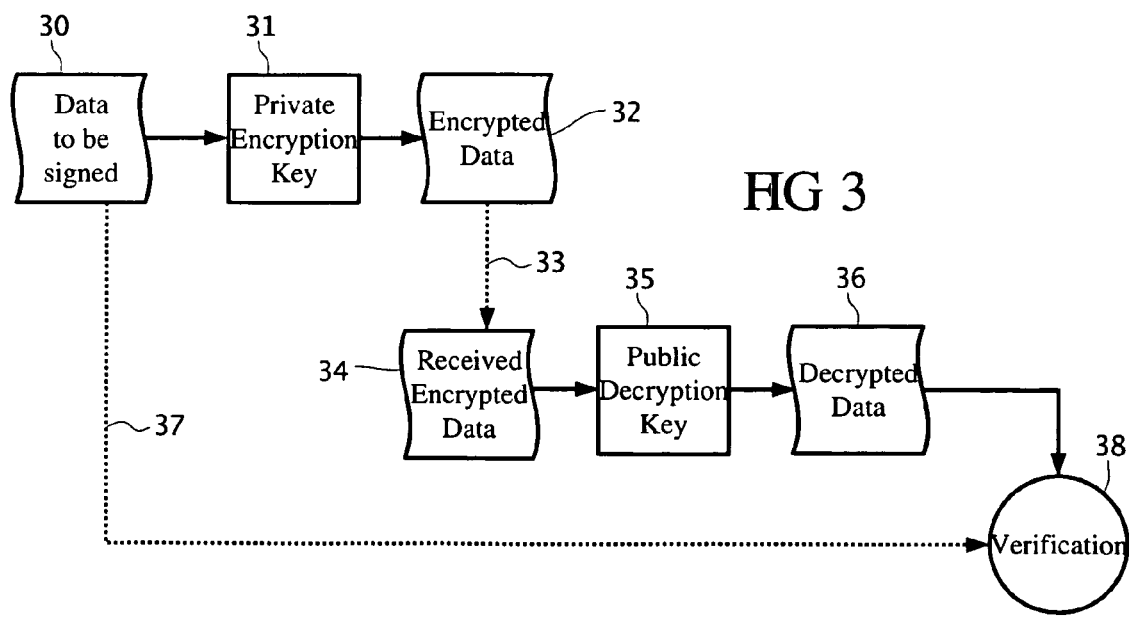
FIG. 3 shows conceptual elements of a process useful to digitally sign data.

Referring now to FIG. 3, concepts of a process useful to digitally sign data are depicted. Data 30 is to be provided to a receiving party over in insecure network link 37, i.e. the sending and/or receiving parties do not control the link sufficiently to prevent a third party sending data to the receiver masquerading as the sending party. Data 30 is first encrypted with a privately held encryption key 31, producing an encrypted form 32 of the original data. The encrypted data 32 is then sent 33 to the receiving party over an untrusted network link, which might be the same or a different link as the one used for transmission 37. The received encrypted data 34 is then decrypted with the public decryption key 35, producing decrypted data 36. The decrypted data may then be compared to the unencrypted data provided through transmission 37, which may be considered to be from the sending party if the two data sets are identical. As in the procedure depicted in FIG. 2, this procedure relies on the difficult of producing the private encryption key from the public decryption key, making unlikely the prospect that the private key could ever be discovered and used by a malicious party. Also in this procedure, public key 35 is transferred through a controlled process that permits the receiving party to know the original source party of that key.

In a variation of the procedure of FIG. 3, an additional step produces a hash value of the data to be signed 30. The hash function may be chosen to produce a substantially unique value for variations of input data, i.e. the hash value will change for any change to the input data, even minute changes. The hash function may also be chosen to be substantially non-reversible, making extremely difficult the task of finding a changed data set that produces the same hash value without exaustively iterating through an extremely large number of possible changed data sets. In that variation, the hash value may be encrypted rather than the original data, and the verification includes the step of comparing the decrypted hash value against a hash value calculated from the received data to be verified. Of course, the sender and receiver must apply the same hash function.

Public key infrastructure (PKI) is the equipment and software required to practice public key cryptography for real-world applications, and may take any number of forms. In one form, PKI may include a sender computer and a receiver computer, with software for encrypting and decrypting messages, such as email messages. Often, PKI provides a facility for the retrieval of a public key from the data sender or the intended recipient, permitting encrypted communication without the need of physical public key transfers. In another PKI form, public keys are provided by way of certificates. A PKI certificate is a data structure that provides a public key to others. PKI certificates may be made available by way of network servers to others with access to that network, thus providing an efficient way of distributing public keys.

In a commonly used PKI, certificates also include a signature to verify the source of the certificate. Again, PKI keys are provided in pairs, one being held private and the other distributed publicly. The recipient of a public key may communicate with the holder of the corresponding public key in a secure fashion, but if the recipient obtained the public key over a network he may not know what the source of that public key is. It is therefore possible, in that circumstance, for a third party to trick or "spoof" the recipient party into holding communications with him, if he can provide a substitute certificate to the recipient party and if the third party's communications are sufficiently authentic to complete the deception. In a related technique of interception, a third party may form an encrypted communications link with a destination server, provide a substitute certificate to a recipient, and masquerade as the destination server by passing data between the recipient party and the destination server. The third party may then view all traffic between the recipient and the destination server unencrypted. This technique is often referred to as a "man in the middle attack", and can be a serious problem for many entities, such as banks or on-line stores, wishing to correspond with customers, employees and others over public and/or uncontrolled networks.

To solve this problem a number of Certificate Authorities (CAs), for example Verisign™ and Entrust™, have created services for authenticating certificates. These entities hold themselves out as entities of trust, providing certificate signing services for certificate verification. The operation of a CA is generally as follows. First, a CA produces a set of asymmetric key pairs, and therefrom a set of root certificates. The private keys are secretly held by the CA, while the root certificates containing public keys are provided to others through controlled distribution. These root certificates are made widely available to the public, for example in the distribution of web browsers, operating systems or other software. Next, a CA receives unsigned certificates in Certificate Signing Requests (CSRs), which contain sufficient information to produce a signed certificate and optionally to verify the source of the individual CSRS. For individual CSRs, the CA may attempt to validate the CSR as coming from a known party, for example through the use of a password or other confidential information from the customer. Signed certificates are produced by choosing a root certificate, signing the certificate with the private key of the chosen root certificate, including identification of the root certificate with the signed certificate and returning the signed certificate to the requesting party.

A standard certificate specification, referred to as X509 has been established to provide a common readable certificate format for publicly accessible utilities. This format will be recognized by those of ordinary skill in the art, and will be only briefly commented herein. The X509 format provides an example of a usable certificate format, noteworthy format items being a version number (the version of the X509 standard being used), a public key, a signature value, a denotation of the signature algorithm used, a period of validity, and an issuer identification among other format items. Although this format has seen recent widespread use, especially in https and secure shell technologies, other formats may be used with equally good results.

A client receiving a certificate from a server may verify a signed certificate by doing the following. First the client may review the certificate to see what certificate was used for signing (i.e. a parent certificate). If the parent certificate is recorded at the client's location, it may locate it and extract the public key. If the parent certificate is not known to the client, the client may request the parent certificate from an accessible server. Upon receipt of the parent certificate, the client may extract the public key. Having the public key, the client may then verify the signing of the child certificate. If the parent certificate was obtained remotely, the client may continue by verifying the signing of the parent certificate. That procedure may continue through a chain of certificates until reaching a known certificate, or reaching an unsigned or unavailable certificate. Should the process end without reaching a known certificate, the client may consider the child certificate (and other certificates in the chain) to be untrustworthy, and may provide a warning to a user.

Figure 4A:
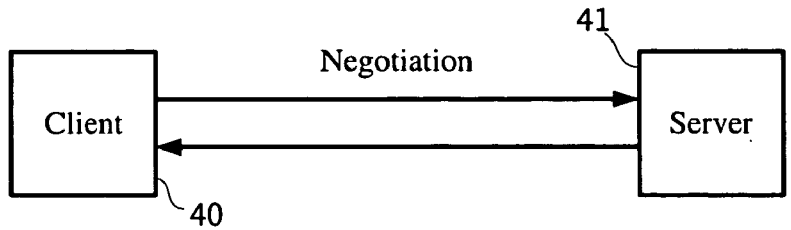
FIGS. 4A, 4B, 4C and 4D depict a method of establishing secure communications between a client and a server over a network.
Figure 4B:
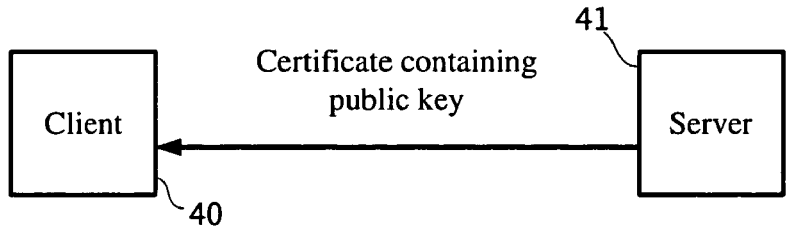
Figure 4C:
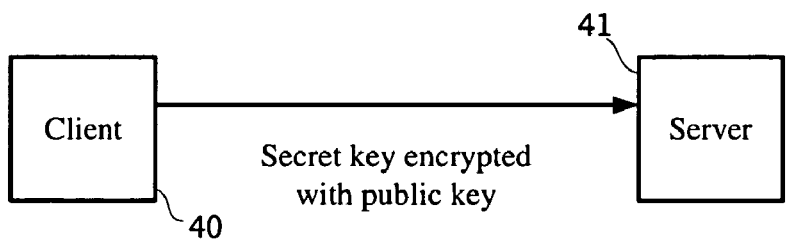
Figure 4D:
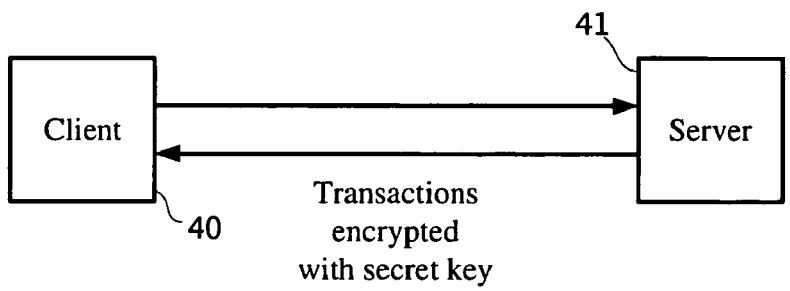

Referring now to FIGS. 4A through 4D, a method of establishing secure communications between a client and a server over a network is depicted. In FIG. 4A, a negotiation takes place between the client and the server. This involves client 40 sending a request to server 41 to initiate negotiation. If multiple communication modes are available, i.e. if more than one cryptographic algorithm is available for use, one of client 40 or server 41 will chose a mode. Following negotiation, sever 41 transmits a certificate to client 40 containing a public key, as shown in FIG. 4B. The client may verify the server's certificate, if desired. In response, client 40 chooses a secret key to be shared with server 41. The choosing of secret key may be performed so as to avoid use of keys previously used, and may also be chosen to avoid predictability, for example by choosing a key from a random number generator. Client 40, using the server's public key, then encodes the secret key in a message subsequently sent to server 40, as in FIG. 4C. Secure communication may then be conducted using a symmetric encryption technique using the shared secret key between client 40 and server 41, as in FIG. 4D.

Certificate Life Cycle

A certificate is normally used for a limited amount of time for a number of reasons. Certificates are priced according to the length of the validity period. This pricing is not merely for profit making, as there is an expense associated with maintaining the certificate authority infrastructure, i.e. maintaining servers that can validate issued certificates. A service provider may therefore not wish to purchase a certificate lasting a lengthy period of time, particularly if the certificate is to be used in a test or uncertain venture. Additionally, the longer a certificate is in existence and/or service, the more likely the private key will be discovered. An attack on a PKI key pair is thought to best be performed by an exhaustive search for a private key that decrypts intercepted encrypted data. Test searches are known to have been successfully conducted using supercomputer clusters in a period of months against keys of typical size. A longer period of use means that, first, an attacker will have more time to perform the search and, second, an attacker may have more intercepted data to validate the resulting possible private keys that are found. Additionally, certificate validity periods may be especially important when considering insiders, administrators and other internal employees having access to SSL servers may have additional opportunity to compromise private keys through their administrative access.

Having a limited service life of certificates requires intervention and/or certificate renewal upon the expiration of the validity of those certificates. Recent experience with PKI enterprises has shown that certificates are too often not properly renewed before expiring. Should a certificate expire unnoticed, the associated service may become unavailable. Should the PKI continue to operate, users are likely to experience warning messages, which may cause those users to avoid using the service. The service may further be subjected to an increased probability of a compromise, with devastating consequences. Should a certificate renewal failure occur for a large enterprise, for example a large Internet seller or lender, significant revenues may be lost.

The causes of certificate renewal failure are many in number, a few of which are noted here. An entity may fail to note the expiration of a certificate. The certificate authority may send a reminder by postal or e-mail, with some chance of mis-delivery. For example, the certificate authority may have a postal or e-mail address that has changed due to the entity moving or changing its domain name. If the entity is located overseas, there is also an increased opportunity for the notification to suffer delay. If the entity maintains a manual certificate database, there is a chance for an erroneous or missing entry. Furthermore, a notification may be missed by an administrator, which individual may be busy, on vacation, incompetent or terminated. For larger organizations, there may be several administrators multiplying that problem. Additionally, the process of renewing certificates has been a manual process, and subject to typos and other technical errors.

Service entities have operated for months and years ignorant of the dangers of expiring certificates. When the problem is discovered, it may be too late to recover without downtime of the enterprise. Should an entity face such a crisis, there are presently no tools for surveying the certificates in service. The administrators may then find themselves visiting every server of the enterprise, creating a compilation of the certificates installed and the relevant expiration dates. As certificates are renewed, the administrators may update the compilation to get a handle on the schedule of certificate renewals. Again, this is a manual process and subject to human errors, which process puts an entity at risk of downtime and loss of income or services to clients or customers. For very large enterprises having thousands of certificates, the certificate renewal workload may require the attention of several administrators, which increases the expense of the operation.

Disclosed below are a number of systems and methods useful in environments of certificate management. Some of the disclosed systems serve a single function related to certificates. Others combine several of those functions into more comprehensive systems. Of the many potential combinations most, if not all, are useful, and therefore combinations may be chosen for particular circumstances of certificate management.

Individual disclosures herein may take the form of computer systems performing functions by software, software executable by a computing system, or a group of functions performable by a computing or software system to achieve various functions, or other forms. The reader should recognize that wherever disclosure is made of one of these types below, the others will also be made apparent.

Certificate Inventorying Systems

Certain of the systems disclosed herein relate to discovering and inventorying certificates installed to a set of network servers. In a first exemplary system, a database is maintained containing records relating to inventoried certificates. Each record identifies a certificate and a server to which the certificate resides or is installed. For each certificate, an expiration date or time may also be noted, by which the expiring of certificates may be noticed. Likewise, an expiration period may also be noted. Notation may also be made in certificate records for an issuing certificate authority. Other items of data relating to certificates may also be tracked, for example the common name, organization, an identification of a responsible individual, the strength of the encryption keys, etc. Expired certificates may also be tracked in a database, if desired.

Such a certificate database may be maintained using common file formats, for example CSV or dBase formats without becoming unwieldy, as the number of certificates tracked in a typical organization will be relatively small. A certificate database might also be maintained in a relational database server, which may provide additional search, remote access, encryption and other helpful database functions. Access to a certificate database may be controlled. In the exemplary system access to the database is provided only to authenticated persons and/or applications. A certificate database may take many other forms as desired, the details of which are not particularly important.

Entries and modifications to the certificate database may be performed manually, or applications may be provided for managing certificate entries in the database through the use of graphical user interfaces, web interfaces, or many other techniques. Entries may also be made by a certificate scanner, which will be described shortly. A database of related servers, i.e. servers on which certificates reside or servers within a defined network, may also be kept. Such a server database may be kept separately from a certificate database, or may be integrated in the same database, file or data structures.

A certificate database may be maintained to provide information regarding the state of certificates in a network at given times. This may be used, in one example, by an administrator to identify certificates due to expire, or certificates that have expired. In another use, certificates may be related to servers to identify unused or duplicate certificates. In yet another use, a survey may be conducted using the database to identify certificate authorities being used, a schedule of certificate renewals, encryption strengths, certificates on a particular domain, or other reviews useful to manage a secure network system.

A certificate inventorying system may additionally include a certificate discovery tool for locating certificates in a chosen network. The discovery tool may receive as input a network address range, which in one example includes an IP address and subnet mask for an IP protocol network. In another example, a list of IP address ranges are given. For other network types, a network name, SSID name or other identifier may be used in accordance with the network's addressing standards.

Figure 12:
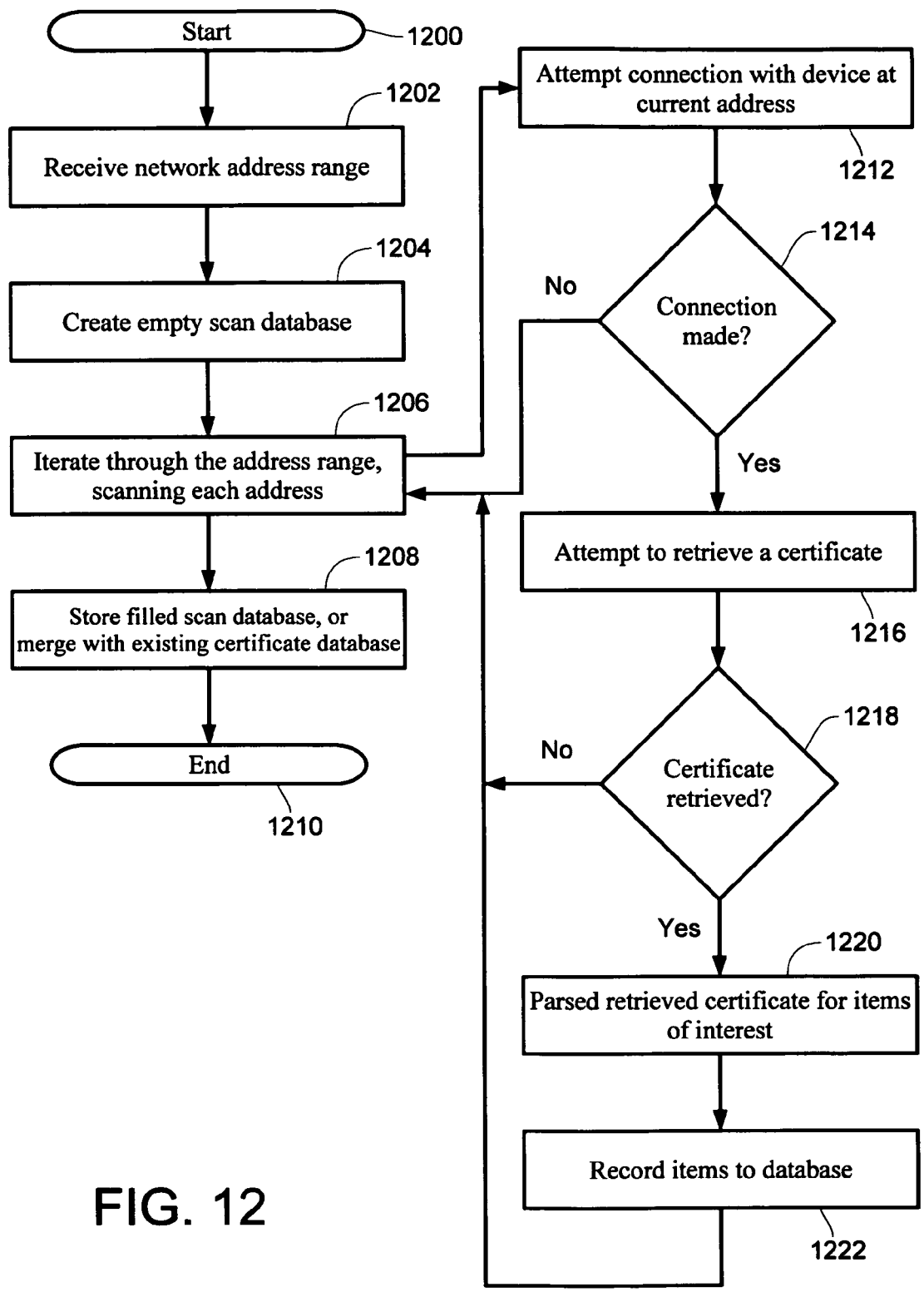
FIG. 12 illustrates a procedure for discovering network certificates.

Referring now to FIG. 12, a procedure for discovering network certificates is described. First, in step 1202, a network address range is input and received by the discovering system. In this example, an empty database is created in step 1204 for holding the resulting certificate information. The procedure iterates through the address range in step 1206, which includes a process illustrated in further detail in steps 1212 through 1222. Alternatively, in some network protocols a search function is available which may report devices registered on the network. In that case, the procedure may iterate over the registered devices. In step 1208, once the address range has been scanned, the resulting database may be stored, or alternatively it may be merged with an existing database, particularly if the results of a prior scan are available. Alternatively, an existing certificate database might be directly modified, adding newly discovered certificates and optionally removing certificates no longer in existence.

At each address iterated through, steps 1212 through 1222 are executed in a subroutine. First, an attempt to connect with the device at the currently iterated device is made over the network, as in step 1212. If the attempt is unsuccessful, the subroutine may exit, as in step 1214. Should a successful connection be made, an attempt to retrieve a certificate will be made, as in step 1216. If a certificate is not available, decision 1218 causes an exit of the subroutine, as there is no certificate information to record. Otherwise, the subroutine parses a received certificate for items of interest, as in step 1220. The items of interest may be any information related to the received certificate, but might be a certificate identifier, an expiration date, in one example. The parsed information may then be recorded to an entry in the scan database, as in step 1222, optionally with other related information such as the current network address, server type, or other information.

The procedure shown in FIG. 12 shows a single attempt to connect with a network device. This attempt might be, for example, an attempt to establish an SSL handshake over IP port 443, which is the port commonly used for the HTTPS secure connection service. Through the course of the handshake, the SSL certificate is provided to the connector, which is one way it may be retrieved. Other ports or methods may be used to attempt the connection and retrieval of certificates. In an alternate method, an attempt may be made to mount a device's filesystem (or a portion thereof) through an NFS or SMB connection. Following establishment of a connection, a search may be conducted through the exported file system to locate probable certificates, which can be verified by attempting a parsing of the suspected file. The location a certificate is found provides clues as to what application is using it, if any. A similar and further alternate method attempts to establish a secure shell or telnet connection using a set of commonly used usernames and passwords. In yet another alternate method, an attempt may be made to access an administrator interface provided by a web server or other application providing access to certificates. Other methods of obtaining certificates may be available, depending on the devices attached to the network, which may be incorporated to provide improved scanning coverage.

A discovery system may provide for log production of the discovery process. The log might show any of items such as: addresses scanned, ports scanned, failed and/or successful connection attempts, addresses with no response, certificate identifiers and other certificate information, server software types and version numbers, modifications to an existing certificate database, and many other items as desired. A discovery system may additionally combine the results of scans conducted at different times, which may be useful to catch servers which may have been inoperative at a particular time. Although the procedure of FIG. 12 attempts only a single connection, the procedure may be modified to perform two or more connection/retrieval techniques. In that case, the log may additionally reflect the techniques used as well as technique-specific information.

The result of a discovery process may be a database providing an audit of certificate conditions on a network, which may be utilized by administrators in certificate maintenance activities. A discovery process may be conducted manually, by software, by a network appliance, or any other object of execution as desired. In one example, a discovery process is conducted by a software application installed to a host computer on a network. In that example, the software may be provided on a disk or other medium, and may be packaged with other software and instructional items as a stand-alone software product. In another example, the discovery process may be conducted by a dedicated network appliance, which may provide a user interface through the HTTP or HTTPS protocols, or by other user interface type. In that example, the database may reside on the appliance, or may be created or deposited to another computing device, which might be an RDBMS or NAS device. A database or log might also be sent in an e-mail message, or might be sent to a printing device for a hardcopy by the appliance. In a further example, described below, the appliance includes other functions related to certificate management, including software for renewing and installing certificates. Many other variations are possible and may be fashioned in accordance with the desires and preferences of the implementer.

A certificate discovery system may detect certificates that are not used, and may report those unused certificates to an administrator. Discovered certificates may also be archived, avoiding the need to provisioning of new certificates should a server crash or otherwise become inoperable. If private keys are also discovered, those can also be archived if desired. Other systems as disclosed below may also report unused certificates or archive certificates as desired, managed or otherwise.

Certificate Installation/Renewal Systems

Other systems may be fashioned to assist with the installation and renewal of PKI certificates. Those systems may assist with the issuance of a certificate and may perform steps to install certificates to appropriate server destinations and other PKI devices.

Figure 8:
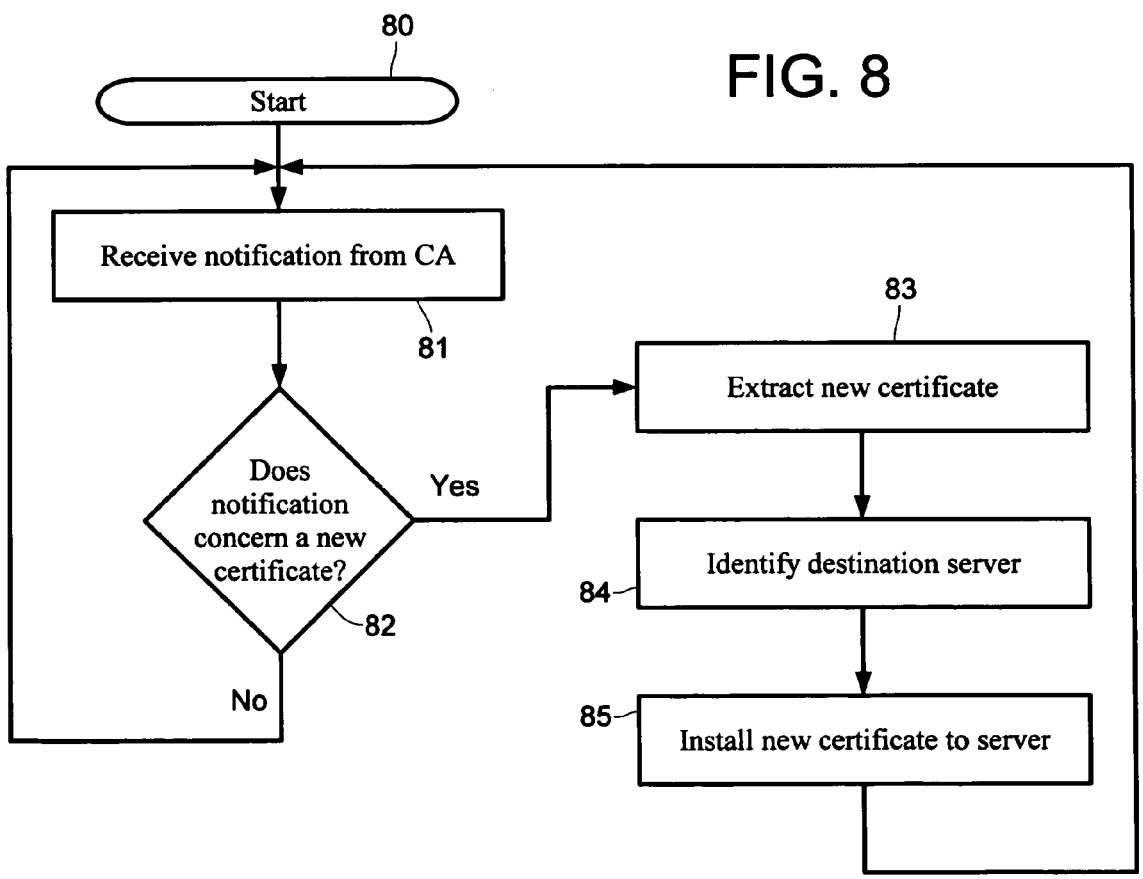
FIG. 8 shows a simplified method of automatically receiving and installing signed certificates from certificate authorities.

Referring now to FIG. 8, a simplified method of automatically receiving and installing signed certificates from certificate authorities is depicted. First, an automated system receives a notification from a certificate authority, as in step 81. This may take place by email, as described below, through polling on a web interface, or other notification facilities. Alternatively, an alarm or timeout may initiate the process rather than a notification, which may be set prior to or about the time of expiration, or alternately may be set to according to a predefined period after certificate issuance. Optionally, other events may trigger the notification of a certificate due to be renewed, for example according to risk profiles or reports from other systems, such as an intrusion detection system, that a server has been compromised. Upon reception of a notification, the system tests whether the notification concerns a new certificate, as in step 82. If a new certificate is referred to or included in the notification message, the certificate is extracted in step 83 from wherever it is located. It may not be apparent which server is to be the target of the new certificate installation, and therefore a destination server is identified in step 84. The certificate may then be installed to the destination server, as in step 85. The process may repeat with the reception of additional notifications and may be executed as frequently as needed.

The installation of newly issued certificates may proceed as follows. First, it may be necessary to request and receive a certificate from a certificate authority, if it is not desired to use an internally-generated certificate. A common method of certificate receipt is by e-mail received at the same computer from which a certificate signing request was submitted. For a signed certificate received from a certificate authority, it may be necessary to determine a destination server for the certificate upon receipt. For example, if the certificate is a renewed certificate for a certificate about to expire, it may be desirable to install the certificate to the server storing the expiring certificate. Alternatively, a certificate may under some circumstances be held prior to installation. In one situation, it may be desirable to request renewed certificates well in advance of the expiration of old certificates. The old certificate is, in that situation, allowed to age before installing the renewal certificate. In another situation, a collection of servers may serve the same network address, through network address translation or other techniques. A collection of renewal certificates may, in that situation, be maintained in a store until needed, at which time the oldest renewal certificate may be installed to servers having certificates about to expire.

Regardless of the situation, a fresh or renewal certificate is associated to a destination network server at the time it is signed. A destination network server is therefore identified as corresponding to the received signed certificate. After a server is identified the server type is determined, in order to choose the proper method of installation. For example, if the server is serving web pages over the HTTPS protocol, there are a number of possible web server products that might be installed. For example, the Apache web server might dictate that certificates be installed through a file placement to a specified directory, a modification of particular configuration files (especially for non-renewed certificates), and restarting of the web server daemons. In another example, an iPlanet web server might provide a web administrator interface. In that circumstance the text of the certificate might be cut and pasted from an email into a text entry field, following which the web administrator installs the certificate text in the correct location. It may also be necessary to restart the PKI application and/or computer to flush the old certificates out of memory. Installation scripts might be written to support a number of PM platforms, for example iPlanet™, Apache™, IIS™, Netscape™, and Websphere™ in a multiplicity of versions.

In many if not most installation procedures, an authentication step will be required to access the certificate store on the destination device. This may involve offering an administrator username and password, a passphrase, a certificate or other authorization object. An authorization object may be stored within or accessible to the installation system prior to the installation activities.

The installation system has access to installation instructions which constitute a set of installation steps for installing certificates to particular server types. These installation instructions may take many forms, the content of which will depend on the type of interface used to perform the installation steps.

In a first example, the installation instructions define a set of shell commands. An exemplary set of shell commands for installing a certificate to an apache server might be: (1) log onto the destination server using an SSH connection and using a pre-stored username and password, (2) use the "cd" command to change the current directory to the certificate directory store, i.e. "cd /etc/ssl/apache", (3) remove the old certificate, i.e. "rm -f ./server.crt", (4) install the new certificate, i.e. "echo MIIDBTCCA . . . > server.crt", (5) install the new private key, i.e. "echo MIICXQ . . . > server.key", (6) restart the web server, i.e. "apachectl restart", and (7) terminate the SSH connection. Now, the directories given above may vary between operating system distributions and even between installations if an administrator has changed the directory configuration from the default. If it is desired to support an expanded range of server configurations, it may be desirable to examine the server configuration files. In the above example, which assumes a default Apache™ 2.0.47 server installed to a Linux™ Mandrake™ 9.1 operating system, the location of the ssl certificate and key can be found using the commands "grep SSLCertiflcateFile /etc/httpdl-conf.d/41_mod_ssl.default-vhost.conf" and "grep SSLCertiflcateKeyFile /etc/httpd/conf.d/41_mod_ssl.default-vhost.conf", assuming that root access is available. Similar installation instructions may be fashioned through a study of other server products to be supported.

A second installation instructional example utilizes file transfer protocols to deposit the certificate and key to a destination server. This example includes the steps of (1) using the scp protocol to transfer the certificate to the server, i.e. "scp -B server.crt /etc/ssl/server.crt", (2) use the scp protocol to transfer the private key to the server, i.e. "scp -B server.key /etc/ssl/server.crt", and (3) notify the administrator that the server needs to be restarted, for example by an e-mail message. Other file transfer protocols can be used, such as FTP or NFS, however it should be kept in mind that using insecure protocols over public networks may compromise the security of the destination server.

A third example utilizes a web interface provided with the server application. A web interface is sometimes provided with a web server or other server application, by which control of the operation of the server may be commanded through a web browser. The web interface, if enabled, is accessible typically at a default relative URL, which might be at a special IP port, directory, CGI or other executable web script or program. In this example, the instructions are configured for a program that acts as a web browser, sending input back to the server's web interface as if the input came from a person operating a browser. This exemplary set of instructions includes (1) a command to go to the login URL of the web interface, (2) submit a form to the web interface containing an administrator username and password, (3) receiving the resulting web page, (4) a command to go to the certificate entry URL of the web interface, (5) submitting a second form to the web interface containing the new certificate and key, (6) confirming the submission of a new certificate and key in a third form, (7) a command to go to the web interface page including a "restart server" button, and (8) sending a fourth form containing a selection of the "restart server" button.

The third example might be implemented in any number of ways. For example, a PERL script to perform the steps might be written utilizing an http protocol library. In another example, a web scripting language is utilized to provide a shortenend and simplified interaction script. Likewise, any number of scripting or programming languages may be used to provide controlled interaction with a server's web interface.

In a fourth example, an agent may be pre-installed to the destination server. In that example the agent monitors some communication channel for instructions to install certificates and keys. That communication channel might take several forms, such as a TCP/IP connection, an SMTP receiver, an RPC interface, or the agent might periodically review a configuration file located on the destination server or at another location. Likewise XML web service interfaces, web interfaces, and other secure and non-secure layers or custom protocols might also be used. That agent would include support for the server type such that incoming certificates are properly deposited in the correct location. Such an agent may also include authentication measures to prevent unauthorized agent activity. The agent may optionally also cause a restart of the server application or a reboot of the server itself.

A certificate installation system might utilize one or several methods of certificate installation. Such a system might incorporate a table selecting an installation method and/or script to execute depending on the server type, i.e. the server's operating system and server applications installed thereon.

In a fifth related installation, information is first retrieved to effect contacting and install the certificate to the destination web server, accelerator or other device, that information including at least some of the platform type, the operating system, a default protocol such as telnet, SSH, HTTP, HTTPS, etc., the certificate text, the destination server's IP address or hostname, a user name and password to log onto the destination, a password for the certificate store, the certificate common name, and a port number to initiate contact with the destination. Next, the certificate text is formatted to be in X.506 base 64 encoded format. The destination is then connected to using the port number, IP address and protocol specified. For certain server applications such as the Apache web server, an IBM web server, an IPlanet server or accelerator, the OpenSSL service is started. Next, the command "find /-name ssl.conf", or a similar command, is executed to locate the SSL configuration file. The command "find /-name httpd.conf", or a similar command, is also executed to locate the server configuration file. Next the certificate and key name are extracted from the configuration file using "grep \SSLCertificateFile I" or a similar command. A new configuration file is then generated either including or referencing the new certificate, and written to the destination server. If needed, the "make" command may be executed to roll out the updated certificate information to all server files. The connection is then terminated and the server restarted.

Now in the above examples, a new private key is installed for every new certificate. The use of several keys over a period of time tends to increase the difficulty of discovering the keys, or at least may prevent an attacker from discovering a key while it is in use. The use of new keys is not strictly required, however, and an installation procedure may install a new signed certificate containing an old public key, if desired.

Also in the above examples, no provision is made to reconfigure a server application to support PKI operation. Any of the above examples may be expanded to configure PKI supporting applications, for example by modifying files or accessing a web interface. By reconfiguring a server automatically, a laborious process of configuring servers for SSL or HTTPS support may be avoided.

Provision may also be provided in the certificate installation system for approvals. Upon receipt of a certificate signed by a certificate authority an administrator may be notified, for example by email. The received certificate may be held pending approval by the administrator. The installation system may provide an approval interface, for example accessible by a web browser, by which an administrator may authenticate himself to the system and select certificates approved to be installed. The interface may additionally provide for bulk approvals, i.e. presentation and approval of a group of certificates in a single approval step. The interface may additionally present certificates sorted in order of expiration date or priority, providing for ease of administrator selection. Optionally, certificates may also be presented in order of risk according to certificate risk profiles. Following approval, the certificates may be installed to the appropriate servers, for example using automated processes as suggested above.

An installation and renewal system may also include provisions for monitoring expiring certificates. In such a system, certificates may be enrolled in a certificate watch program. On a periodic basis, for example daily, weekly or monthly, a certificate database is reviewed for certificates expiring within a future period. Finding certificates in need of renewal, a notification may be sent to an administrator, which for example might be by e-mail or by a display upon login at an administrator interface. The administrator may then select certificates to be renewed, upon which a process of certificate renewal may be initiated as described below. Alternatively, the renewal system may be configured to initiate certificate renewal without approval, to prevent late certificate renewal should an administrator be unavailable to approve. If more than one administrator is configured, the renewal system may contact other administrators if first administrators do not timely respond to requests for approval.

In an alternate mode, a renewal system may scan the servers of a network periodically, as in the discovery processes discussed above, to detect certificates due to expire within a future period. In that system certificates might not be enrolled, but rather servers might be enrolled in a server watch list. In another alternate mode, agents are installed to the servers being monitored. Each agent periodically reviews the certificates for expiration, and may notify an administrator or a central system of any certificates about to expire, for example by email.

A manual certificate renewal process is typically initiated at the server to which the certificate will be installed. The process begins first by the generation of a public/private key pair. Now the key pair might be generated externally to the server, but that method introduces some risk of compromise in that the private key could be discovered in the process of moving it to the server. Following the generation of the key pair, a certificate signing request (CSR) is generated, which is basically a partially completed certificate in that it contains the public key and server identification, but is not otherwise associated to a certificate authority or a root certificate. Having a certificate signing request, it may either be sent to a certificate authority or it may be signed in-house. If a certificate is to be used externally, it should either be signed by a certificate authority or by using an intermediate root certificate itself signed by a certificate authority. Certificates to be used for internal use only may be signed by an internally generated root certificate, because those certificates maintained by an organization may be considered to be trusted. The signing process generates and attaches a signature to the certificate, which signature is generally an encrypted hash value generated from an unsigned certificate generated from the CSR information and from other information, such as the location of the root certificate and the validity period, which is encoded by the private key corresponding to a public key of a root certificate. The signed certificate is then ready for installation to the server.

The following method may be useful to generate a certificate signing request remotely using shell commands through an SSH, Telnet or other shell connection. First, the information needed as input to generate the certificate signing request is provided, including at least some of the protocol to be used, an email address, an IP address, the locality of the certificate including the country, state and city, the organization name, a certificate store password, and a port number to initiate a connection with the remote platform. Next, the remote shell is opened to the remote platform, utilizing known usernames and passwords or other authentication means. A command is then executed to set the remote platform to configure mode, followed by a command to enter an SSL configuration utility. The certificate store is then remotely opened and the default SSL certificate selected. Next, the current private key is removed from the certificate store. A new private key, for example a 1024 bit DES key, is generated and placed in the certificate store. A new PEM file or PKCS file is then created using the newly created private key. A further command is then sent to exit the SSL configuration utility. The "gencsr key" command is then used to create a new certificate signing request file with the city, state, country, organization name/unit, common name and email address provided in the earlier input or obtained from default set values. The output of the CSR text between the string identifiers "----BEGIN CERTIFICATE REQUEST----" and "----END CERTIFICATE REQUEST----" may then be captured and optionally placed in a database for storage until needed. Housekeeping activities and disconnection may follow the capture of the certificate signing request.

Figure 9:
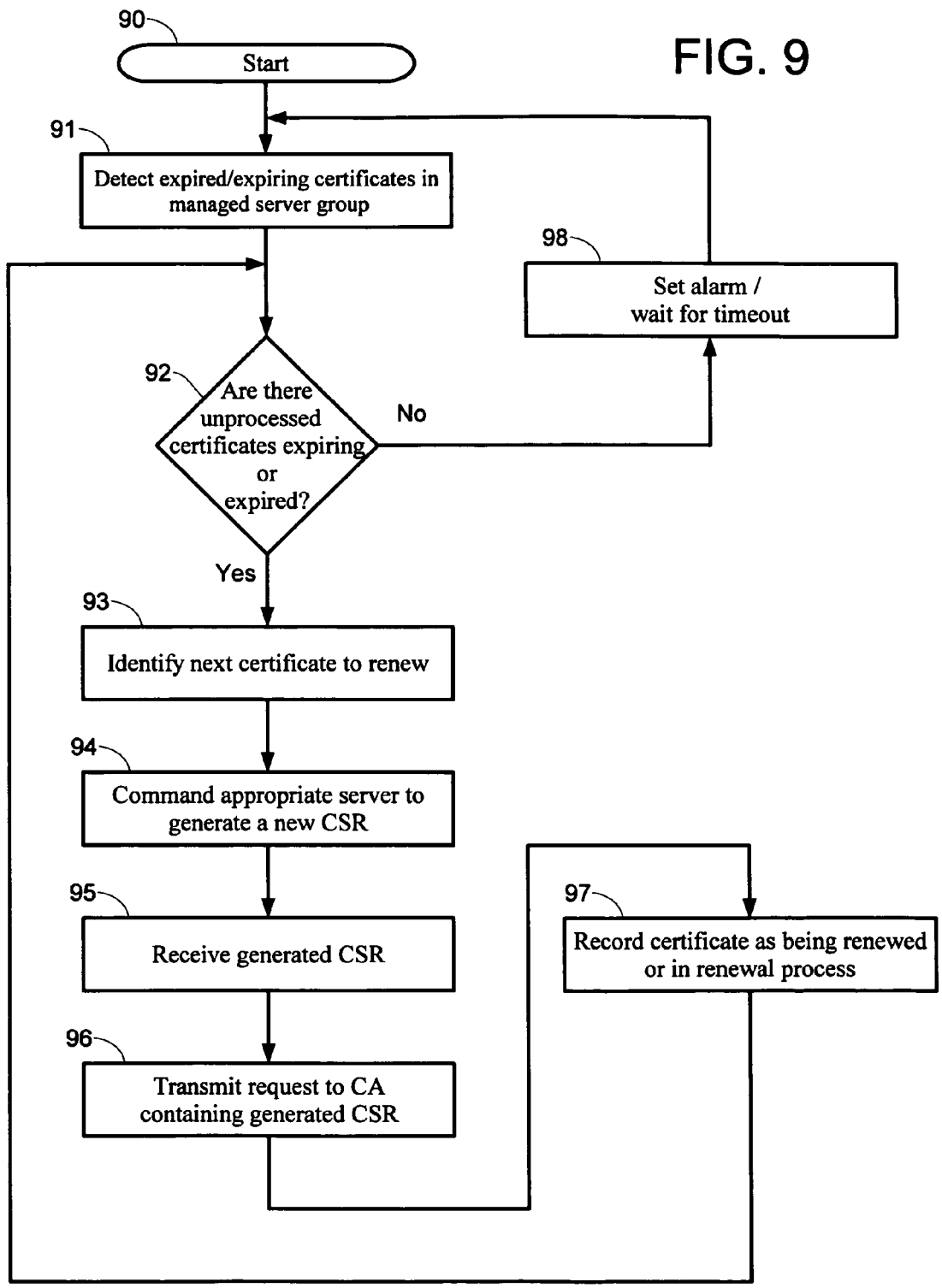
FIG. 9 depicts a simplified certificate renewal process.

A simplified certificate renewal process is depicted in FIG. 9, which may be operated by a certificate renewing system. First, in step 91, a search is made to detect expiring and/or expired certificates in a managed server group. Following detection of expiring/expired certificates, a loop is started in step 92, which ends when there are no more expiring/expired certificates that remain unprocessed. For each detected expiring/expired certificate steps 93 through 97 are performed. In step 94, the appropriate server (the server holding the expiring/expired certificate) is commanded to generate a new CSR and optionally a new key pair, as described above. The renewal system receives the generated CSR, as in step 95, and sends the CSR to a selected certificate authority 96 for signing. Optional step 97 may be performed to maintain a record of what certificates have been processed for renewal. Upon exit of the loop starting at step 92, an alarm is set in step 98 to pause the execution for a period of time to avoid unnecessary processing. A certificate installation process may be conducted apart from this method and system in any way desired.

The public/private key pair may be generated off the destination server, particularly if the server does not include software to generate the key pair (many operating systems include a well-known product called openssl). If that is done, it may be desirable to ensure the network between the generating computer and the destination is secure to avoid private key discovery.

The submitting a certificate signing request to a certificate authority is typically performed through a network connection over the Internet. The certificate authority (CA) presents an interface, for example in a web browser, in which an administrator may enter the CSR and other information related to the request, such as the requesting enfity's identification, account number or a challenge phrase. If desired, the CA may permit the use of default values, in which case it may be possible to initiate a request by submitting only a CSR and identification of the requester. Upon receiving the CSR, the CA may take steps to verify the identity of the requester so as to avoid others from impersonating a proper requester and receiving valid and/or trusted certificates. After a period of time, usually at least several hours but typically not more than a few days, the CA issues the signed certificate. The issuing typically takes the form of sending the issued certificate to the administrator in an e-mail message, although other transference methods might be used equally well.

In other communications with certificate authorities, specialized protocols may be used. One exemplary protocol called the XML Key Management Specification (XKMS), the specification of and description of which is available from the World Wide Web Consortium, may be used as a starting point for a certificate signing request transmission protocol. Web interfaces suitable for human access may also be used through http automation tools. Screen scraping, data manipulation, key stroke automation, mouse click simulation and other forms of automation can be used to interact with such a web interface. Direct socket communication might also be used.

A certificate renewal system may include facilities for automating certificate signing, as will be presently described. As with certificate installation, certificate signing requests may be subject to approval. As expiring certificates are identified, they may be presented to an administrator for renewal. If it is desired to continue use of particular certificates or servers, an administrator may select those for certificate renewal. Approved certificates may be reviewed and parsed for informational items to be recycled, for example the server identity and the owning entity identity. A new certificate signing request is generated, either locally or remotely, for example at the server to receive the certificate. If a CSR is generated locally, the generation uses the identity of the destination server. If desired, the CSR may then be sent to a CSR for signing. Alternatively, if a root or intermediate root certificate is to be used and is available locally, the renewal system may sign and issue the certificate.

If a CSR is submitted to a CA, a period of time will elapse before issuance of the corresponding signed certificate. It may therefore be desirable to suspend the renewal process until the certificate arrives. For interacting with CAs that issue certificates by email, the system may monitor the incoming email messages. If desired, the system may include a specialized SMTP module to receive emails, in the event that an SMTP client isn't provided by the hosting operating system. Alternatively, an email filter may be applied to an existing SMTP system to route messages from CAs to a renewal program. Regardless, the renewal system reviews the incoming email messages for issued certificates, and extracts them from the emails as needed. Alternatively, a CA may issue certificate by download. In that event, the renewal system may periodically access the CA's website. Of course, if a certificate is issued locally, for example if a management system is configured to act as a CA, it is immediately available for installation. Once a certificate is received or otherwise available, it may be held pending approval or immediately installed as in the examples above.

The CA may have policy regarding the issuance of certificates, for example declaring how an issued certificate may be used. A certificate renewal system may be fashioned to be not only compatible with the protocol requirements of CAs, but also with any policy requirements set forth.

In an exemplary certificate renewal method, challenge phrases used in the submission of CSRs to CAs are stored in the renewal system privately, and may also be encrypted if further security is desired. If a CA requires the submission of an administrator certificate or other object to accompany the submission of a CSR, those objects may be stored at the renewal system and made accessible for transmission to the CA in accordance with existing protocol. Internal CAs may also be used, i.e. certificate authorities controlled internally by a certificate using entity, for example if public validation of certificates with trusted CAs is not required.

CSRs may also include custom fields, such as accounting codes, group identifiers, usage notations, and other information associated with a particular issuing certificate. In one example, custom fields are included providing accounting codes that may be used to track operational expenses. In another example, usage notations are included in CSRs to provide, encoded in the issuing certificates, instructions where to install the certificates. Many other uses of custom fields may be used as desired, and may be facilitated by a renewal system.

A renewal system may also include access control for users and groups of users. The system may maintain a record of users authorized to view, change, renew and otherwise manage certificates. Authentication may be made through the use of passwords, certificates or other identifying objects. Certificates may be assigned to be managed by a single user or several users. Likewise, user groups may be configured to permit individuals within the user group to manage certificates.

Throughout the renewal and/or installation progress a log may be maintained by the system. The log may track activity at any level of detail desired, which might be in one example programmable. Entries might include logins, logouts, certificates approved for renewal, certificates approved for installation, which certificate authority was used to renew particular certificates, which server a certificate was installed to, which version of automation scripts were used and many other possible events.

If it is desired to use intermediate root certificates to sign end certificates, before creating a CSR an examination of available intermediate root certificates may be performed to ensure the period of validity of the end certificate is within the period of validity of a selected intermediate root certificate. Should an intermediate root certificate expire before the desired end certificate period of validity, or the root certificate become valid after the start of the period of validity of the end certificate, an administrator may be notified of a problem. The administrator may choose to renew the intermediate root certificate, obtain a new intermediate root certificate with an appropriate validity period, defer the renewal of an end certificate, or choose to have a certificate to be renewed signed by a publicly available root certificate.

Likewise, an installation or renewal system may also handle the installation and renewal of intermediate root certificates. In that system, it may be desirable to provide backup for intermediate root certificates and private keys from which those certificates have been generated, so as to prevent the loss of private keys necessitating the obtaining of new intermediate root certificates for issuing new end certificates. A database may also be maintained including information about the relationship of intermediate root certificates and end certificates issued from those root certificates. Other information may be stored in such a database, such as the attributes of intermediate root certificates, which devices contain those certificates, what certificate authorities issued those certificates, a history of end certificates issued from intermediate root certificates, and other related information.

Certificate Request Systems Supporting Multiple Certificate Authorities

A certificate renewal system or a certificate signing requesting system may make use of a certificate authority abstractor, which permits certificate related interaction with two or more certificate authorities using a common schema of operation. A number of certificate authorities presently make their services available, however each presents a different interface and procedures to administrators who wish to submit certificate signing requests. Thus an administrator may be required to learn the various web pages and/or software interfaces, functions, administrations, reporting and delivery systems of several certificate authorities.

Figure 11:
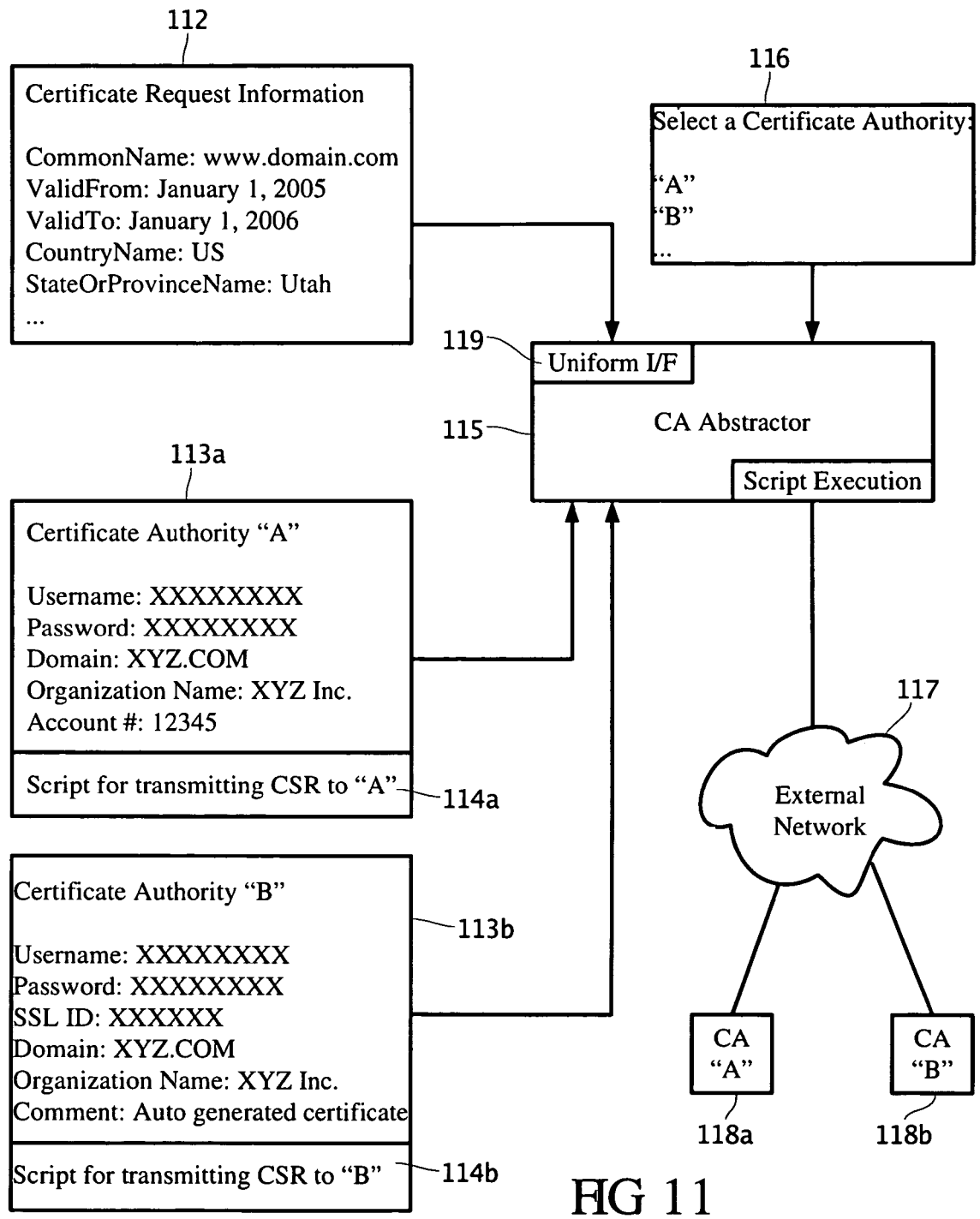
FIG. 11 shows conceptual elements of a certificate authority abstractor.

The conceptual elements of a certificate authority abstractor are depicted in FIG. 11, which will now be disclosed. A certificate authority abstractor 115 receives a number of input items. First of all, a set of scripts 114a and 114b are accessibly provided to abstractor 115, those scripts containing programs or instructions sufficient to submit CSRs to a particular certificate authority. Those scripts may operate through web interfaces, specialized protocols such as XKMS, or other communications protocols according to the requirements of the certificate authority for which the script is to interact. Additionally certificate authority records, 113a and 113b, may be maintained to provide default values for the scripts. For example, certificate authority A may always request the organization name and account number in the course of submitting a CSR, which may be conveniently set in a record specially prepared for that certificate authority. Information sufficient to identify the requesting entity to all supported certificate authorities may also be stored, in this example in certificate authority records 113a and 113b as an organization name, domain name and account number.

CA abstractor 115 also presents a uniform interface 119 for receiving information pertaining to the submission of an individual certificate signing request 112. Interface 119 provides a uniform set of entries for at least the informational items required in a certificate signing request generally. These entries may provide for such items as a common certificate name, a period of validity, a locality identification, a public key, user defined fields or other fields in many combinations.

In a first exemplary abstractor, the certificate request information contains only a certificate signing request generated externally, for example at the server destined to receive a signed certificate. In a second exemplary abstractor, the certificate request information contains information sufficient to complete a certificate signing request by the CA abstractor using a transferred public key. Many other data transference schemas can be implemented as desired with attention to the details of any larger certificate automation system.

Abstractor 115 further receives a selection of a certificate authority 116, which may occur one time through a default setting, or a CA choice may be presented each time a certificate request information record 112 is submitted. The selection of certificate authority determines which script will be executed and which certificate authority record will be executed. In some circumstances and as shown, the abstractor will interact with one of certificate authorities 118a or 118b by way of an external network 117, which may be the Internet. Alternatively, if a locally maintained certificate authority is available, external network 117 may be replaced with an internal network or other communicative objects. Once certificate authority records are received, certificate request records may be submitted to the abstractor, whereby the all required items by the selected certificate authority may be provided. The interaction by the script 114 may then communicate a request that in its totality constitutes a certificate signing request associated with the requesting entity.

In an alternative abstractor the abstractor acts as a proxy application to the true certificate authorities. An administrator or system, for example a certificate renewal system, may interact with the abstractor as if it were a true certificate authority, passing the same informational types using similar interfaces, as desired. Additionally, although interaction with two certificate authorities is shown, the concepts disclosed above may be extended to support operation with any number of certificate authorities.

A certificate installation or renewal system may also perform a verification operation to verify that a newly requested certificate has been installed correctly and is available for use. In an exemplary method, the system may act as a client for the particular service for which the certificate is being used. For example, if a new certificate is for a web server supporting HTTPS, the installation/renewal system may attempt a secure HTTPS connection with the destination server. The verification may include checking for use of the new certificate and general operation of the secure use. Notifications may be sent to an administrator on success or failure, which may be after a timeout period if verification does not immediately follow certificate installation. In an exemplary system, alerts may be sent to more than one administrator, the system contacting further administrators if administrators previously notified haven't resolved a problem. That system may also submit periodic messages, such as what certificates are due for renewal in the near future, for example a period of 14 days.

Presently, it is difficult for enterprises to switch between certificate authorities, as the certificates under use may be expiring at different times and the enterprise may wish to continue to use existing certificate services paid for through the end of that term. In a manual system, as certificates expire an administrator is required to track certificates individually, renewing each certificate with the new authority. This activity can be relatively expensive and is susceptible to error.

In a certificate renewal system, a default certificate authority may be selected. That selected CA may then be used to renew certificates, by transferring information from the old certificates into CSRs to the new selected CA. If desired, a renewal system might also be commanded to replace all or a part of a set of managed certificates, swapping out certificates one or more several undesirable certificate authorities with a selected certificate authority. In an exemplary renewal system a "migrate" function is provided permitting automatic transfer of certificates managed by unsupported certificate authorities to a default certificate authority for which certificate requests are supported.

Systems for Managing Certificates in an Enterprise

Figure 10:
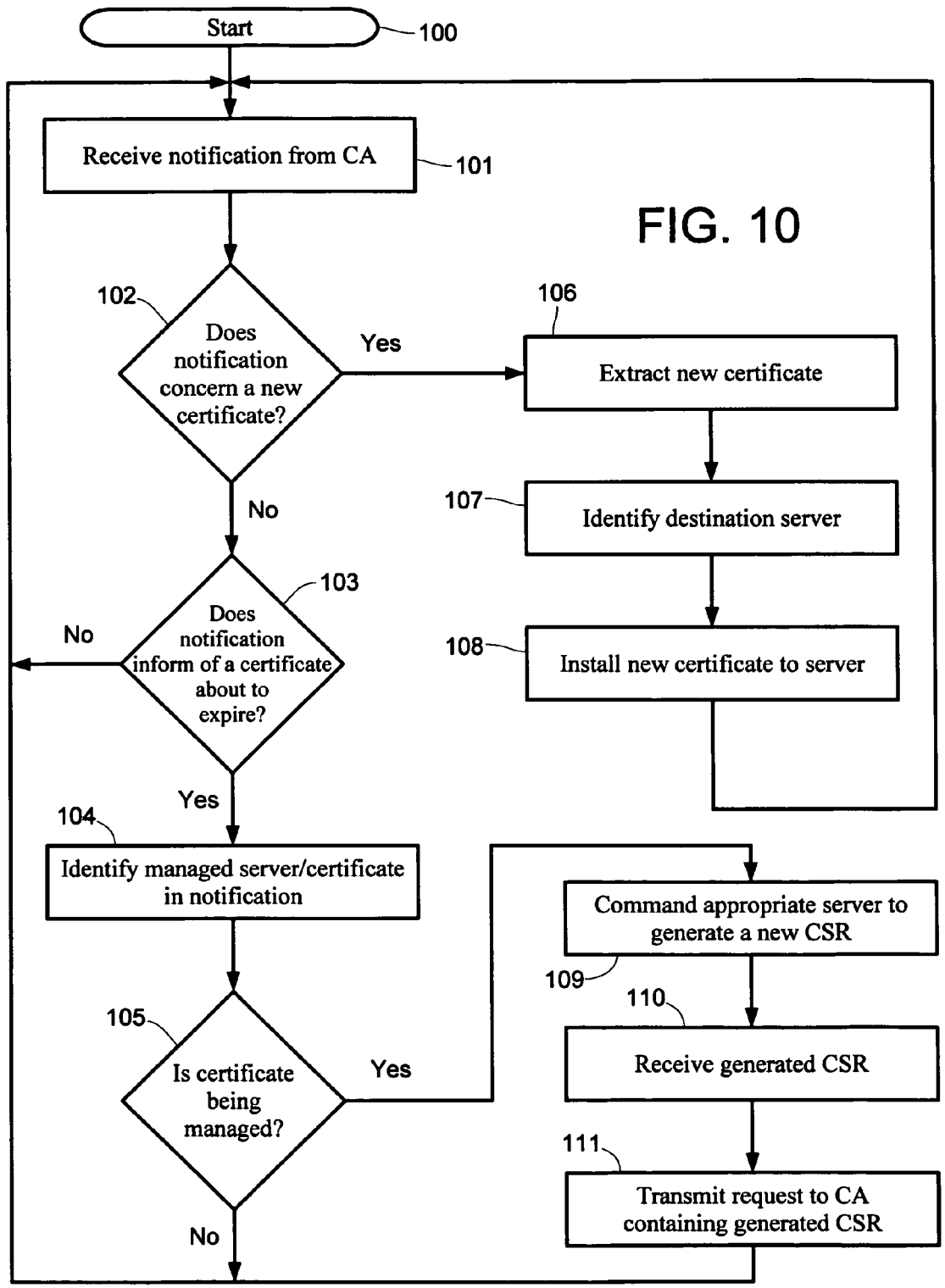
FIG. 10 shows an automated simplified method of monitoring and renewing certificates.

A more complete system for managing certificates in an enterprise will include facilities not only for monitoring certificates, but also for requesting renewed certificates and installing those certificates to the enterprise. Another simplified method depicted in FIG. 10 suggests the operation of that system type. In that system, notifications are sent from certificate authorities, which are received by the system in step 101. For each notification, a determination is made as to whether the notice concerns a newly issued certificate, as in step 102. If the notice concerns or includes a newly issued certificate, a process similar to that described for FIG. 8 is performed in steps 106-108 to extract the certificate and install it to an identified destination server. Another determination may be made in step 103 as to whether the certificate authority is warning of an expiring certificate. If it is, an attempt to identify an enrolled server and/or certificate corresponding to the notice is made in step 104. If the corresponding certificate/server is enrolled, steps 109-111 are performed as in the method described for FIG. 9, by which a new certificate signing request is generated and sent to the appropriate certificate authority.

Figure 5:
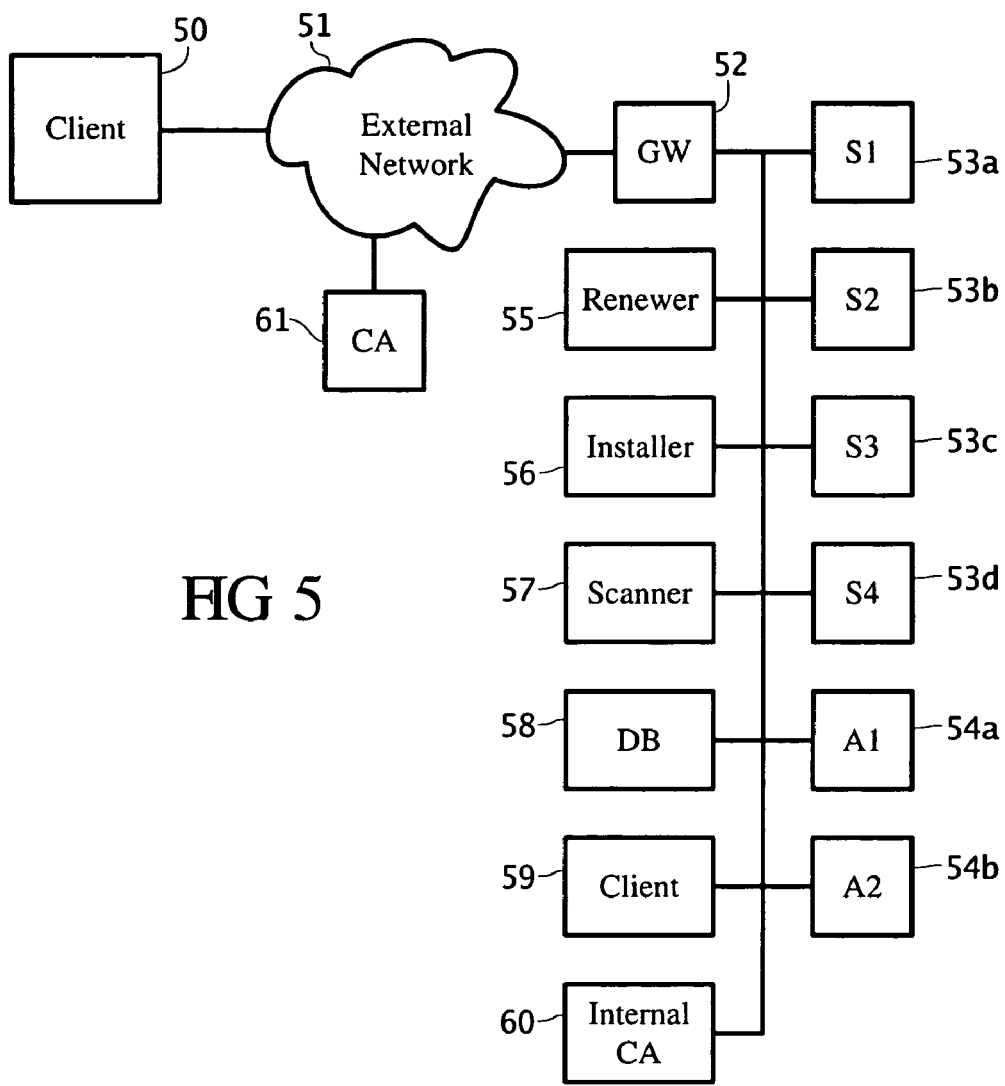
FIG. 5 depicts components of a certificate management system providing certificate management functions.

FIG. 5 depicts components of a certificate management system providing functions as described above for a single enterprise entity. The enterprise includes a number of servers 53a, 53b, 53c and 53d for providing services. Some of servers 53a-d may provide services to clients 50 over an external network 51 by way of a gateway or router 52. Others of servers 53a-d may provide services to clients 59 local to the enterprise entity. In the exemplary enterprise two accelerators 54a and 54b are provided to assist in encrypted communications with clients 50 or 59. At least one certificate authority (CA) is accessed to provide new and renewed certificates, which in this example are an internal CA 60 and an external CA 61. Internal CA 60 is managed by the enterprise entity and may be used to provide self-signed certificates, which may be useful for internal secure communications. Internal CA 60 may also include an intermediate root certificate upon which individual server certificates may be signed and issued, the intermediate certificate being made available for verification to parties encountering the issued certificates, for example over the external network 51. An external CA 61 may also be utilized to issue digital certificates for secure communications between client 50 and servers 53a-d.

A scanner 57 may be provided to scan the network for certificates to be managed, which in this case would scan any or all of servers 53a-d, accelerators 54a and 54b, and internal CA 60 if provided. Upon finding servers and certificates installed thereon, scanner 57 may provide resulting information to a database 58 containing information identifying certificates, expiration dates, and issuing CAs for the certificates. An installer 56 may also be provided to automate the installation of new certificates on servers 53a-d or accelerators 54a and 54b. Installer 56 may further automate the installation of intermediate root certificates to internal CA 60, if desired. A renewer 55 may be provided to monitor the expiration of certificates of which information is stored in database 58 and may provide functions related to the renewal of expiring certificates. One function is to notify an administrator of an expiring certificate. Another function is to initiate the renewal of a certificate through the automated generation of a certificate signing request, optionally after administrative approval. Another renewal function is the delivery and/or installation of renewed certificates to servers. The system of FIG. 5 may be expanded to include other functions related to certificate management, for example reporting services and provisions for access through an electronic interface.

Figure 6:
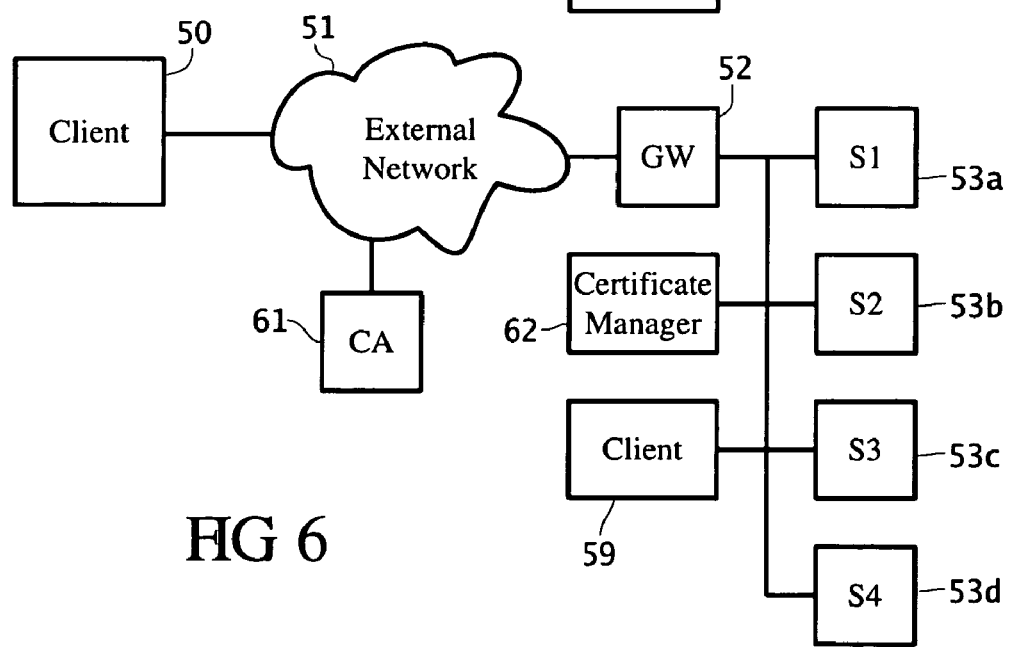
FIG. 6 shows components of an integrated certificate management system.

Referring now to FIG. 6, a similar system to that shown in FIG. 5 is depicted, including a client 50, an external network 51, a gateway device 52, servers 53a-d, an internal client 59, and an external certificate authority 61. In the system of FIG. 6, the functions of renewer 55, installer 56, scanner 57, database server 58, and optionally internal CA 60 are combined in a single computing system called a certificate manager 62. In this example, the certificate manager 62 may be "dropped in" to the enterprise system as a single piece of hardware connected to the enterprise's internal network, providing rapid certificate management in the enterprise without unduly consuming space or computing resources.

Figure 7:
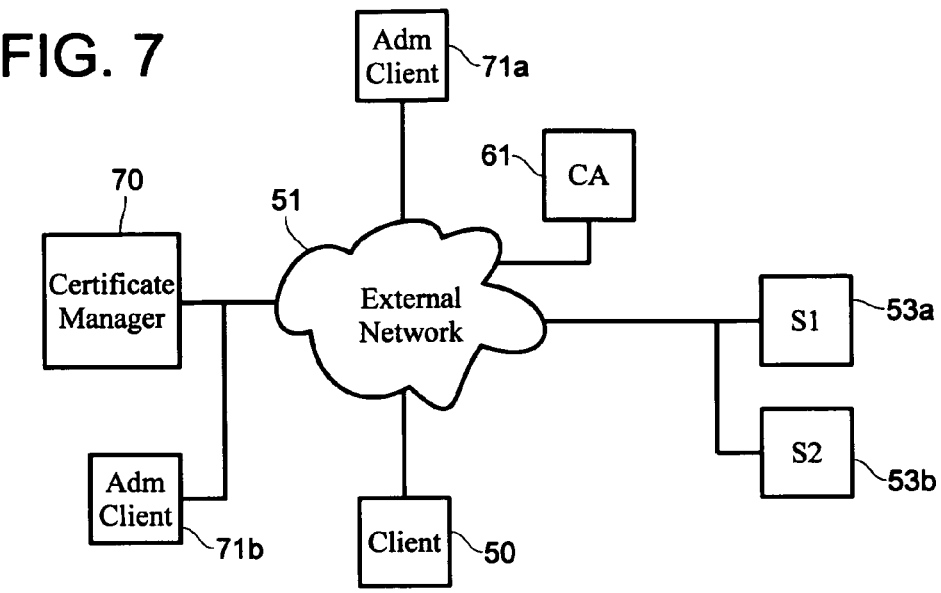
FIG. 7 depicts a certificate management system whereby certificate management is conducted from an external network location from an enterprise.

In FIG. 7 a system is depicted whereby certificate management is conducted from an external network location from an enterprise. In this example the enterprise includes servers 53a and 53b, either or both of which may include digital certificates for secure transactions with a client 50. In this example certificate manager 70 is located outside of the enterprise network including servers 53a and 53b. To perform certificate management on servers 53a and 53b, certificate manager 70 communicates electronically over the external network 51. The use of secure protocols for those communications may be desirable, particularly if private keys are passed over the potentially insecure external network 51. An administrative client 71b may access local certificate manager 70 to perform administrative functions, for example configuring certificate manager to service servers 53a and 53b. Certificate manager 70 may also be made accessible to non-local administrative clients 71a, particularly if secure protocols are utilized in that access. An external certificate authority 61 may be accessed to provide trusted certificates to servers 53a and 53b, and also to certificate manager 70 for secure administrative access.

The configuration of FIG. 7 may provide a service to enterprises whereby additional hardware is not required to be installed locally to the enterprise. In that example enterprises may subscribe to a service and further provide any necessary usernames and passwords for administrator access to the enterprise servers, to be stored accessible to the certificate manager. Servers 53a and 53b may have installed thereon agents for access by the certificate manager 70, or services already installed may be utilized to provide the necessary access by certificate manager 70, for example the SSH service. The certificate manager may also include root certificates, whereby the certificate manager becomes a certificate authority that not only can issue and verify end certificates, but can also maintain those end certificates automatically for customers. The certificate manager may also include intermediate root certificates, if the operator is not or does not wish to operate as a trusted authority.

An exemplary certificate management computer system is packaged in a rack-mountable form-factor and includes a Pentium 4 processor operating at 1.7 GHz or higher, 512 MB of 400 MHz SD-RAM, a RAID system including two 40 GB hard drives in a data mirroring configuration, redundant power supplies, two redundant 10/100 Base TX network ports, two 9-pin serial ports, one parallel port, four USB ports, and a graphics port supporting VGA video modes and higher. Other computer systems may be utilized in various circumstances, for example if a relatively small number of certificates are to be managed or if network access is provided through a non-Ethernet connection. Likewise, the computer system may have other software installed thereon, provided that sufficient processing power and network resources are provided to handle the total operating loads on the system.

The exemplary certificate manager includes a user interface accessible through the HTTPS protocol, of which FIGS. 15 to 48 are representative. That user interface will now be described.

Figure 37:
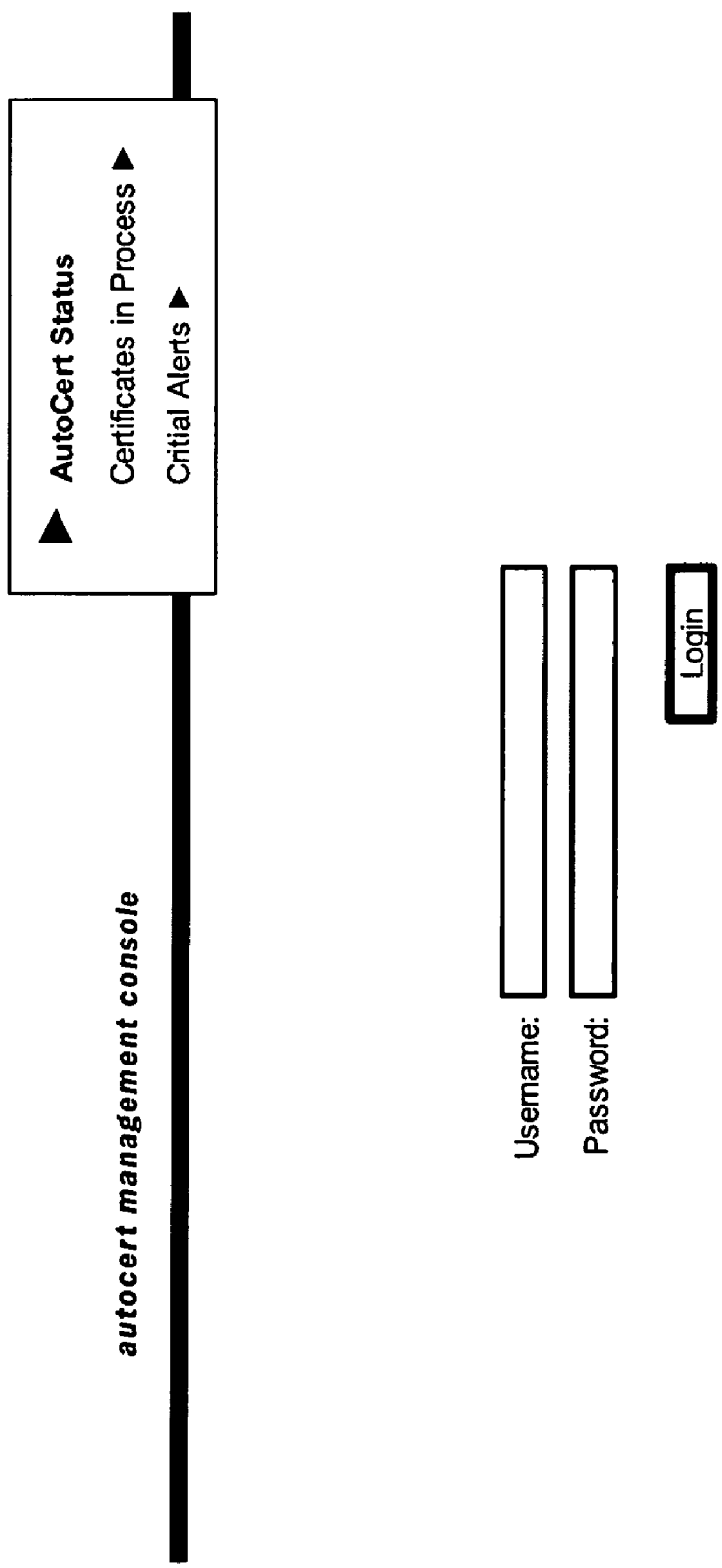
FIG. 37 shows a representative login screen for an exemplary certificate manager.

Referring first to FIG. 37, an administrator is provided access to the exemplary certificate manager by way of a web browser optionally located to a client computer. Upon first accessing the manager, the user is first directed to enter a username and password, or present a certificate or other token. Upon authentication by the manager, the web session of access is attributed to a user with optionally assigned access privileges. An authenticated user may be first directed to a home page or a screen containing alerts directed to the user or the user's group.

Figure 15:
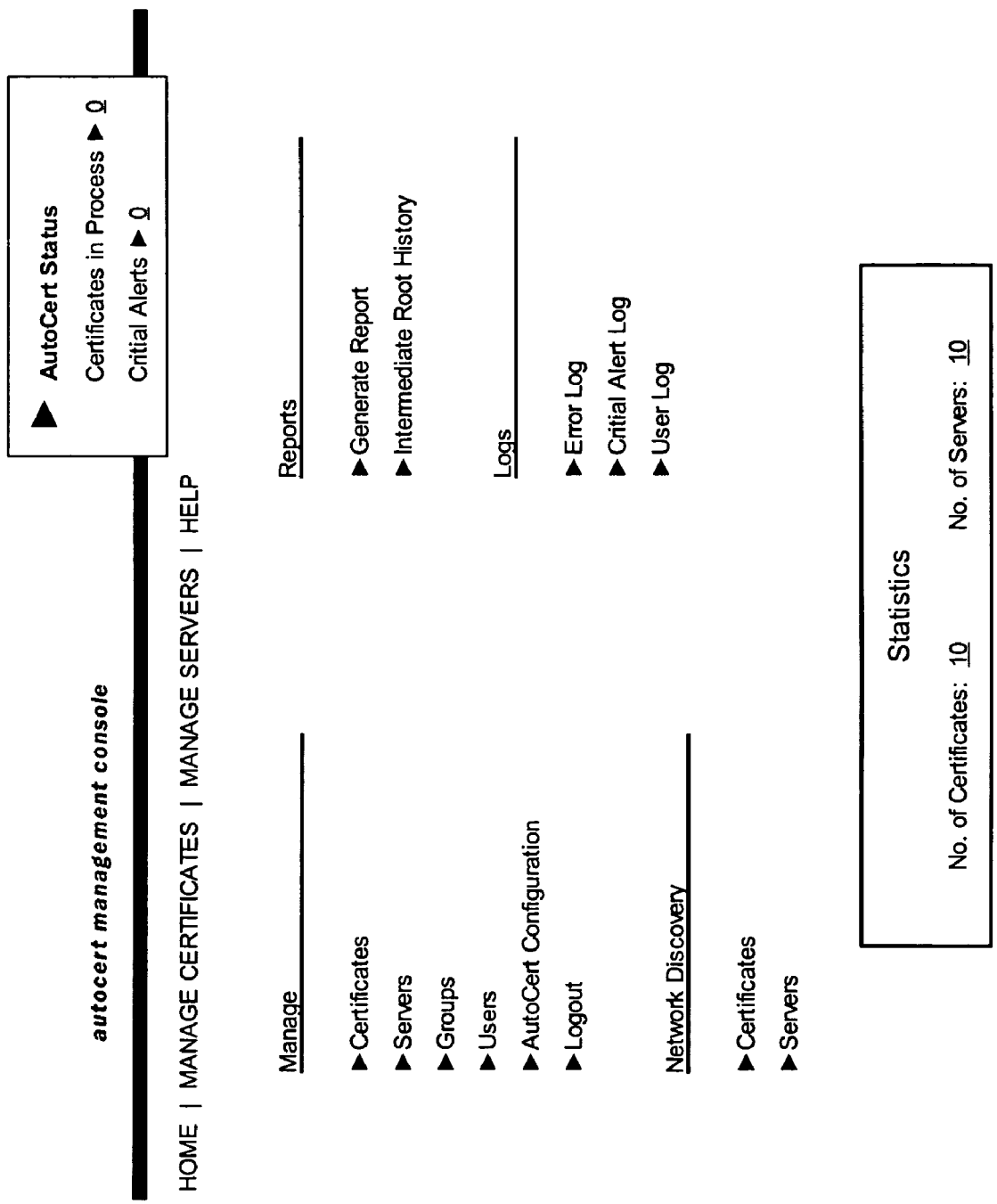
FIG. 15 shows a representative home page for an exemplary certificate manager.

FIG. 15 is representative of a home page providing a number of links to other screens of various functions available through the exemplary certificate manager. In that page, as well as others, the user is presented with status information concerning the number of certificates in process and critical alerts important for the user to view, appearing in a prominent location. Certificates in process and critical alerts to which a user is not privileged to manage need not be indicated. The exemplary home page provides activity groupings which include managing certificates, network discovery, reports and logs. The available management activities shown include managing certificates, managing servers, managing groups, managing users, and system configuration. Network discovery activities include the discovery of servers and certificates in the network. Activities related to reports include the generation and viewing of reports and reports concerning the history of intermediate root certificates managed by the exemplary certificate manager. Logs concerning general errors, critical alerts, and user activity are also made viewable by links in the home page. Also displayed on the home page may be statistics concerning the number of certificates and servers being managed, which may be indicative of the certificates and servers managed by the particular user or the certificate manager generally. In this screen, as well as others, shortcuts may also be provided to direct the user to frequented activities, for example manage certificates and manage servers.

FIG. 16 depicts a representation of a manage certificates screen, as might be displayed by transversal through the home page. That screen includes a list element through with the list of managed certificates may be displayed, the certificates managed by a certificate identification including a numeric certificate ID and a common name. For each certificate selectable objects are provided to view, edit, remove and show the history of each individual certificate. The list is further filterable by a textual or numeric criteria, bypassing extensive page-after-page displays of certificates if the number of managed certificates is large. Also in that screen an "add certificate" button is provided to add a certificate to the managed certificate database.

FIG. 40 shows a representative screen of a view of certificate information, FIG. 47 shows a screen whereby an administrator may enter information about a new certificate, while FIG. 42 depicts a screen in which an existing certificate record may be edited. In those views an administrator may be presented with various elements of particular certificates tracked in a certificate database, which in the exemplary certificate manager are:

| Field name | Contents |
| --- | --- |
| Common Name: | Specifies the fully qualified hostname used in DNS lookups (for example, www.imcentric.com). This is the hostname in the URL that a browser uses to connect to the server on which the certificate is located. It is important that these two names are the same. Otherwise, a client may notice that the certificate name does not match the site name, which often makes users doubt the authenticity of the certificate. |
| Organization Name: | Specifies the official, legal name of the company, educational institution, or other organization owning the certificate. |
| Organization Unit: | Specifies a description of an organizational unit within the organization. |
| Contact: | Specifies an individual who is responsible for this certificate. |
| City: | Specifies a description of the city, principality, or country for the organization. |
| State: | Specifies the state or province in which the business is located. |
| Country: | Specifies the two-character abbreviation of the country name (in ISO format) of the business location. |
| Valid From: | Specifies the effective date of the certificate. |
| Valid To: | Specifies the expiration date of the certificate. |
| Certificate Strength: | Specifies the bit strength of the keys of the certificate. |
| Renewing Certificate Authority: | Specifies the CA through which the certificate is to be renewed. |
| Server: | Specifies the server on which the certificate is or will be installed. |
| Secure Server Name: | Specifies the instance or name of the web server where the certificate is or will be used. |

FIG. 17 shows a representation of a manage servers screen, again as might be displayed from the home page. That screen includes a list of managed servers listed by a server ID, a hostname and an IP address. For each server shown in the list selectable objects are provided to view, edit, remove and show the history of each server. This list is also filterable, the filter operating by textual or numeric fragments of the server ID, hostname, or IP address. An "add server" button is also provided to add server information for a new server to be managed.

Figure 46:
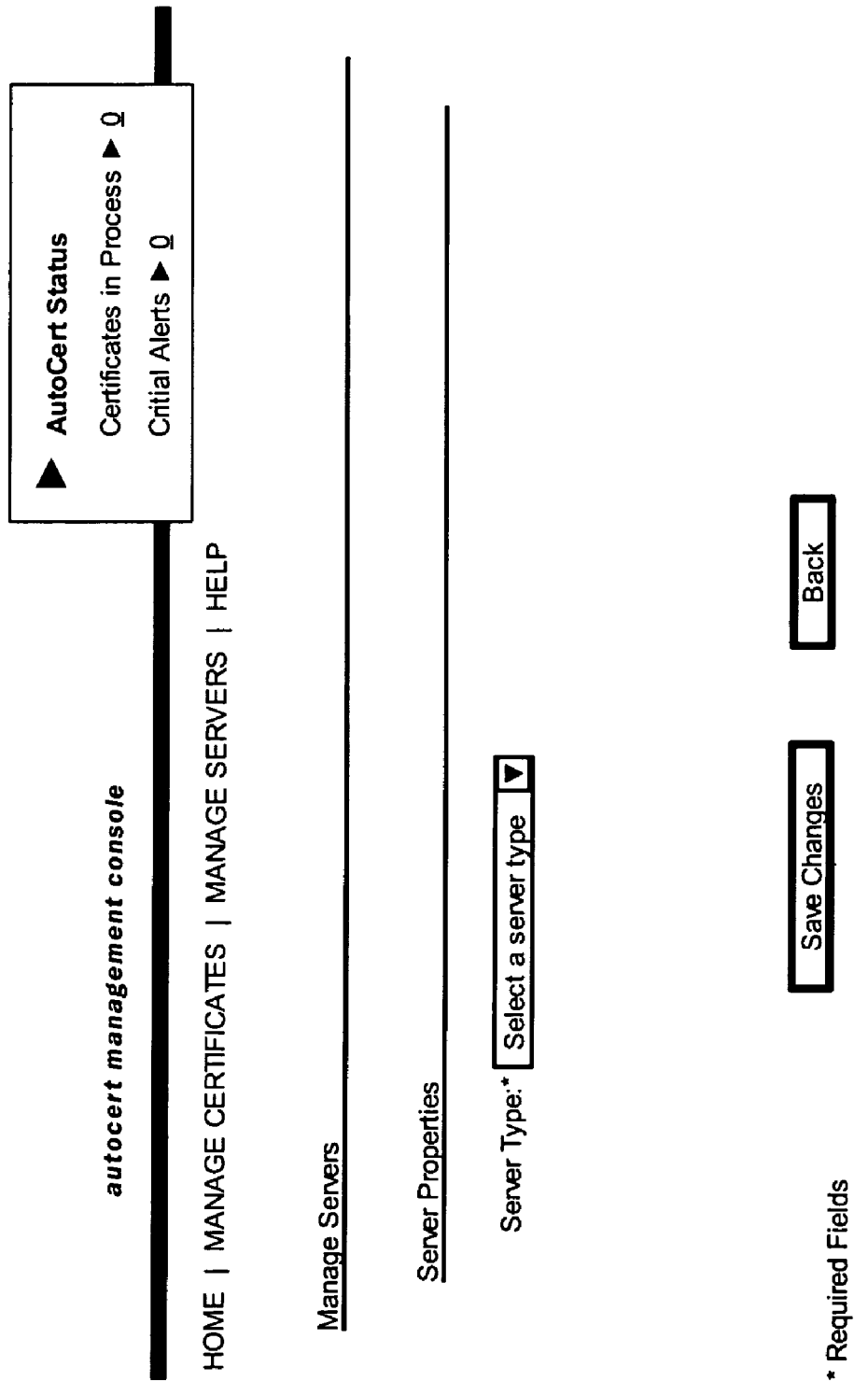
FIG. 46 shows a manage servers screen in an exemplary certificate manager.
Figure 48:
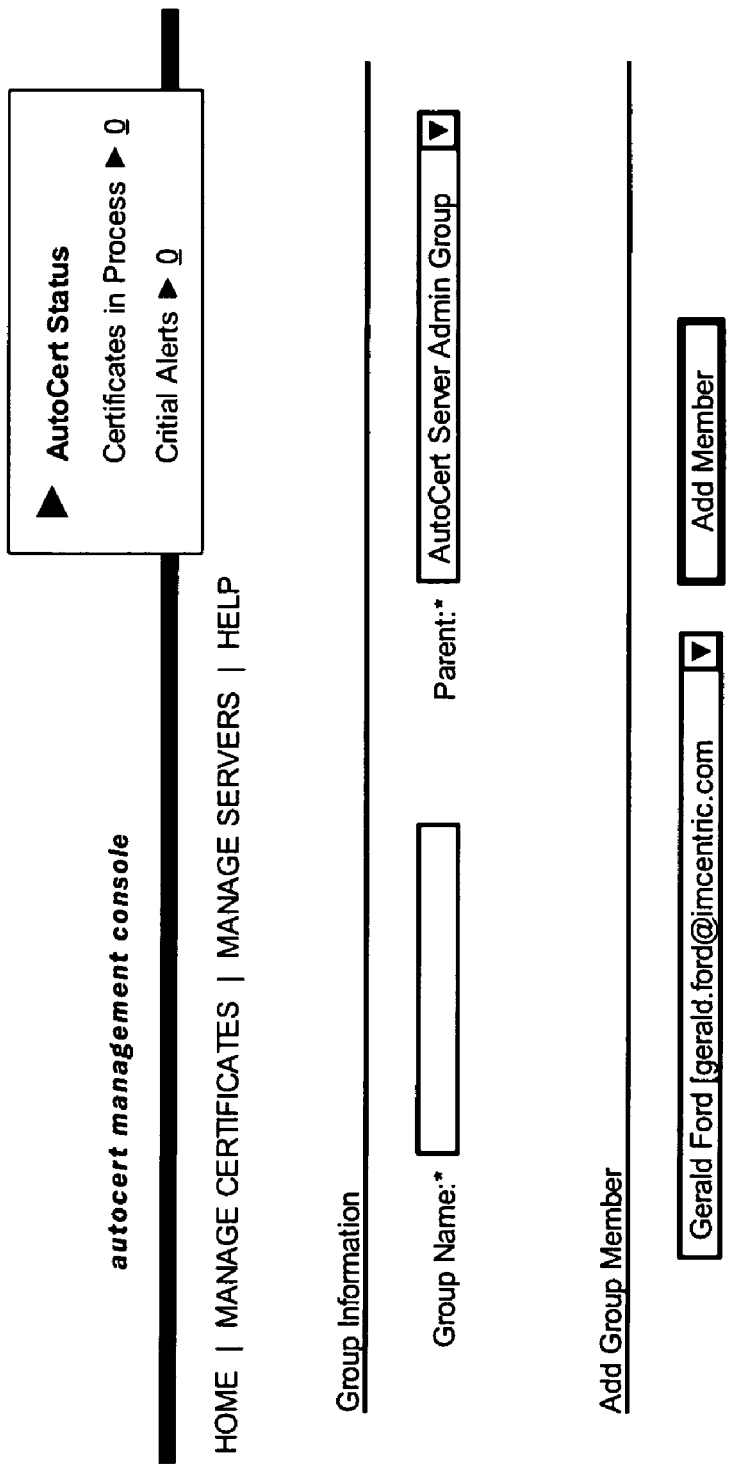
FIG. 48 shows a screen for adding users to a group in an exemplary certificate manager.

If an administrator selects to view or edit a server record, a screen similar to that of FIG. 46 appears. In that screen, the server column data of the particular record appears, which columns may include:

| Field name | Contents |
| --- | --- |
| Host Name | Specifies the hostname of the server. |
| IP Address | IP Address of the server. |
| Description | Description of server. |
| Port | Port used to access the server, some common ports are ssh(22), telnet(23), or web(8888). |
| Username | Username used to access server. |
| Is SSL Enabled | Specifies if the admin pages are accessed via SSL. (Note: only used on Netscape 3.6 and Iplanet.) |

In the exemplary certificate manager users may be grouped together to ease the administration of user privileges. FIG. 18 shows a sample screen for managing groups in the exemplary certificate manager. As with managed certificates and servers, the recorded groups appear in a list from which a group may be viewed, edited, removed or historically viewed. Groups appear in the list as a group ID and a group name. Groups may be added by selecting the "add group" button. Depicted in FIG. 42 is a screen for editing a group. In that screen the group name appears in a textbox, which may be modifiable therein to rename the group. The member users of the group appear in a list including sufficient identification to discriminate users, in this example the user ID, first and last name, email address, and role assignment for the user. User members may be added to a group by clicking the "add member" button, which brings up a separate screen depicted in FIG. 48 whereby registered users may be selected for inclusion in a group.

In FIG. 19 a representative screen is depicted for the management of registered users in the exemplary certificate management system. The registered users are presented in a list, with selectable objects for viewing or editing user information, removing a user, and reviewing a history of user actions. Each user is referenced by a first and last name, and email address, and a username. A button is provided for adding a new user to be added to the registered user list.

Depicted in FIG. 38 is a representative screen for viewing the entries of a particular user registered in the system. FIG. 39 shows a similar screen for editing the entries of a user. In the exemplary certificate manager a default set of fields are included in the user database, which are outlined in the following table:

| Field name | Contents |
| --- | --- |
| First Name | First name of the user. |
| Last Name | Last name of the user. |
| Title | Position Title for the user. |
| Company | Company with which the user is employed. |
| Department | The user's department in the company. |
| Address | Street address (home or office) for user. |
| City | City in which the address is located. |
| Zip | Postal code for the city. |
| Email | Email address for user. |
| Work Phone | Work phone number for user. |
| State | State in which the city is located. |
| Country | Country in which the state is located. |
| Fax Number | Fax number for user. |
| Username | The identifier index of the user. |
| Password | The password of the user (may be hashed). |

Additionally included in the screens shown in FIGS. 38 and 39 is an active directory input facility, by which an administrator may import user information by providing an import path and the username and password of access for the directory service.

Figure 20:
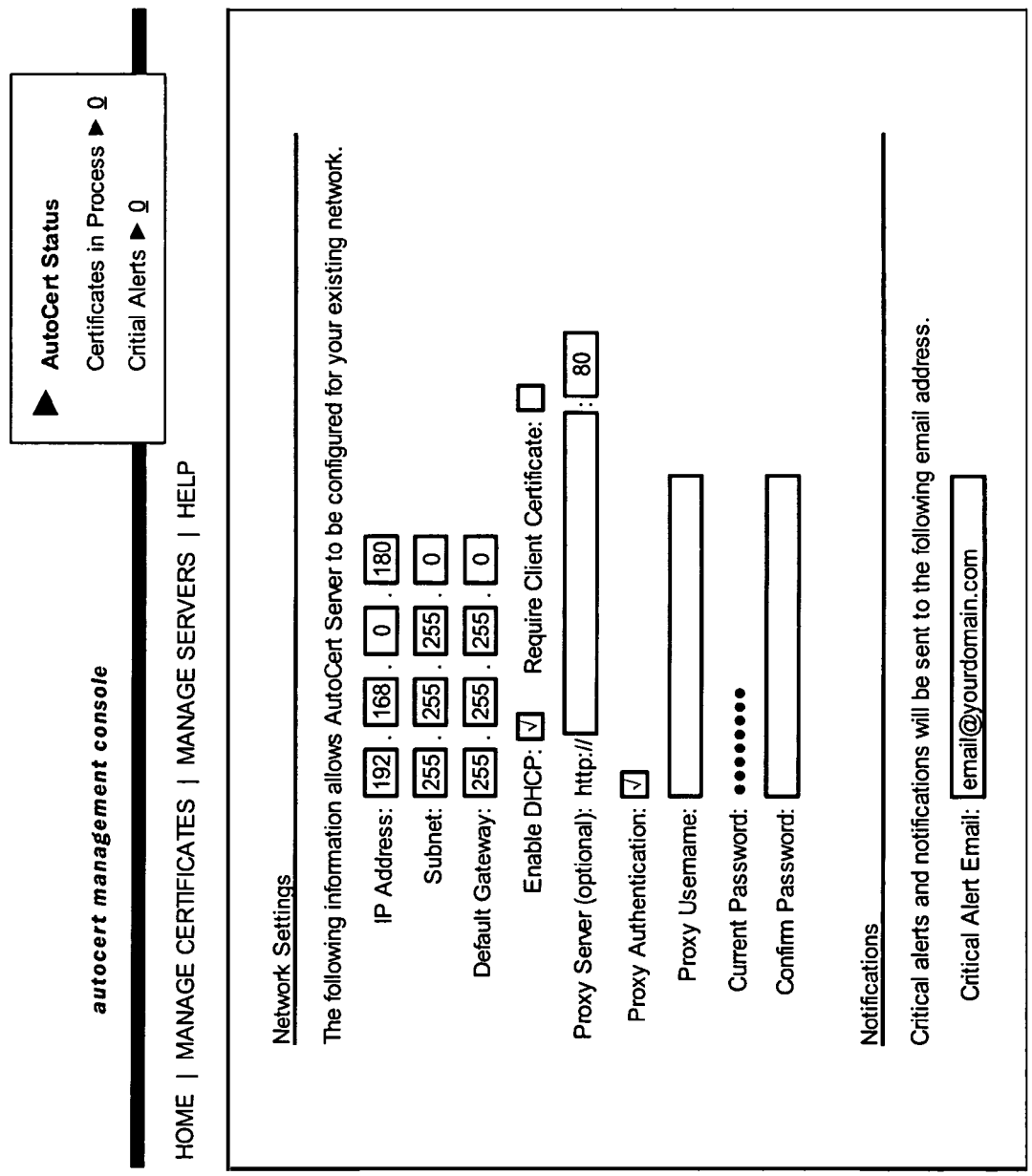
FIG. 20 shows a representative screen of an exemplary certificate manager whereby network settings may be input.

FIG. 20 depicts a representative screen of the exemplary certificate manager whereby network settings may be input. The network settings include the IP address, subnet, and gateway of the manager. DHCP may alternately be enabled by checking the appropriate checkbox, which overrides the IP address, subnet and gateway settings. The exemplary manager may be configured to require a specified client certificate be present at clients accessing the administrator user interface, which function may be enabled by selecting the appropriate checkbox. Now the manager device may also provide for issuance or renewal of certificates by HTTP scripts controlling provided certificate authority user interfaces, as described above. The manager device includes configuration for use of an optional proxy server, including address, port, username and password, which may be useful if the manager device is located behind a firewall restricting default HTTP traffic. The screen of FIG. 20 further includes a location to enter an email address for transmitting critical alerts to a selected email box, if desired.

In FIG. 21 a representative screen is depicted containing entries for custom fields for managed certificates. The exemplary certificate management system may track with certificates other information, such as accounting codes, use notations or other custom information that may not be required or suggested by a certificate standard or a certificate authority. By checking the "required" checkbox for the field, selected fields may be made to be required, by which the manager will force the entry of a user to the field at the time a certificate is created by the system. By checking the "X.509" field for the field, that field will be included in the content of the certificate, otherwise the system will track the information of the field separately.

FIG. 22 depicts a representative screen by which the certificate database settings may be maintained. In the exemplary system, the certificate database may be backed up to a file on a network drive, which directory may be specified in the "path to network share" entry. If a username and password are required to access that drive, it may be entered in this screen. The administrator may also specify a backup interval, in this example of 7 days between backups. The exemplary certificate manager creates backups of managed certificate and server information, users, groups, and may also include copies of the managed certificates in the backups as well.

FIG. 23 shows a representative screen by which default certificate information may be configured to the exemplary manager. The screen of FIG. 23 is for a Windows 2003 Certificate Authority, which CA is useful for generating internal root and end certificates. Other screens are provided by the exemplary certificate manager for configuring the server to operate with other certificate authorities, for example Verisign™ or Entrust™, in various modes of operation. The exemplary manager may also include facilities for retrieval of connection information from a CA over the Internet, if identification is provided in the configuration screen for that CA. The certificate authority screen shown includes entries for a network path to the certificate authority, a username and password, domains managed. The value of the organization name field is incorporated into all certificate signing requests sent to the particular certificate authority, unless overridden elsewhere.

The CA setup screens may be modifiable by program updates from the seller, manufacturer or licensor to adapt to changes in the operation of the certificate authorities made available for use. Those program updates may also include updates to the scripts (or other programmable elements) used to interact with the certificate authorities intended to be usable to the administrator.

A second exemplary certificate manager may be set up as a replicator for a first manager, providing failover functionality. Shown in FIG. 24 is an exemplary screen in which replicator settings may optionally be configured.

Figure 25:
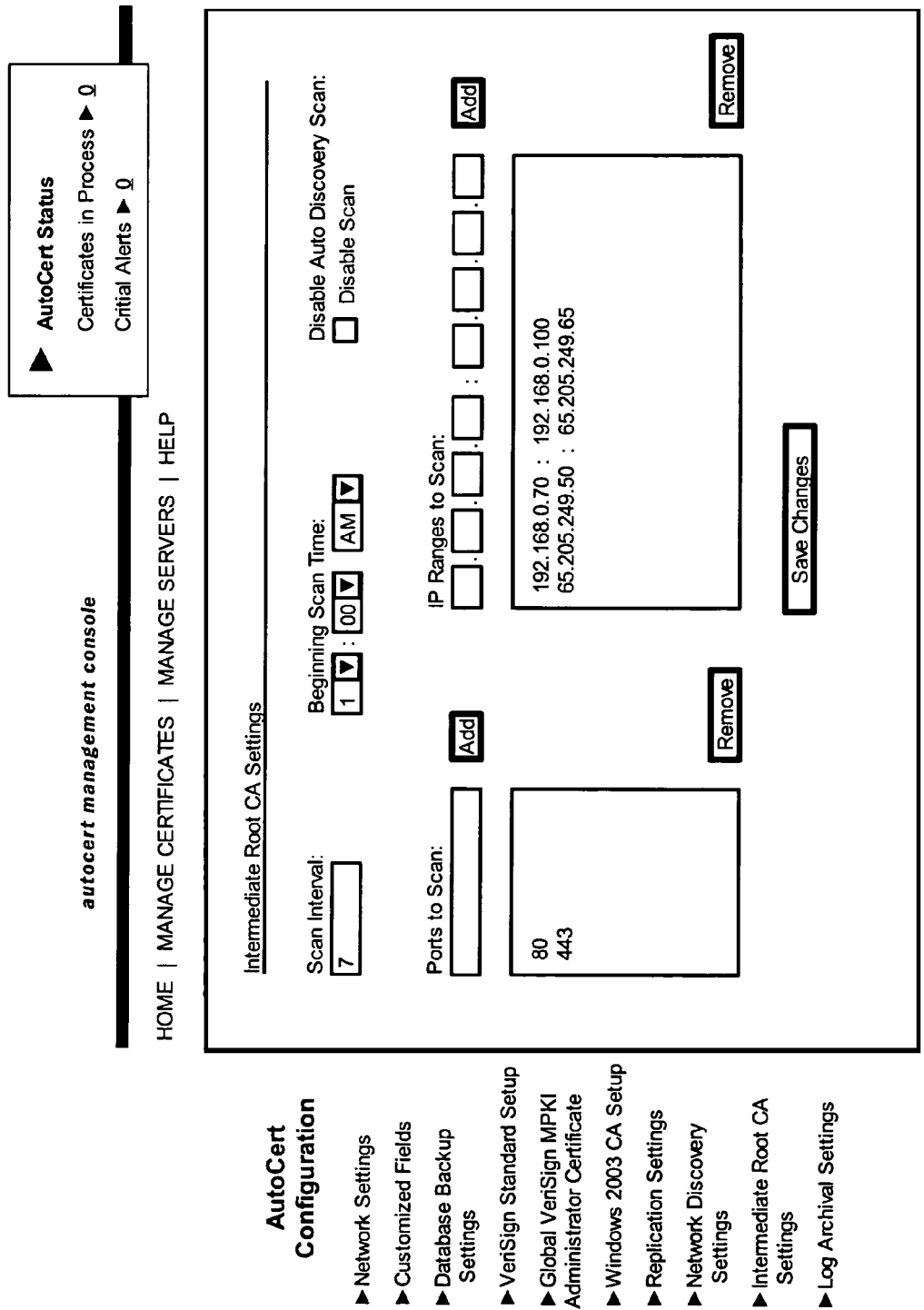
FIG. 25 shows a screen for entering network discovery settings in an exemplary certificate manager.
Figure 26:
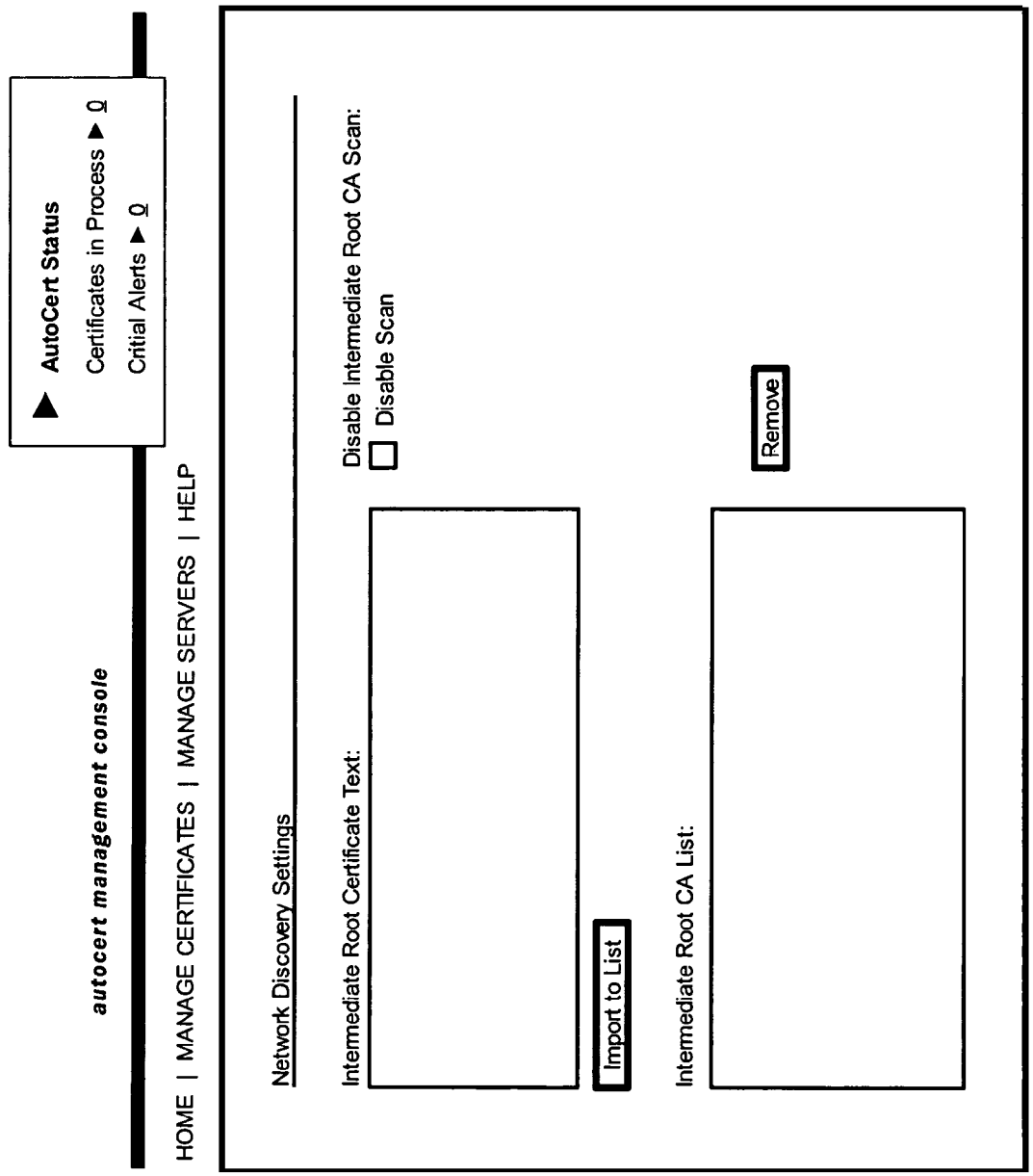
FIG. 26 shows a screen for entering configuration of the intermediate root certificate authority settings of an exemplary certificate manager.

Depicted in FIG. 25 is a screen for entering network discovery settings. The exemplary certificate manager may perform discovery on a network to locate servers and certificates that may need to be managed. The discovery settings include one or more IP address ranges to scan, and a number of IP ports to scan. The manager may be configured to perform discovery periodically to automatically detect newly installed servers and certificates. The automatic discovery interval may be set in the "scan interval" checkbox, and the time of day to perform the scan may be entered into the "beginning scan time" pulldowns. Discovery may also be disabled by checking the "disable scan" checkbox.

The exemplary certificate manager may also manage intermediate root certificate authorities and intermediate certificate authorities, such as might be the case with a Windows 2003 CA above. The configuration of the intermediate root certificate authority settings for the manager may be controlled in a screen similar to that shown in FIG. 26. That manager may permit the maintenance, storage and access of intermediate root certificates by the manager, or may permit maintenance at a different server device. In the screen shown in FIG. 26 an intermediate certificate to be managed may be entered in the textbox, followed by the administrator clicking on "import". The new intermediate certificate may then be included in the maintained intermediate root certificates being managed, and displayed in a list with others as desired.

The exemplary certificate manager may also scan for intermediate certificates on the discovery network. The manager may discriminate an end certificate from an intermediate root certificate by a review of certificate contents, or the manager may examine the chain of authority for certificates for parents located on the discovery network.

FIG. 27 depicts a screen whereby the log archival settings may be set in the exemplary certificate manager. In that manager, logs may be archived remotely to prevent accumulation on the manager itself. This screen permits the setting of a network location, time, interval, username and password for the error log and the history recorded by the manager.

FIG. 28 depicts a representative screen permitting the management of certificates discovered but not yet completed in the exemplary manager. A list of certificates is presented, with a discovery-assigned certificate id and the common name recorded in each certificate. For each certificate, a complete and remove selection are provided. If an administrator desires to complete the entry of a discovered certificate into the database, he may click on complete. Likewise, if an administrator decides that a discovered certificate need not be managed, he may click on remove (the removal is only for the manager database—the certificate is not removed from a server). FIG. 29 depicts a similar screen permitting the completion or removal of discovered server records to or from the database.

Figure 30:
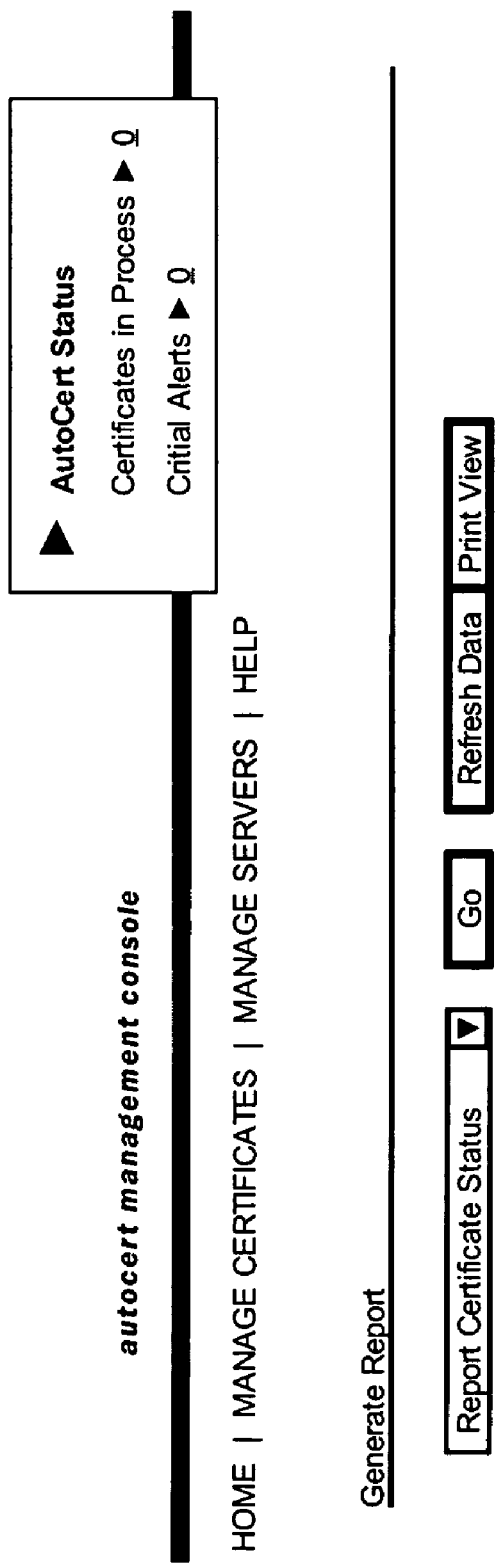
FIG. 30 shows a screen whereby a report may be selected from a list of available reports, generated and printed in an exemplary certificate manager interface.

The exemplary certificate manager additionally permits the generation of various reports. Depicted in FIG. 30 is a screen whereby a report may be selected from a list of available reports, generated and printed. Depicted in FIG. 35 is an exemplary view reporting all managed certificates, detailing the name, status, validity dates, and other certificate information. A similar report is depicted in FIG. 36, by which all managed servers are listed including details such as the hostname, IP address, port a certificate was accessible, the server software platform, the operating system, the protocol used for connecting to the server, as well as other related information. An additional report, not shown, lists the users registered with the exemplary manager.

Of the reports available, several historical reports may be generated by the exemplary manager. Depicted in FIG. 31 is a historical report of intermediate root certificate authority scans, including updates to the current database entries. Shown in FIG. 43 is a report of user actions within the manager, each user action including a date, time, action, user and value among other potential action informational items. FIG. 44 shows another history view, this one of changes to the certificate database, each change record including the date and time of change, the column changes, the new value, and the user making the change. FIG. 45 shows a historical view of changes to the server database, each record including the date, time, column, new value of the change and the user making the change.

Figure 33:
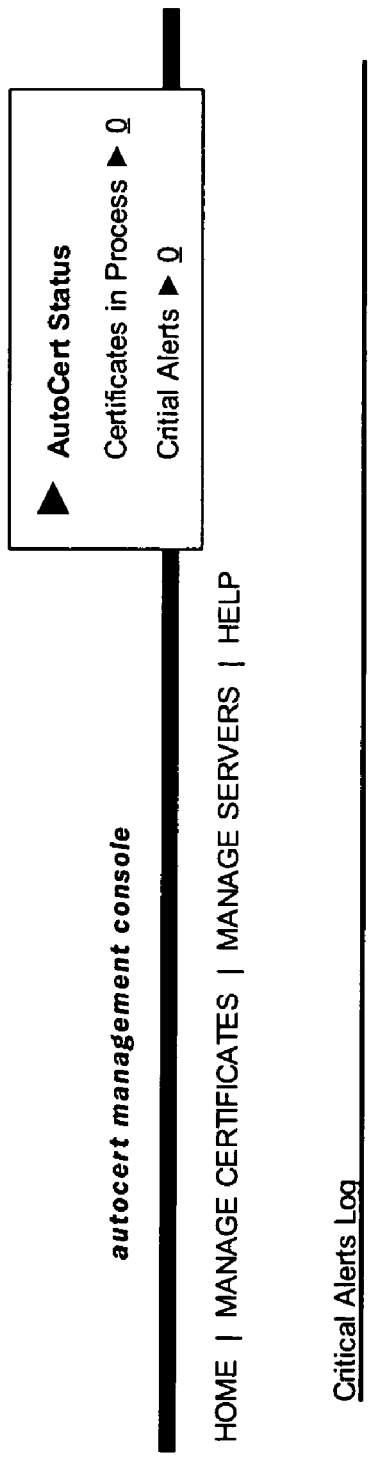
FIG. 33 depicts a view of an alert log generated by an exemplary certificate manager.
Figure 34:
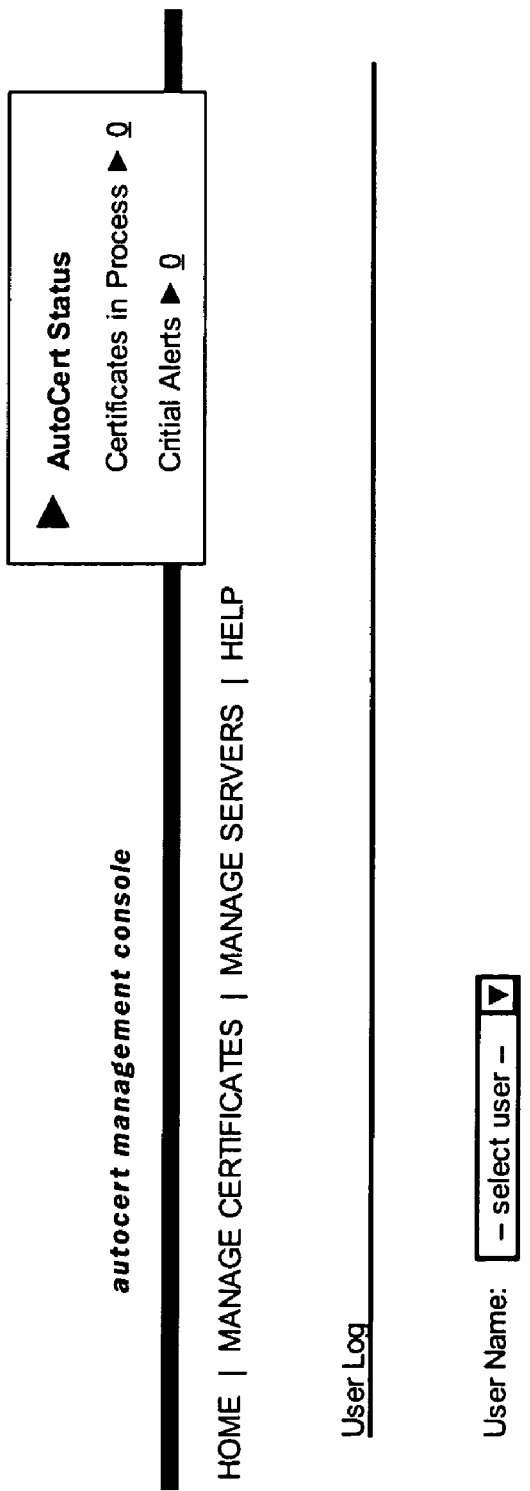
FIG. 34 depicts a view of a user log generated by an exemplary certificate manager.

The logs generated by the exemplary manager are also viewable. FIG. 32 depicts a view of the error log, including a description of each error and the time of occurrence. A list of error codes and meanings appears in Appendix A for the exemplary certificate manager. FIG. 33 depicts a view of the alerts log, which in this view is empty. If, for example, renewal of a certificate was unsuccessful, that event might appear in this log view. Attempts to notify administrators may also appear in the alerts log. FIG. 34 depicts a view of the user log, which includes a list of user actions to the database as well as other actions.

Further in the exemplary manager, user roles may be assigned to users. A user may thereby be given authorization to perform various administrative actions, for example authorizing the request of new certificates or merely viewing the certificate database. The exemplary manager may additionally act as a firewall to the management software, permitting communication only to selected ports in the network protocol. For example, a manager might enable port 443 for HTTPS administrative user interface access and port 25 for receiving email in a TCP/IP protocol supporting manager. Providing firewall functionality may prevent attacks from worms, buffer overflow attacks or other attacks, and make a manager suitable to be connected directly to a public network such as the Internet.

The certificate database of the exemplary certificate manager may additionally be encrypted. Optionally, the manager may generate a self-signed certificate initially to encrypt the database. The self-signed certificate may be protected from user access by user privileges, by encryption with a fixed key, encoding in a non-readable or specialized format, or other method. Private keys used to generate CSRs are not stored on the exemplary manager, but are stored on the destination servers (where they may have been generated by the creation of a CSR).

The exemplary manager may further include an updating tool. The updating tool checks for security or bugfix updates to the system periodically, and downloads and installs any updates automatically. The manager may further include one or more fail-safe mechanisms that run system diagnostics on a periodic basis to gauge the health of the system and attempt error recovery. Administrators may be notified by email if error recovery is unsuccessful. The manager may further include a database backup feature functional to restore and archive the state of the system.

Systems for Managing Digital Certificates to Client Devices

Figure 13:
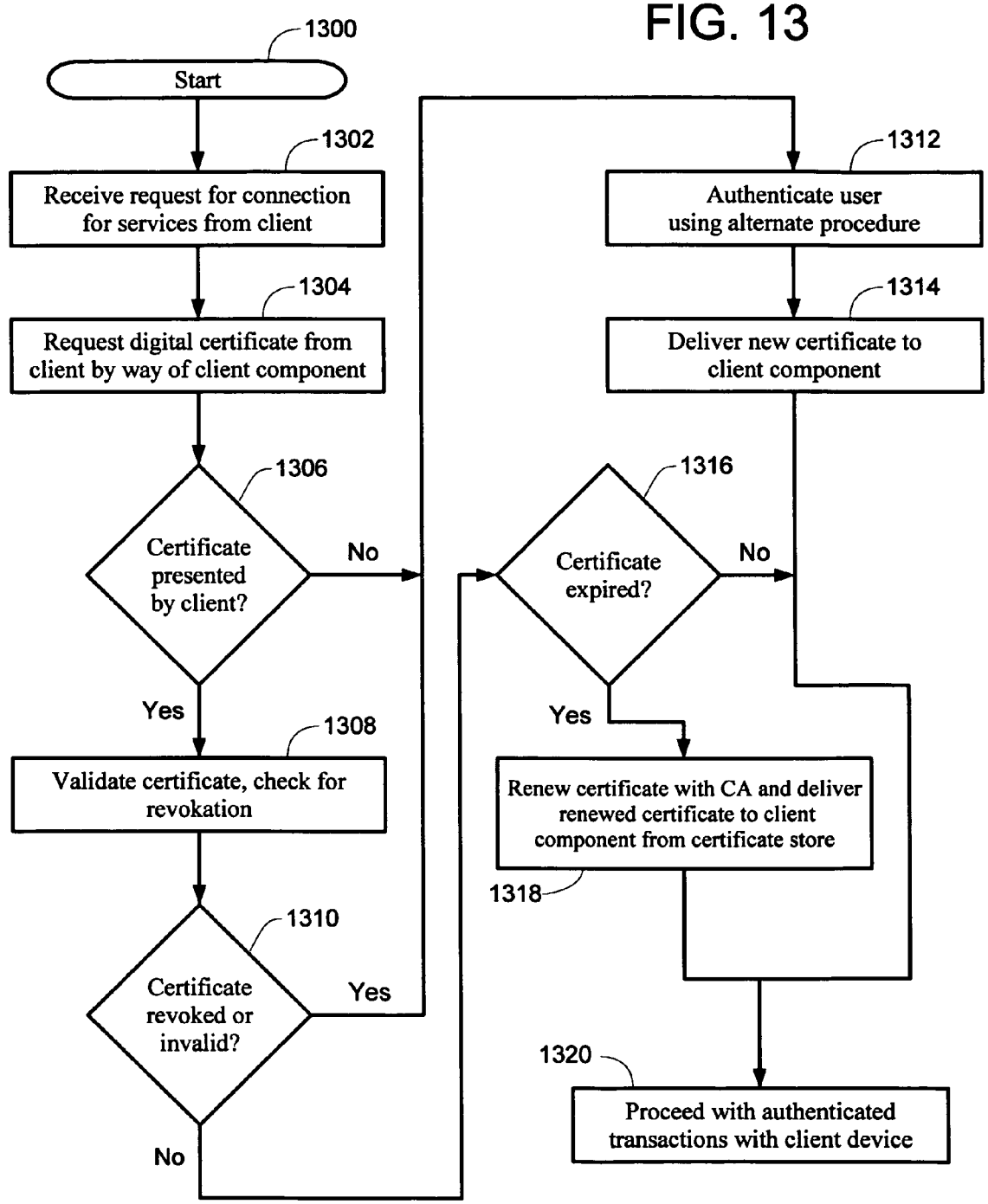
FIG. 13 shows an exemplary process permitting a server device to authenticate a client component associated with a user, account, or other association.

Systems described above permit the automatic maintenance of certificates on server devices of various types. Systems may also be constructed to install and maintain certificates on client devices as well. Referring now to FIG. 13, an exemplary process is depicted permitting a server device to authenticate a client component associated with a user, account, or other association. The client component might be, in several examples, a personal computer, a cell phone, a personal data assistant, or virtually any other client device operable by a person providing access to a service provider over a communications network. This procedure begins in step 1302 by a request for connection, in this example by a client. The request for connection might also be initiated by a server, in some circumstances. The server then requests an appropriate digital certificate from the client for authentication purposes. The client may present a certificate to the server if it is available. A client may, if desired, be configured to fetch a certificate from a CA if a proper certificate is not available.

If the client presents a certificate for authentication, tested in step 1306, the server may proceed to validate the certificate as in step 1308. The server may also test for certificate revocation, for example by comparing the certificate against a list of revoked certificates. If the certificate has been revoked, or if the certificate is not valid for the authentication purposes, tested in step 1310, the server may proceed to issue a new certificate to the client. Proceeding from one of steps 1306 or 1310 to step 1312, the user is authenticated using an alternate procedure, as a valid certificate was not presented. The alternate procedure may take many forms, such as the entry of a known username and password, a passphrase, an account number and PIN number, or any other procedure which may identify the user of the device to the satisfaction of the service provider. Alternatively, if it is merely needed to identify the client device upon subsequent accesses, the user authentication need not be performed.

Upon successful alternate authentication, a new certificate is delivered to the client. Under some circumstances it may be desirable to maintain a store of new certificates, to avoid delays in a service due to the time required to issue a new certificate. Alternatively, a new certificate may be created about the time of delivery, which might be created by in internal or external certificate authority entity. Once a new certificate is delivered to a client, transactions may proceed with the client device under an assurance of authentication, as in step 1320.

If in step 1308, the client certificate delivered to the server is found to be valid and not revoked, a check for an expired certificate may be performed in step 1316. If the certificate is not expired, authenticated transactions may proceed in step 1320. Otherwise, a process of renewing a certificate may commence, in step 1318. In that step, the old certificate is renewed with the appropriate certificate authority, which might be internal or external, and the renewed certificate delivered to the client. The renewal of a certificate might occur at the time of the connection attempt by the client, however a small delay may be introduced, especially if an external certificate authority is used. Alternatively, a process may periodically run on the service side, checking issued certificates for expiration. Certificates may be renewed prior to a request for connection for services from a client, avoiding the small delay, provided that the client certificates are stored in the service system.

In the exemplary method described above, agents may be fashioned for particular client devices. Through the method, an installed agent may act to communicate with the service provider to receive certificates therefrom. An agent may also, if desired, provide an interface for presenting certificates to the service provider. An agent may also provide for management of client certificates in a local store, if local client facilities are not provided or not used otherwise. An agent may, if desired, remove managed certificates from a client device at the time the agent is uninstalled. The agent might also be fashioned to be more comprehensive in function, and may manage a session or transactions with the service provider.

Agents may be fashioned for several kinds of client devices. For example, an agent might be fashioned as a background executable process or daemon communicating with a service provider on a selected TCP port, executables being provided for a number of operating system types such as WinCE™, PalmOS™, PocketPC™, Windows XP™, MacOS™, Linux™, etc. In another example, an agent might be downloaded from the service provider about the time the request for connection for services is made. That agent might be written in a platform-independent interpretive language, such as Java, or might be an executable program provided by a server based on the perceived client type. In that example, the agent might only reside on the client for a fixed period, although the client certificates may reside at the client locally. In another example, the agent might be a browser plugin, which may be automatically downloaded from a predefined location at the time a user first attempts to access a service provider. In yet a further example, an operating system may provide access services sufficient to perform the agent functions, in which case the operating system may be equivalent to a certificate agent.

As to a client certificate, a client may be identified in several different ways. In a first example, a client certificate contains an encrypted identifier assigned by the service provider, the encryption performed with a secret key known to the service provider but not by others generally. The identifier may be associated with an individual's service, for example a bank account number or a user identifier for an information subscription service. The encrypted identifier might include a user identifier and a passphrase, for example a username and password or an account number and PIN number.

The identification data may not necessarily be kept secret. For example, if a service provider is in the business of providing access to databases and literature for a fee, the impact of discovery or monitoring the activities of the user might be negligible, although it may be desirable for the service provider to ensure that the user is subscribed. In that example, a certificate might contain a subscription number digitally signed by a key maintained by the provider.

Now in the above client certificate management methods the service provider may identify the individual or group using the service using a presumption that other individuals will not be permitted access to the client device. For example, if the client device is a personal data assistant (PDA), it may be presumed that that device is for a particular individual only, which individual will retain control of to prevent unauthorized use of the service provider's services. If that assumption is made, a service provider may authenticate using a certificate on a client device alone, and need not require the entry of passwords or other user authenticating items.

The service provider may also wish to prevent the transfer of a certificate from one client device to another. In that case, the certificate may include information unique to the client device, for example a MAC address, a fixed IP address, a serial number or a processor ID. The signature of the certificate may further be obtained by encoding the unique information, causing a signature mismatch should the certificate be moved. In an alternative system, an agent may provide the unique information to the service provider so as to avoid an unauthorized user masquerading a different client device for the original device.

Figure 14:
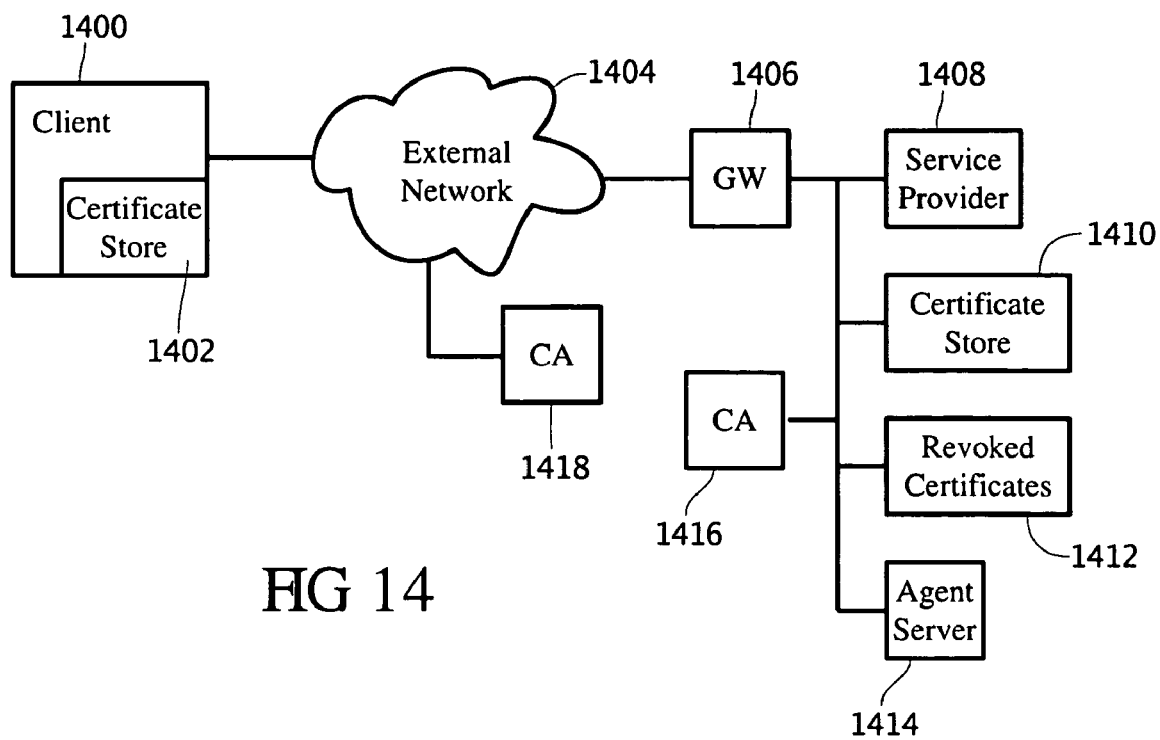
FIG. 14 shows a system useful for managing client certificates and providing network services.

Referring now to FIG. 14, a system useful for managing client certificates and providing network services is depicted. A client 1400 is connectable to an external network 1404 permitting connections with a service provider device 1408, in this example through a router/gateway device 1406. Service provider 1408 provides access to services through a standardized protocol, for example HTTPS. Client 1400 likewise includes software for communicating with service provider 1408 and for interacting with the operator of client 1400, which might be a web browser supporting SSL if the service provider 1408 uses HTTPS. A certificate store 1410 may be provided to store certificates issued or deposited to clients, and may also store new and unissued certificates. Certificate store 1410 might be a shared certificate store, such as a Microsoft Windows Certificate Store or Java Key Store, or in another example might be a private certificate store managed by an agent. A repository of revoked certificates 1412 may be consulted by service provider 1408 to verify a client certificate presented by a client has not been revoked.

An agent server 1414 may also be provided to assist with the download and installation of agents to clients. An internal certificate authority 1416 may be provided to produce encryption/decryption keys or facilities for digitally signing certificates. In one example, internal certificate authority 1416 is in communicative proximity to service provider 1408 so as to avoid substantial delays in data processing. Optionally, an external certificate authority 1418 may be used, which may be operated independently of the entity operating the service provider 1408. If an external certificate authority is used, a certificate may be used to sign user transactions which are afterward publicly verifiable. A certificate store 1402 is provided at client 1400 to store certificates issued by the service provider, making them available in later accesses between client 1400 and service provider 1408.

Now it is to be understood that service provider 1408, optional certificate store 1410, revoked certificate database 1412, agent server 1414 and internal certificate authority 1416 might be completely separate computing systems connected by a network. Alternatively, elements of those may be combined as desired on shared computing resources. In another example, not shown, each of service provider 1408, certificate store 1410, revoked certificate database, agent server 1414 are elements residing on a single server or distributed servers, with internal certificate authority 1416 being optionally included thereon. The operation of a system according to the principles set forth above is illustrated in FIGS. 49 through 63, and will be presently described.

Figure 49:
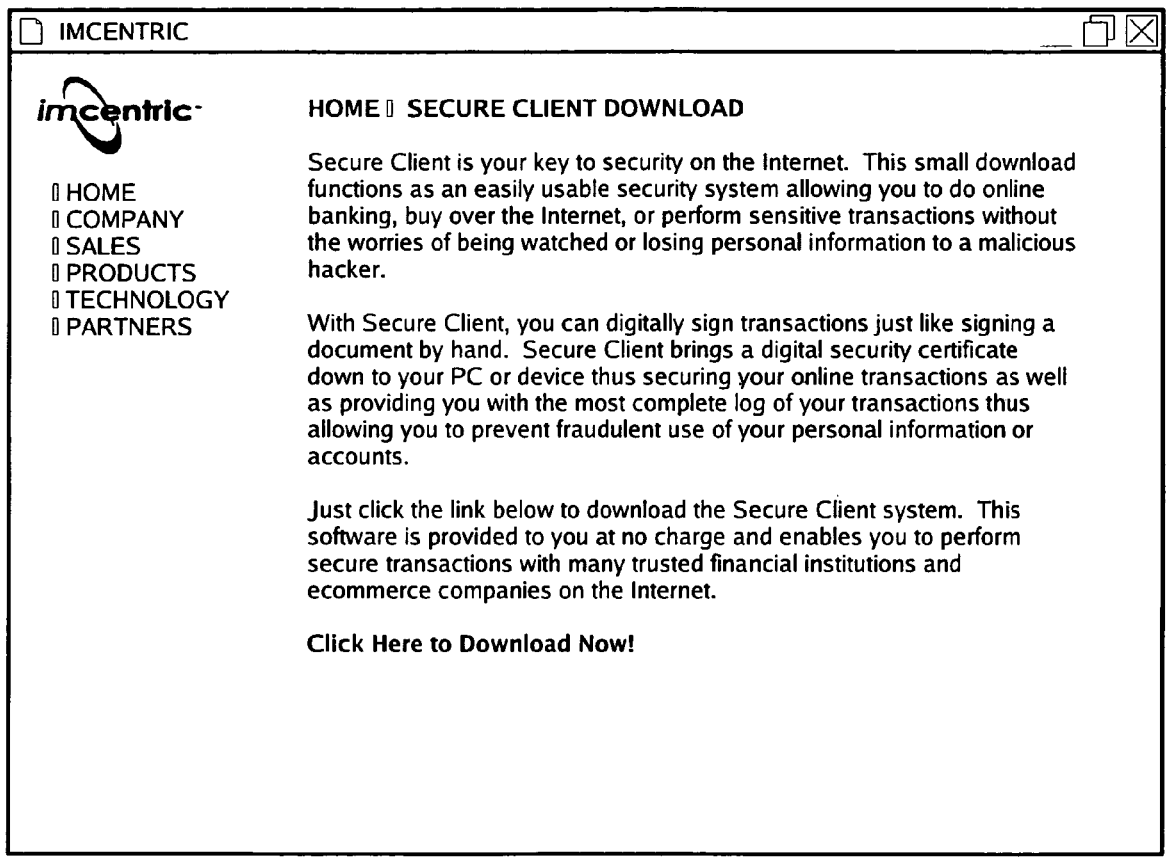
FIGS. 49, 50, 51, 52 and 53 depict exemplary screens generated in a secure client agent installation.
Figure 50:
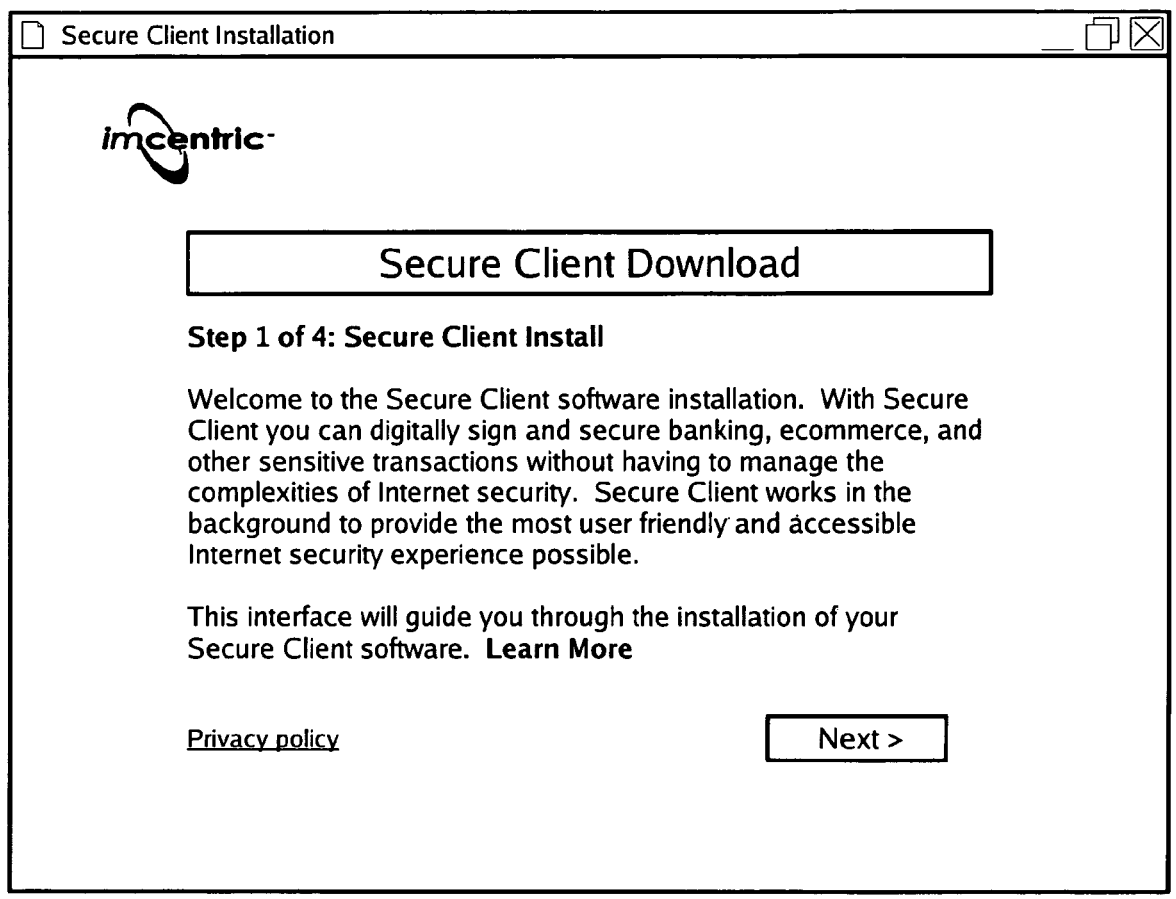
Figure 51:
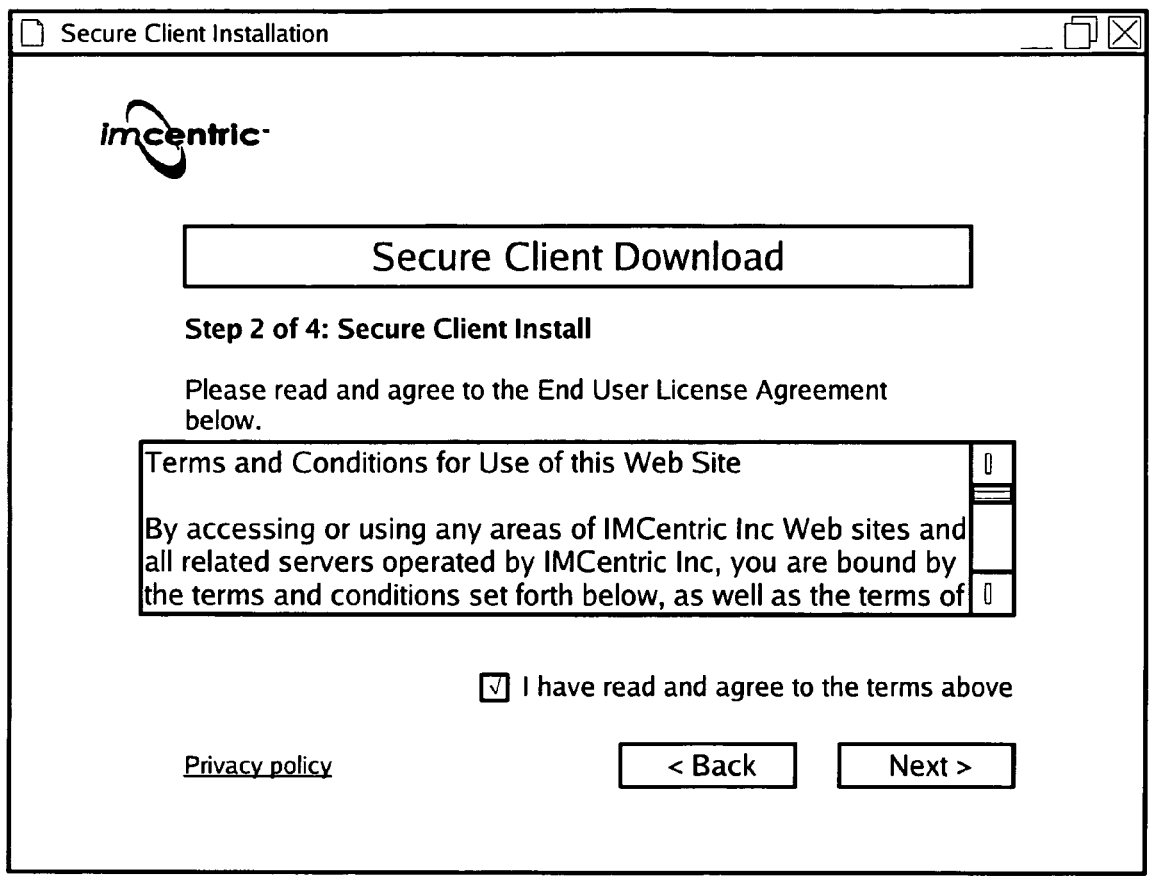
Figure 52:
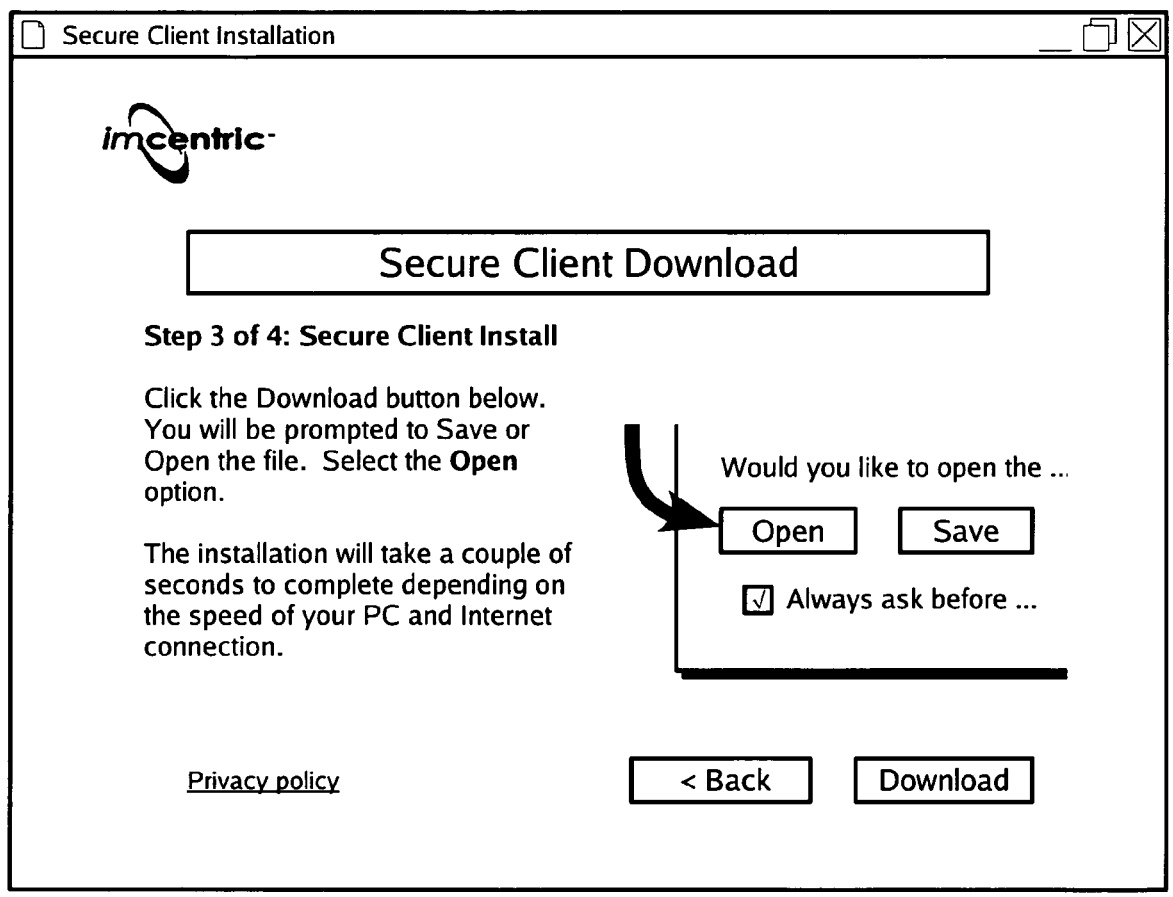
Figure 53:
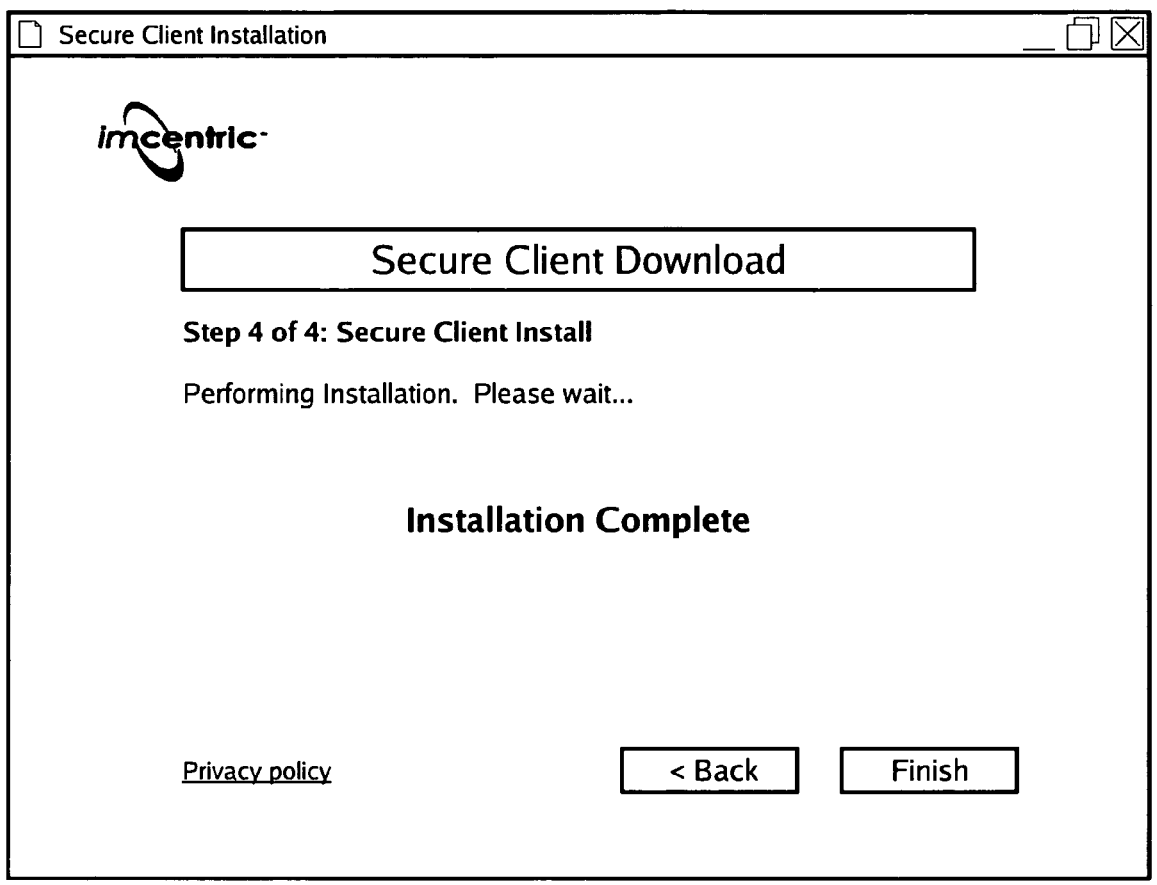

In FIG. 49, a user has accessed a service provider's download area via a web browser on a client device, and is presented with an information screen about an agent system to be downloaded, activated by a "download now" link. Following activation, the user is presented with a screen shown in FIG. 50, which presents further information concerning the "secure client" software. Clicking on the "next" button, the user continues to a step 2 screen shown in FIG. 51, which presents a license which the user may assent to. The user may then be directed to a step 3 screen as shown in FIG. 52, which provides a download button to start the agent download process. The installation of the agent to the client device immediately follows the download, and the user is presented with the step 4 screen shown in FIG. 53. The user is then ready to use the "secure client" product.

Figure 55:
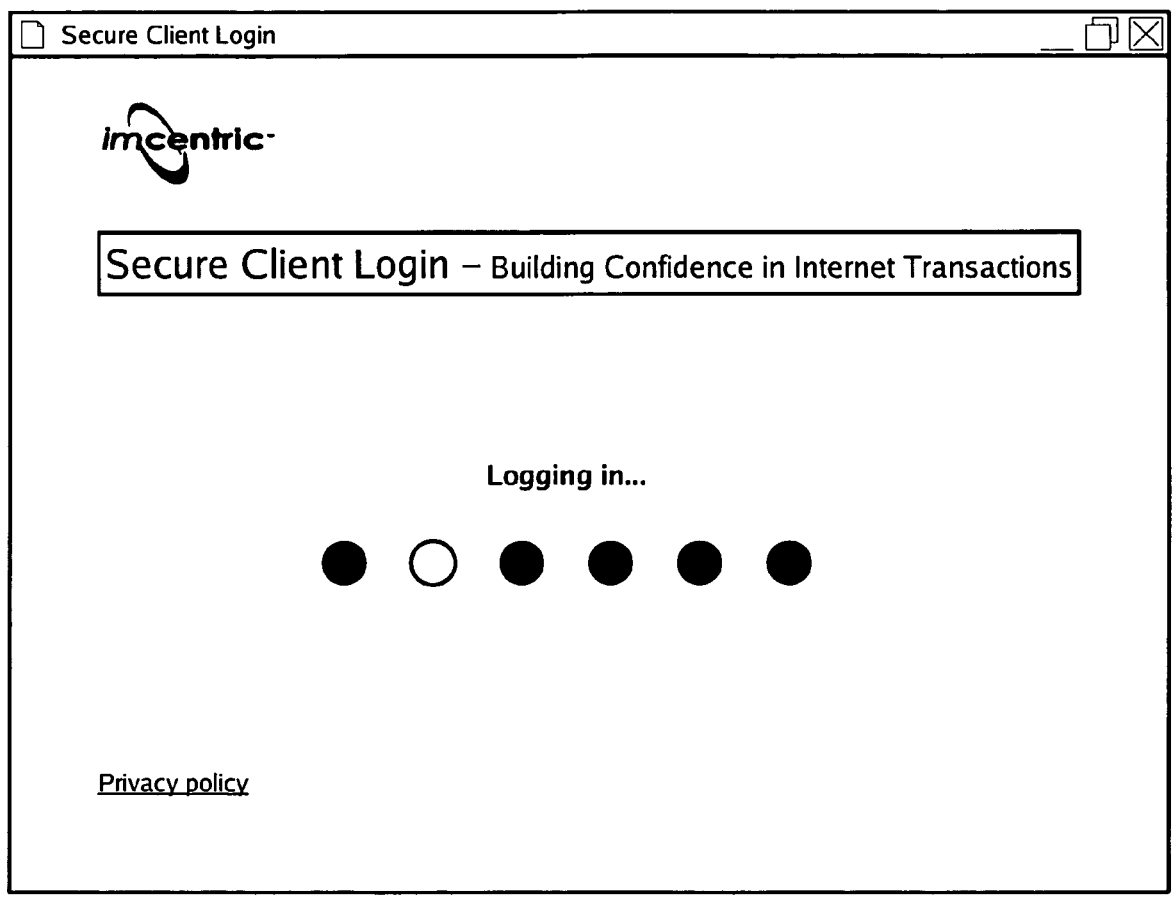

Referring now to FIG. 54, the user accesses a server providing the secure client service, and is presented a screen containing entry fields for identifying information, in this example an email address and a passphrase. Now it is to be understood that other kinds of identifying information might be more suitable for other circumstances, and the particular entry fields shown are merely for explanation. Following entry of the identifying information the user may click the login button to proceed to the screen shown in FIG. 55. In FIG. 55 the user is presented with a screen indicating that authentication is in progress.

Figure 56:
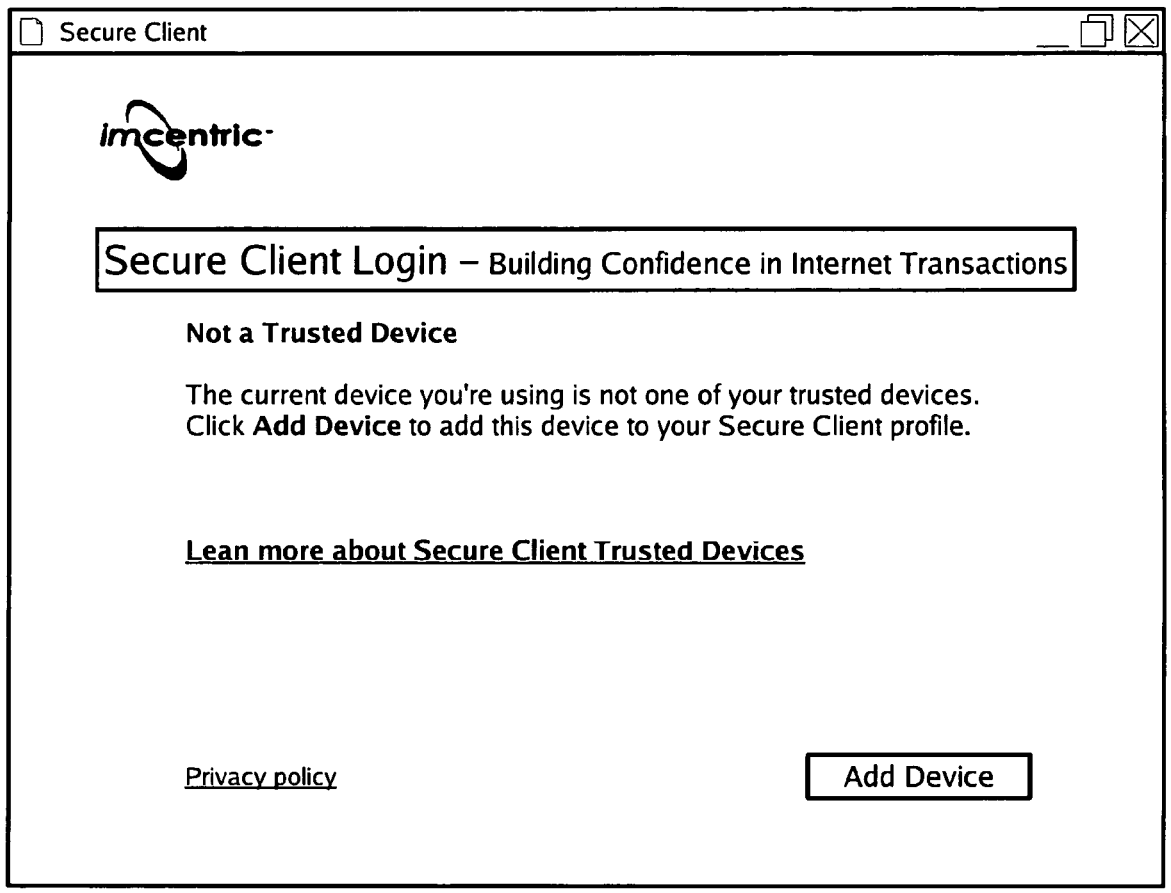
FIG. 56 shows a screen of an exemplary secure client service indicating the absence of a certificate on the client.
Figure 57:
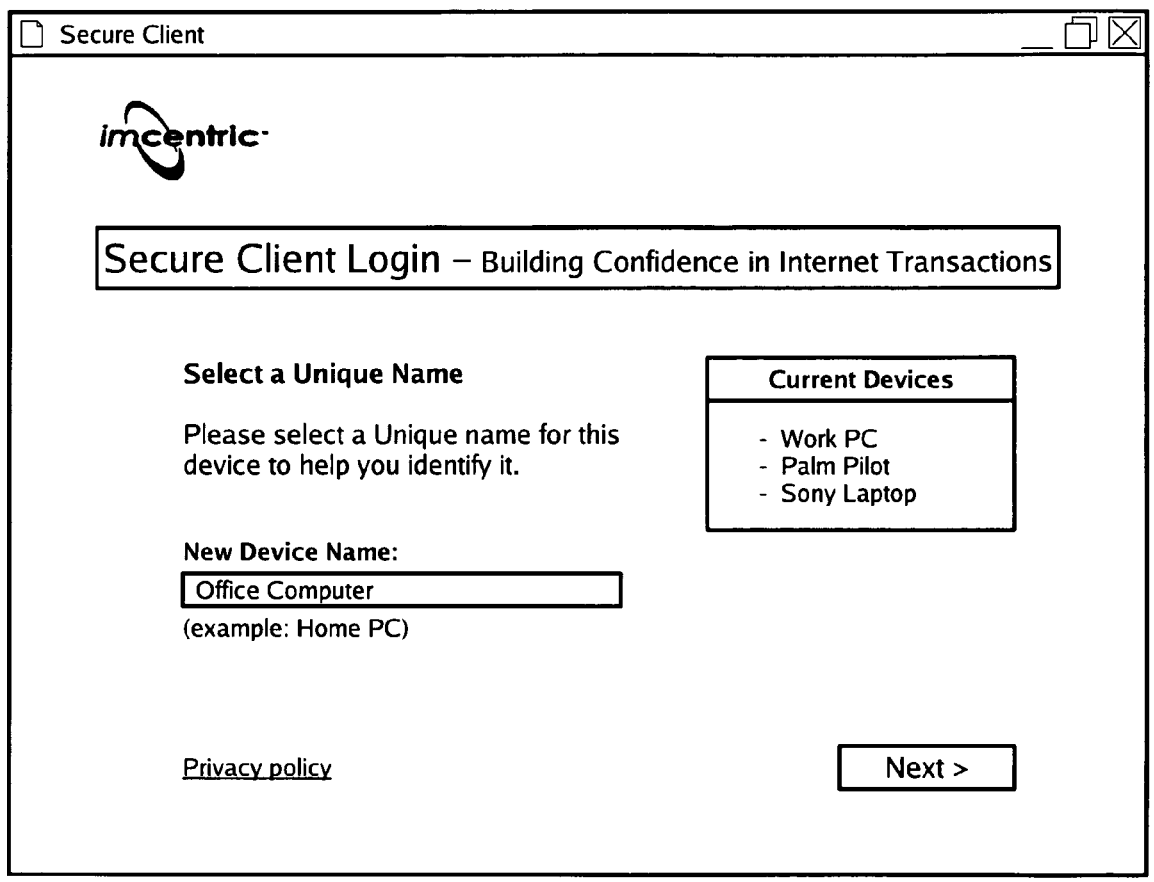
FIGS. 57 and 58 depict screens generated through the process of registering a client device with an exemplary secure client service.
Figure 58:
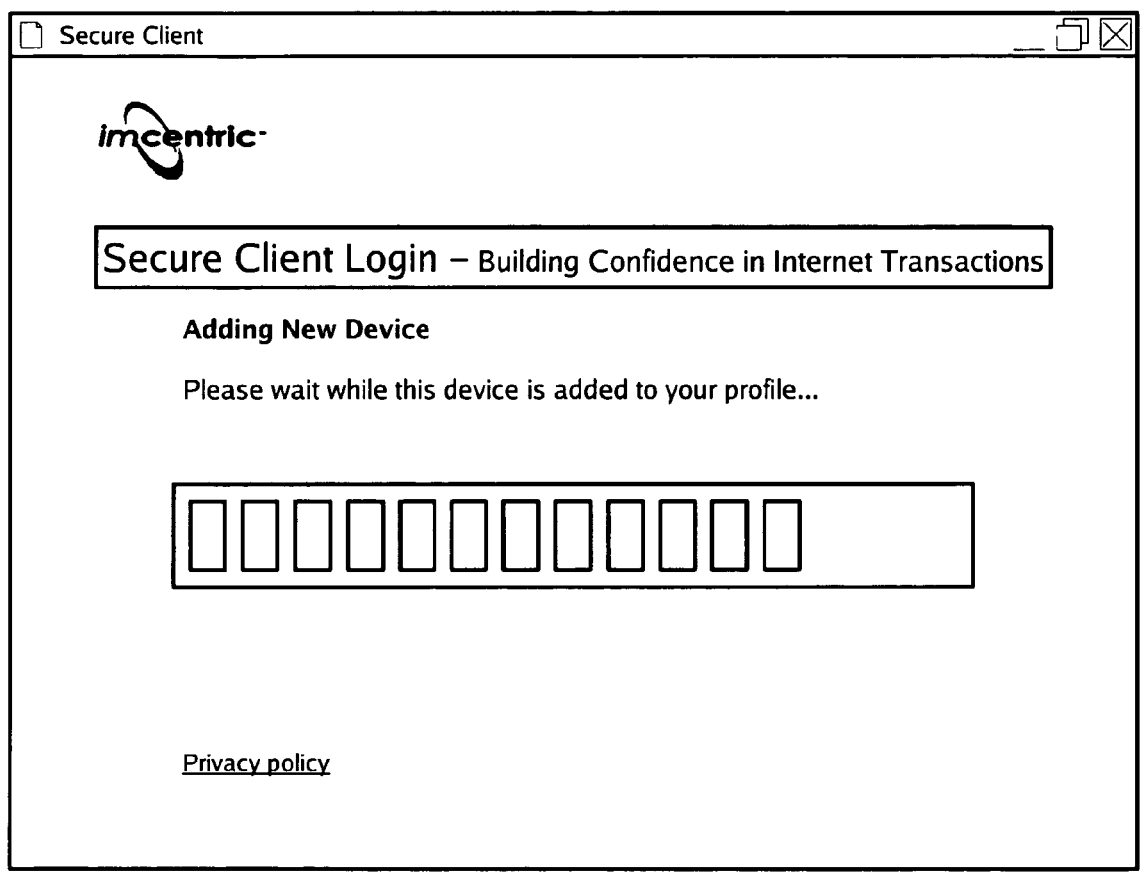

FIG. 56 shows a screen which would be presented to a user if the user had not registered the client device being used with the service. This may be discovered by the service by the absence of an appropriate digital certificate accessible to the agent downloaded and installed to the device as in FIGS. 49 through 53. In this case, the user is presented with a button (or other input) to add the present device to the list of trusted devices. If the user does so, the user is presented with a screen as shown in FIG. 57. The user is presented with a entry field for a mnemonic identifier for the device ("device name"), which is in this example "office computer." Also in the screen of FIG. 57, a list of registered devices is shown, which in this example indicates the user has registered his work PC, a PDA and a laptop. Following entry of the device identifier, the user may click the next button. If the user does this, a screen similar to that in FIG. 58 may be shown, indicating that processing is proceeding to register the device with the service. The processing registering the device might include generating a new certificate, or selecting a pre-generated certificate, and installing the certificate to the client device. The process may also include associating the entered device identifier with the certificate, and otherwise maintaining the user's profile.

Figure 59:
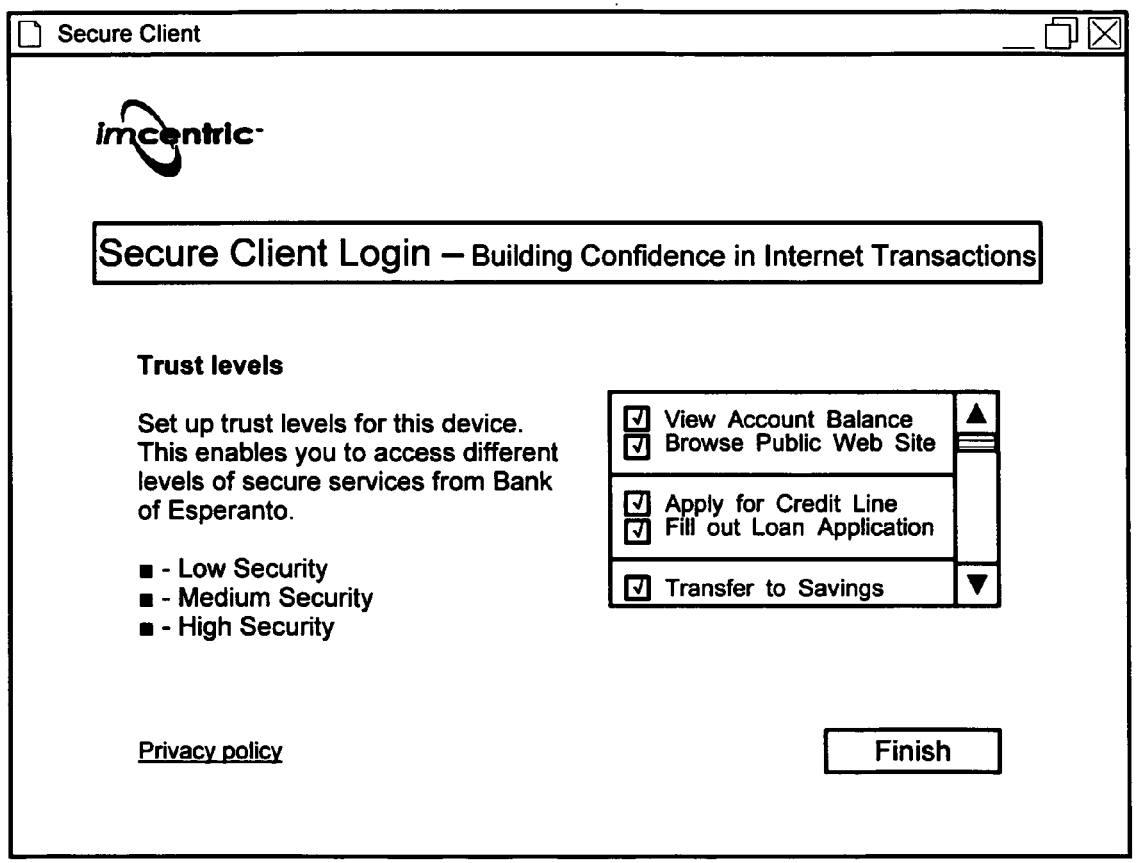
FIG. 59 shows a screen for specifying authorized actions for a client device in an exemplary secure client service.

In the exemplary service, each client device may be assigned trust levels, the selection of which is shown in FIG. 59. Trust levels permit the user to select activities which are authorized for clients which have been registered. In this example, those activities include viewing a bank account balance, browsing a public web site, applying for a credit line, completing a loan application, making a transfer to savings, making a transfer to checking, closing an account, and transferring funds over a certain amount. Following a user's selections, the finish button may be pressed to commit those selections. Also in the exemplary service, the trust level selections are not stored on client devices. Those selections are stored in a database managed by the service, though alternatively the selections might be maintained in a secure third-party system as well.

Figure 60:
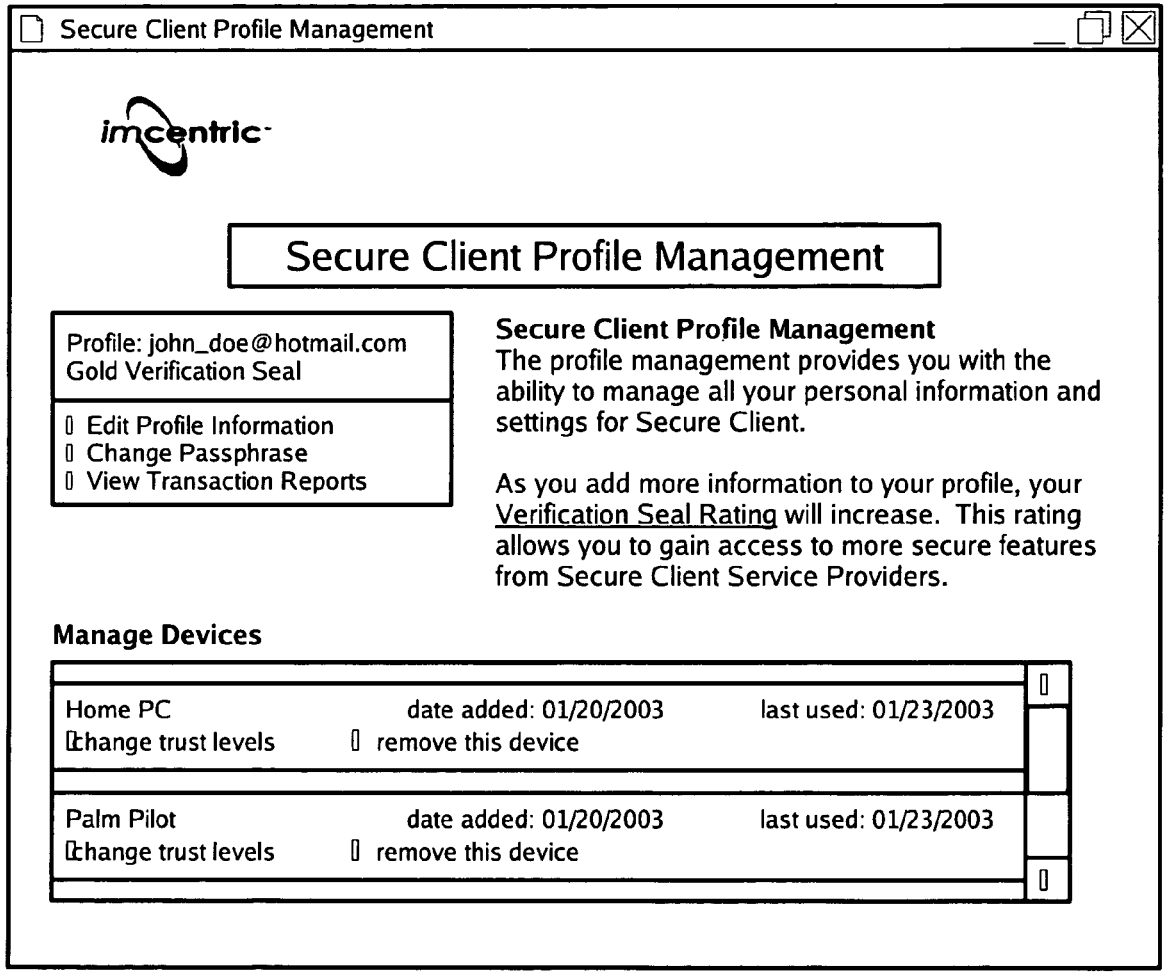
FIG. 60 shows a client device configuration selection screen of an exemplary secure client service.
Figure 61:
FIG. 61 shows a transaction report of an exemplary secure client service.

Depicted in FIG. 60 is a screen which is representative of a user's home screen in the exemplary service. Displayed on that screen is the user's profile, a list of registered devices, and a number of links for performing several management actions including edit the profile information, change the passphrase and a viewing of transaction reports. For each registered device, selections are provided for changing the trust levels associated with that device and a selection for removal of the device. Depicted in FIG. 61 is a screen representative of a transaction report. In the exemplary service, for each transaction a record is created including the date of the transaction, the provider involved in the transaction, the certificate authority providing the certificate used to sign the transaction, and various details of the particular transaction types.

Figure 62:
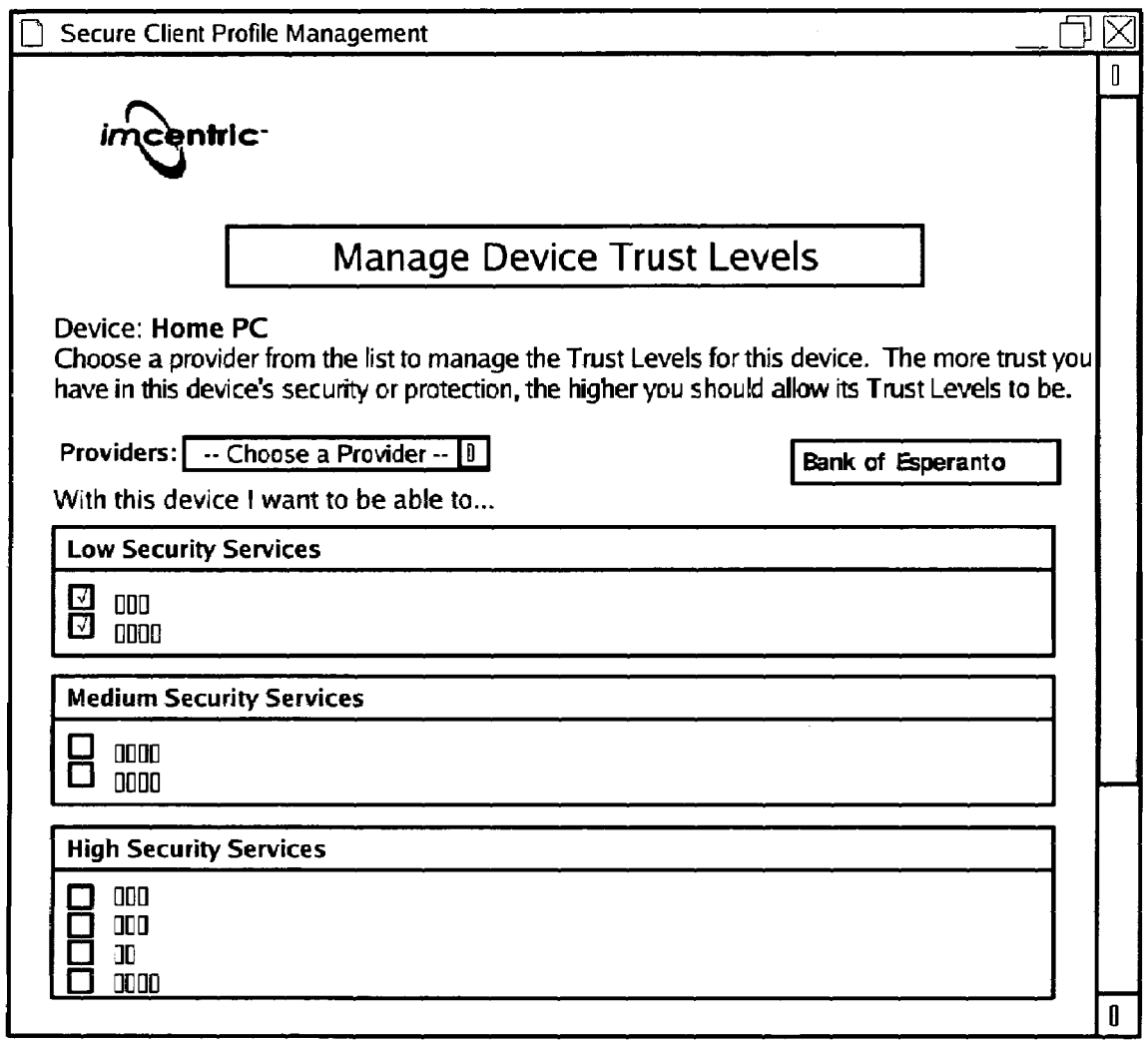
FIG. 62 shows a screen for specifying authorized actions for a client device and a provider in an exemplary secure client service.

Depicted in FIG. 62 is a screen representative of a screen provided in the exemplary service for selecting trust levels, in this case of the "home pc" client device. In this screen, not only may the user select the trust levels for the client device, but the user may also select trust levels for particular providers. A pull-down list is provided in this example to enter a user selection of a provider, the particular trust levels for that provider and device being shown and selectable below. A done button, not shown, may commit the selections for storage to the service provider.

Depicted in FIG. 63 is a screen provided by the exemplary service for the editing of user information, that information including a first, middle, and last name, an address, a home and work telephone number, and credit card information. In the example the information is subdivided into ratings sections, which are labeled bronze, silver and gold. Now a user is not required to enter information beyond the "bronze" level, which constitutes a minimal identification criteria for the service provider. As a user provides more information, the user may be assigned to higher ratings categories, and become eligible for enhanced benefits from the system. For example, a user may provide credit card information to authorize purchases from merchants through the system. The user may also be further made eligible for sweepstakes, prizes, discounts or rebates at higher ratings.

In the exemplary client authorization system above may provide for authentication of a user under the requirements that (1) the user is using a device made trusted earlier and (2) for transactions considered highly sensitive, that a username and password or other higher form of authentication be used. In the exemplary system above, it may not be necessary for a user to manage digital certificates, enrollments or digital signing dialogs, although the client system may provide for such activities for advanced use. Also in that system, a global certificate may be provided by the system to various service providers to sign online transactions, or several certificates may be created and stored at the client for signing transactions for several service providers. The exemplary system may also require confirmation by return email to add or remove a client device from the registration list. Additionally, an intruder must not only obtain a username and password to create a fraudulent transaction, but must also perform his actions from one of the registered client devices. This makes fraudulent activity much more difficult to accomplish than with present systems that rely only on a username and password for user identification.

Now although examples above may have included servers utilizing SSL or TLS protocols, the examples above may be modified as will be understood by those skilled in the art to encompass other protocols, such as message queuing systems, VPN systems, S/MIME systems, IPsec systems, code signatures, 802.11x EAP devices, encrypting file systems (EFS), and client web authenticators, as well as other server types and protocols. Likewise, the above examples have referenced web servers utilizing digital certificates. Those examples may also be modified to include other server types such as application servers, databases, SSL offloading devices, SSL accelerators, or any other type of server or device having the ability to utilize an SSL certificate to communicate securely over a network connection. The above examples have also made use of SSL certificates. Other types of certificates of varying formats and protocols may also be used in the above disclosed systems with minor modification to operate with virtually any conceivable public key infrastructure.

While a number of digital certificate discovery and management systems have been described and illustrated in conjunction with a number of specific configurations and methods, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

APPENDIX A

The following is a list of possible error codes, descriptions, and suggested resolutions.

| ERROR CODE | DESCRIPTION |
| --- | --- |
| 0 | Success |
| 100 | No results found for the given query |
| 101 | Could not insert row into table |
| 102 | Could not update the information in the table |
| 103 | The database query has failed |
| 1200 | Specified service was not found |
| 1201 | User is not authorized for this service |
| 1202 | Service file was not found |
| 1203 | Service is not active |
| 3000 | Failed to retrieve certificates |
| 3001 | Failed to process certificate |
| 3002 | Failed to post a CSR to the web site |
| 3003 | Failed approving certificate renewal on web site |
| 4000 | Could not find the first search string of the common name |
| 4001 | Could not find the second search string of the common name |
| 4002 | Could not find the first search string of the certificate |
| 4003 | Could not find the second search string of the certificate |
| 4004 | Could not find the common name |
| 4005 | Could not find the certificate |
| 4006 | Certificate extraction failed |
| 4007 | Could not save certificate. Check ID and common name |
| 4008 | Could not find \"C:\\Inetpub\\mailroot\\Drop\" folder |

-continued

| ERROR CODE | DESCRIPTION |
| --- | --- |
| 5000 | Could not establish a connection with the telnet server |
| 6000 | Could not create the CSR for this platform |
| 6001 | Could not install the Certification on the platform |
| 6500 | Exception in Create Csr |
| 6501 | Invalid initial login password |
| 6502 | Invalid password config |
| 6503 | Could not find the config-ssl prompt |
| 6504 | Sonicwall already in use elsewhere - could not connect to configure ssl interface |
| 6505 | Could not find the config-ssl-server prompt |
| 6527 | Exception in Install Certificate |
| 6528 | Invalid initial login password |
| 6529 | Invalid password config |
| 6530 | Could not find the config-ssl prompt |
| 6531 | Sonicwall already in use elsewhere - could not connect to configure ssl interface |
| 6600 | IPlanet Install Certificate: Document Complete Never Fired |
| 6601 | IPlanet Install Certificate: Invalid username or password |
| 6602 | IPlanet Install Certificate: Invalid certificate text |
| 6603 | IPlanet Install Certificate: Missing certificate text (the text was empty) |
| 6604 | IPlanet Install Certificate: Missing the key pair database password (the password was empty) |
| 6605 | IPlanet Install Certificate: Invalid key pair database password |
| 6606 | IPlanet Install Certificate: Could not find the Key Pair Password field on the HTML page |
| 6607 | IPlanet Install Certificate: Could not find the MessageText radio button on the HTML page |
| 6608 | IPlanet Install Certificate: Could not find the MessageText text area box on the HTML page |
| 6609 | IPlanet Install Certificate: Could not find the OK button to install the certificate on the HTML page |
| 6610 | IPlanet Install Certificate: Could not find the Replace button to confirm the install on the HTML page |
| 6611 | IPlanet Install Certificate: Could not find the Server On button to restart the server |
| 6612 | IPlanet Install Certificate: The automation did not occur or was not completed successfully. (m_bIsFinished was already true) |
| 6613 | IPlanet Install Certificate: Could not find the Add Server Certificate Button |
| 6614 | IPlanet Install Certificate: Alias value not found in select box |
| 6615 | IPlanet Install Certificate: Navigation to admin page failed. Possible heavy internet traffic or no network connection. |
| 6616 | IPlanet Install Certificate: Navigation to install certificate page failed. Possible heavy internet traffic or no network connection. |
| 6617 | IPlanet Install Certificate: Server user name blank |
| 6618 | IPlanet Install Certificate: Server password blank |
| 6619 | IPlanet Install Certificate: IP address blank |
| 6620 | IPlanet Install Certificate: Secure server name blank |
| 6621 | IPlanet Install Certificate: Key pair password blank |
| 6622 | IPlanet Install Certificate: Certificate text blank |
| 6623 | IPlanet Install Certificate: Navigation to confirmation page failed. Possible heavy internet traffic or no network connection. |
| 6624 | IPlanet Install Certificate: Replace certificate confirmation window not found |
| 6625 | IPlanet Install Certificate: Add certificate confirmation window not found |
| 6626 | IPlanet Install Certificate: Alias blank |
| 6090 | Verisign Retrieve Organization: Navigation to main page failed. Possible heavy internet traffic or no network connection. |
| 6091 | Verisign Retrieve Organization: Error retrieving data collection of organization information |
| 6100 | Verisign Post CSR: Document Complete never fired |
| 6101 | Verisign Post CSR: Automation did not complete (m_bIsFinished == true) |
| 6102 | Verisign Post CSR: Missing the First Name parameter |
| 6103 | Verisign Post CSR: A duplicate CSR was posted to Verisign's site which cannot be issued |
| 6104 | Verisign Post CSR: Missing the Last name parameter |
| 6105 | Verisign Post CSR: Invalid email format, must be in format user@mail.com |
| 6106 | Verisign Post CSR: Missing Challenge Phrase |
| 6107 | Verisign Post CSR: Missing the Organization Name |
| 6108 | Verisign Post CSR: Invalid Organization Name |
| 6109 | Verisign Post CSR: Invalid CSR Text or missing CSR Text Fields |
| 6110 | Verisign Post CSR: Verisign MPKI URL blank |
| 6111 | Verisign Post CSR: First Name blank |
| 6112 | Verisign Post CSR: Last Name blank |
| 6113 | Verisign Post CSR: Contact email blank |
| 6114 | Verisign Post CSR: Challenge phrase blank |
| 6115 | Verisign Post CSR: Missing CSR text |
| 6116 | Verisign Post CSR: Additional Fields data table NULL |
| 6117 | Verisign Post CSR: Navigation to post CSR page has failed. Possible heavy internet traffic or no network connection. |
| 6118 | Verisign Post CSR: Could not find text field for CSR text |

-continued

| ERROR CODE | DESCRIPTION |
|---|---|
| 6119 | Verisign Post CSR: Could not find text field for First Name |
| 6120 | Verisign Post CSR: Could not find text field for Last Name |
| 6121 | Verisign Post CSR: Could not find text field for Email address |
| 6122 | Verisign Post CSR: Could not find text field for Challenge Phrase |
| 6123 | Verisign Post CSR: Could not find text field for Challenge Phrase confirm |
| 6124 | Verisign Post CSR: Could not find drop down box for Application Server Type |
| 6125 | Verisign Post CSR: Your challenge phrase and reconfirmation do not match. |
| 6126 | Verisign Post CSR: Please enter a valid IP Address. |
| 6127 | Verisign Post CSR: Error finding additional fields |
| 6128 | Verisign Post CSR: Navigation to CSR Result page failed. Possible heavy internet traffic or no network connection. |
| 6129 | Verisign Post CSR: Could not find additional fields |
| 6130 | Verisign Post CSR: One or more additional fields has invalid data. The information entered should contain only alphabetical or numerical characters . . . |
| 6131 | Verisign Post CSR: Unable to start up and connect a browser instance. |
| 6132 | Verisign Post CSR: Unable to Navigate the browser. |
| 6133 | Verisign Post CSR: An error occurred while checking for 'First Name' error message. |
| 6134 | Verisign Post CSR: An error occurred while checking for 'Last Name' error message. |
| 6135 | Verisign Post CSR: An error occurred while checking for an invalid email format error message. |
| 6136 | Verisign Post CSR: An error occurred while checking for the Challenge Phrase error message. |
| 6137 | Verisign Post CSR: An error occurred while checking for the company name error message. |
| 6138 | Verisign Post CSR: An error occurred while checking for an invalid Organization Name error message. |
| 6139 | Verisign Post CSR: An error occurred while checking for Invalid CSR Text error message. |
| 6140 | Verisign Post CSR: An error occurred while checking for duplicate cert error message. |
| 6141 | Verisign Post CSR: An error occurred while checking to see if the Enrollment of the CSR Text was complete. |
| 6142 | Verisign Post CSR: An unknown error occurred while posting the CSR Text. Unable to confirm if Enrollment was complete. |
| 6143 | Verisign Post CSR: Invalid CA type passed to Postcard |
| 6650 | Entrust Retrieve Domains: The automation did not occur or was not completed successfully. |
| 6651 | Entrust Retrieve Domains: Document Complete Never Fired |
| 6652 | Entrust Retrieve Domains: Username/ID box not found on login page |
| 6653 | Entrust Retrieve Domains: Password field not found on login page |
| 6654 | Entrust Retrieve Domains: Login button not found on login page |
| 6655 | Entrust Retrieve Domains: Username or password not valid |
| 6656 | Entrust Retrieve Domains: Less than two select boxes were found on contract information page. |
| 6657 | Entrust Retrieve Domains: More than two select boxes were found on contract information page. |
| 6658 | Entrust Retrieve Domains: Could not find the Domain Information select box. |
| 6659 | Entrust Retrieve Domains: The User Id passed to Entrust Retrieve Domains was blank |
| 6660 | Entrust Retrieve Domains: The Password passed to Entrust Retrieve Domains was blank |
| 6661 | Entrust Retrieve Domains: Could not complete navigation to Logon page |
| 6662 | Entrust Retrieve Domains: Could not complete navigation to Management page |
| 6663 | Entrust Retrieve Domains: Could not complete navigation to Contract Information page |
| 6675 | Entrust Retrieve Organization Names: The automation did not occur or was not completed successfully. |
| 6676 | Entrust Retrieve Organization Names: Document Complete Never Fired |
| 6677 | Entrust Retrieve Organization Names: Username/ID box not found on login page |
| 6678 | Entrust Retrieve Organization Names: Password field not found on login page |
| 6679 | Entrust Retrieve Organization Names: Login button not found on login page |
| 6680 | Entrust Retrieve Organization Names: Username or password not valid |
| 6681 | Entrust Retrieve Organization Names: Less than two select boxes were found on contract information page. |
| 6682 | Entrust Retrieve Organization Names: More than two select boxes were found on contract information page. |
| 6683 | Entrust Retrieve Organization Names: Could not find the Organization Name select box |
| 6684 | Entrust Retrieve Organization Names: The User Id passed to Entrust Retrieve Organization Names was blank |
| 6685 | Entrust Retrieve Organization Names: The Password passed to Entrust Retrieve Organization Names was blank |
| 6686 | Entrust Retrieve Organization Names: Could not complete navigation to Logon page |

-continued

| ERROR CODE | DESCRIPTION |
|---|---|
| 6689 | Entrust Retrieve Organization Names: Could not complete navigation to Management page |
| 6690 | Entrust Retrieve Organization Names: Could not complete navigation to Contract Information page |
| 6700 | IPlanet Create CSR: Document Complete Never Fired |
| 6701 | IPlanet Create CSR: Could not find the CA Email Address field on the main HTML page |
| 6702 | IPlanet Create CSR: Could not find the Key Pair database field on the main HTML page |
| 6703 | IPlanet Create CSR: Could not find the Requestor Name field on the main HTML page |
| 6704 | IPlanet Create CSR: Could not find the Telephone Number field on the main HTML page |
| 6705 | IPlanet Create CSR: Could not find the Common Name field on the main HTML page |
| 6706 | IPlanet Create CSR: Could not find the Email Address field on the main HTML page |
| 6707 | IPlanet Create CSR: Could not find the Organization field on the main HTML page |
| 6708 | IPlanet Create CSR: Could not find the Organization Unit field on the main HTML page |
| 6709 | IPlanet Create CSR: Could not find the Locality field on the main HTML page |
| 6710 | IPlanet Create CSR: Could not find the State or Province field on the main HTML page |
| 6711 | IPlanet Create CSR: Could not find the Country field on the main HTML page |
| 6712 | IPlanet Create CSR: Could not find the OK button on the main HTML page |
| 6713 | IPlanet Create CSR: Invalid UserName or Password |
| 6714 | IPlanet Create CSR: Missing the CA Email Address (the text was empty) |
| 6715 | IPlanet Create CSR: Missing the Key Pair Database Password (the text was empty) |
| 6716 | IPlanet Create CSR: Invalid Key Pair Database Password |
| 6717 | IPlanet Create CSR: Missing the Requestor Name (the text was empty) |
| 6718 | IPlanet Create CSR: Missing the Telephone Number (the text was empty) |
| 6719 | IPlanet Create CSR: Missing the Common name (the text was empty) |
| 6720 | IPlanet Create CSR: Missing the Email Address (the text was empty) |
| 6721 | IPlanet Create CSR: Missing the Organization Name (the text was empty) |
| 6722 | IPlanet Create CSR: Missing the Country (the text was empty) |
| 6723 | IPlanet Create CSR: Invalid Country (only a single letter was entered - must be two letters) |
| 6724 | IPlanet Create CSR: The automation did not occur or was not completed successfully. (m__bIsFinished was already true) |
| 6725 | IPlanet Create CSR: Invalid Country Code. |
| 6726 | IPlanet Create CSR: Alias value not found in select box |
| 6727 | IPlanet Create CSR: Trust database has not been initialized |
| 6728 | IPlanet Create CSR: User name blank |
| 6729 | IPlanet Create CSR: Password blank |
| 6730 | IPlanet Create CSR: IP Address blank |
| 6731 | IPlanet Create CSR: Secure server name blank |
| 6732 | IPlanet Create CSR: Common name blank |
| 6733 | IPlanet Create CSR: Organization name blank |
| 6734 | IPlanet Create CSR: Organization unit blank |
| 6735 | IPlanet Create CSR: City blank |
| 6736 | IPlanet Create CSR: State blank |
| 6737 | IPlanet Create CSR: Country blank |
| 6738 | IPlanet Create CSR: Contact email blank |
| 6739 | IPlanet Create CSR: Contact first name blank |
| 6740 | IPlanet Create CSR: Contact last name blank |
| 6741 | IPlanet Create CSR: Contact work phone number blank |
| 6742 | IPlanet Create CSR: Key pair password blank |
| 6743 | IPlanet Create CSR: Navigation to admin page failed. Possible heavy internet traffic or no network connection. |
| 6744 | IPlanet Create CSR: Invalid secure server name |
| 6745 | IPlanet Create CSR: Navigation to create CSR page failed. Possible heavy internet traffic or no network connection. |
| 6746 | IPlanet Create CSR: Navigation to CSR page failed. Possible heavy internet traffic or no network connection. |
| 6747 | IPlanet Create CSR: Error retrieving CSR |
| 6748 | IPlanet Create CSR: Invalid length for the common name |
| 6749 | IPlanet Create CSR: Alias blank |
| 6750 | IPlanet Create CSR: Could not find alias field |
| 6751 | IPlanet Create CSR: Could not find alias value |
| 6760 | Entrust Verify Login: The automation did not occur or was not completed successfully. (m__bIsFinished was already true) |
| 6761 | Entrust Verify Login: Document Complete Never Fired |
| 6762 | Entrust Verify Login: Username/ID box not found on login page |
| 6763 | Entrust Verify Login: Password field not found on login page |
| 6764 | Entrust Verify Login: Login button not found on login page |

-continued

| ERROR CODE | DESCRIPTION |
|---|---|
| 6765 | Entrust Verify Login: Username or password not valid |
| 6766 | Entrust Verify Login: The User Id passed to Entrust Verify Login was blank |
| 6767 | Entrust Verify Login: The Password passed to Entrust Verify Login was blank |
| 6768 | Entrust Verify Login: Could not complete navigation to Logon page |
| 6769 | Entrust Verify Login: Could not complete navigation to Management page |
| 6775 | Verisign Approve: Document Complete Never Fired |
| 6776 | Verisign Approve: Could not find the Process Requests link on the main HTML page |
| 6777 | Verisign Approve: Could not find the Continue button on the HTML page |
| 6778 | Verisign Approve: The automation did not occur or was not completed successfully. (m_bIsFinished was already true) |
| 6779 | Verisign Approve: Common name was not found |
| 6780 | Verisign Approve: Approve link was not found |
| 6781 | Verisign Approve: Could not complete navigation to main MPKI page. Possible heavy internet traffic or no network connection. |
| 6782 | Verisign Approve: Could not complete navigation to Process Requests (approval) page. Possible heavy internet traffic or no network connection. |
| 6783 | Verisign Approve: Could not complete navigation to approval result page. Possible heavy internet traffic or no network connection. |
| 6784 | Verisign Approve: Could not complete navigation to next approval page. Possible heavy internet traffic or no network connection. |
| 6785 | Verisign Retrieve Organization Names: Could not find the organization names 'Org:' label |
| 6786 | Verisign Retrieve Organization Names: Document complete did not fire |
| 6787 | Verisign Retrieve Organization Names: Error occurred during retrieval of names from elements on page |
| 6788 | Verisign Retrieve Organization Names: Could not complete navigation to Verisign's main MPKI page. Possible heavy internet traffic or no network connection. |
| 6790 | Verisign retrieve organization names: Unable to start up and connect a browser instance. |
| 6791 | Verisign retrieve organization names: Unable to Navigate the browser. |
| 6792 | Verisign retrieve organization names: An error occurred while searching for the OrgName label. |
| 6800 | Autocert Utilities Service: Verisign certificate is neither a standard nor global certificate. |
| 6801 | Autocert Utilities Service: Unable to update the standard mpki url to the Certificate Authority table. |
| 6802 | Autocert Utilities Service: Unable to update the global mpki url to the Certificate Authority table. |
| 6803 | Autocert Utilities Service: Unable to delete the domain name from the domain verification table. |
| 6804 | Autocert Utilities Service: Unable to insert the domain name to the domain verification table. |
| 6805 | Autocert Utilities Service: Unable to delete the organization name from the organization verification table. |
| 6806 | Autocert Utilities Service: Unable to insert the organization name to the organization verification table. |
| 6807 | Autocert Utilities Service: Initialization of WinINet functions failed. |
| 6808 | Autocert Utilities Service: Failed to establish session with web site. |
| 6809 | Autocert Utilities Service: Failed to create Http request handle. |
| 6810 | Autocert Utilities Service: Failed to retrieve certificate from store. Verify certificate is installed. |
| 6811 | Autocert Utilities Service: Failed to attach certificate to http request. |
| 6812 | Autocert Utilities Service: SPC system store failed to open. |
| 6813 | Autocert Utilities Service: Failed to send request to server. |
| 6814 | Autocert Utilities Service: Global certificate file not uploaded. Upload certificate before retrieving information. |
| 6815 | Autocert Utilities Service: Standard server certificate file not uploaded. Upload certificate before retrieving information. |
| 6816 | Autocert Utilities Service: Could not find Verisign standard account information. Verify correct certificate was uploaded. |
| 6817 | Autocert Utilities Service: Could not find Verisign global account information. Verify correct certificate was uploaded. |
| 6818 | Entrust Post CSR: The User Id passed to Entrust Post Csr was blank. |
| 6819 | Entrust Post CSR: The Password passed to Entrust Post Csr was blank |
| 6820 | Entrust Post CSR: The Certificate Id passed to Entrust Post Csr was blank |
| 6821 | Entrust Post CSR: The Organization name passed to Entrust Post Csr was blank |
| 6822 | Entrust Post CSR: The Csr passed to Entrust Post Csr was blank |
| 6823 | Entrust Post CSR: The UserID edit box on the login page could not be found. |
| 6824 | Entrust Post CSR: The Password edit box on the login page could not be found. |
| 6825 | Entrust Post CSR: The Log in button on the login page could not be found. |
| 6826 | Entrust Post CSR: The Create/Renew button on the status page could not be found. |
| 6827 | Entrust Post CSR: The Organization Name select box could not be found on the Create/Renue page. |

-continued

| ERROR CODE | DESCRIPTION |
|---|---|
| 6828 | Entrust Post CSR: The Certificate Type select box could not be found on the Create/Renue page. |
| 6829 | Entrust Post CSR: The Standard option could not be found as a selection in the Certificate Type select box on the Crate/Renue page. |
| 6830 | Entrust Post CSR: The Create Certificate button could not be found on the Create/Renew page. |
| 6831 | Entrust Post CSR: The Certificate signing request text area could not be found on the Create/Renew page. |
| 6832 | Entrust Post CSR: The Tracking information edit box could not be found on the Create/Renew page. |
| 6833 | Entrust Post CSR: The Confirm button was not found on the confirmation page. |
| 6834 | Entrust Post CSR: The CSR provided has already been posted, duplicate csr. |
| 6835 | Entrust Post CSR: The CSR does not begin with -----BEGIN (five dashes and BEGIN) which is required by Entrust. |
| 6836 | Entrust Post CSR: The CSR if for an invalid domain. |
| 6837 | Entrust Post CSR: The CSR has an invalid country code. |
| 6838 | Entrust Post CSR: The company is using all of its SSL Server Certificates. |
| 6850 | Entrust Post CSR: Document Complete did not fire |
| 6851 | Entrust Post CSR: could not complete automation. |
| 6852 | Entrust Post CSR: An invalid UserId or Password was used. |
| 6853 | Entrust Post CSR: Could not complete navigation to Logon page |
| 6854 | Entrust Post CSR: Could not complete navigation to certificate management page |
| 6855 | Entrust Post CSR: Could not complete navigation to post CSR page |
| 6856 | Entrust Post CSR: Could not complete navigation to post CSR confirmation page |
| 6857 | Entrust Post CSR: Could not complete navigation to post CSR finished page |
| 6858 | Entrust Post CSR: Confirmation page not found |
| 6859 | Entrust Post CSR: Unable to navigate to Login Page |
| 6861 | Entrust Post CSR: Unable to Locate the Username Element in any of the Frames of the Web Browser Document. |
| 6862 | Entrust Post CSR: Unable to authenticate the login. The username and/or password are incorrect or refused by Entrust. |
| 6863 | Entrust Post CSR: Unable to start up and connect a browser instance. |
| 6864 | Entrust Post CSR: An error occurred while searching for the CSR header sting in the Html text from the WebBrowser document. |
| 6865 | Entrust Post CSR: An error occurred while searching for the Tracking label string in the Html text from the WebBrowser document. |
| 6866 | Entrust Post CSR: An error occurred while checking if the CSR is a duplicate. |
| 6875 | Entrust Post CSR: An error occurred while checking the CSR for five dashes |
| 6876 | Entrust Post CSR: An error occurred while checking if all the SSL Server Certs have been used for the login account. |
| 6877 | Entrust Approve Certificate: Document Complete Never Fired |
| 6878 | Entrust Approve Certificate: The automation did not occur or was not completed successfully. (m__bIsFinished was already true) |
| 6879 | Entrust Approve Certificate: Username/ID box not found on login page |
| 6880 | Entrust Approve Certificate: Password field not found on login page |
| 6881 | Entrust Approve Certificate: Login button not found on login page |
| 6882 | Entrust Approve Certificate: Username or password not valid |
| 6883 | Entrust Approve Certificate: Certificate was not found |
| 6884 | Entrust Approve Certificate: The User Id passed to Entrust Approve Certificate was blank |
| 6885 | Entrust Approve Certificate: The Password passed to Entrust Approve Certificate was blank |
| 6886 | Entrust Approve Certificate: The Certificate Id passed to Entrust Approve Certificate was blank |
| 6887 | Entrust Approve Certificate: Could not complete navigation to Logon page |
| 6888 | Entrust Approve Certificate: Could not complete navigation to certificate management page |
| 6889 | Entrust Approve Certificate: Could not find 'Ready' text in the TR tag |
| 6890 | Entrust Approve Certificate: Could not find Entrust generated tracking id |
| 6891 | Entrust Approve Certificate: Could not find Ready link with Entrust generated tracking id |
| 6892 | Entrust Approve Certificate: Could not complete navigation to Csr Posting Finished page |
| 6900 | Entrust Retrieve Certificate: Document Complete did not fire |
| 6901 | Entrust Retrieve Certificate: Automation did not complete |
| 6902 | Entrust Retrieve Certificate: Could not find the Unique Id field on the Entrust Login frame |
| 6903 | Entrust Retrieve Certificate: Could not find the Password field on the Entrust Login frame |
| 7000 | Entrust Retrieve Certificate: Could not find the Log in button |
| 7001 | Entrust Retrieve Certificate: Invalid Entrust Username or Password |
| 7002 | Entrust Retrieve Certificate: Certificate id was not found |
| 8000 | Entrust Retrieve Certificate: Could not find the BEGIN CERTIFICATE or END CERTIFICATE identifiers |
| 8001 | Entrust Retrieve Certificate: Could not find the Certificate page section identifier |
| 8002 | Entrust Retrieve Certificate: The User Id passed to Entrust Retrieve Certificate was blank |

-continued

| ERROR CODE | DESCRIPTION |
|---|---|
| 8010 | Entrust Retrieve Certificate: The Password passed to Entrust Retrieve Certificate was blank |
| 9003 | Entrust Retrieve Certificate: The Certificate Id passed to Entrust Retrieve Certificate was blank |
| 9011 | Entrust Retrieve Certificate: Could not complete navigation to Logon page |
| 9012 | Entrust Retrieve Certificate: Could not complete navigation to Management page |
| 9013 | Entrust Retrieve Certificate: Could not find active text |
| 9014 | Entrust Retrieve Certificate: Could not find tracking ID |
| 9015 | Entrust Retrieve Certificate: Could not find active link |
| 9016 | Entrust Retrieve Certificate: Could not complete navigation to Finish page |
| 9017 | IIS 6.0: Could not create the private key |
| 9018 | IIS 6.0: Could not create the CSR |
| 9019 | IIS 6.0: Could not create the PFX |
| 9020 | IIS 6.0: Could not install the PFX |
| 9021 | AutocertMonitor: An exception occurred while calling the auto-update web service |
| 9022 | AutocertMonitor: Error loading local xml manifest document |
| 9023 | AutocertMonitor: Error occurred during LoadManifest call |
| 9024 | SMImport: Error connecting to csv file. Check file location. |
| 9025 | SMImport: Data type(s) incorrect in csv file. Check numerical data. |
| 9026 | SMImport: Data format incorrect in csv file. Verify that data in each field is correctly formatted. |
| 9027 | SMCertificate: Unable to update the Valid From and To dates in the Database |
| 9028 | ACLog: Could not get log configuration |
| 9029 | SMCertificate: Could not get certificate |
| 9030 | SMCertificate: Could not get certificates by status code |
| 9031 | SMCertificate: Could not get and sort certificates by status code |
| 9032 | SMCertificate: Could not get certificates in renewal window |
| 9033 | SMCertificate: Could not get all certificates |
| 9034 | SMCertificate: Could not get and sort all certificates |
| 9035 | SMCertificate: Could not get all certificates over max attempt number |
| 9036 | SMCertificate: Could not get and sort all certificates over max attempt number |
| 9041 | SMCertificate: Could not get generated CSR data |
| 9042 | SMCertificate: Could not insert certificate |
| 9043 | SMCertificate: Could not update certificate |
| 9044 | SMCertificate: Could not update certificate edited by the user |
| 9045 | SMCertificate: Could not update the certificate csr text |
| 9046 | SMCertificate: Could not update the certificate active flag |
| 9047 | SMCertificate: Could not update the certificate status code |
| 9048 | SMCertificate: Could not update the certificate attempt count |
| 9049 | SMCertificate: Could not update the certificate text |
| 9050 | SMCertificate: Could not update certificate private key text |
| 9051 | SMCertificate: Could not update certificate valid from/to date |
| 9052 | SMCertificate: Could not get certificate ID by common name |
| 9053 | SMCertificate: No certificate given to split |
| 9054 | SMCertificate: Unable to retrieve all custom field titles |
| 9055 | SMCertificate: Unable to get all custom fields |
| 9056 | SMCertificate: Unable to read valid dates from certificate text |
| 9061 | SMCertificate: Could not update the certificate CA tracking value |
| 9062 | SMCertificate: Count not get certificates in process |
| 9063 | SMCertificateAuthority: Could not get all certificate authorities |
| 9064 | SMCertificateAuthority: Could not get certificate authority |
| 9065 | EXCEPTION_SMCERTIFICATEAUTHORITY_GETCERTIFICATEAUTHOR-ITYSETUPCOMPLETESORT |
| 9066 | SMCertificateAuthority: Could not update certificate authority setup complete |
| 9067 | SMCertificateAuthority: Could not update certificate authority username and password |
| 9068 | SMCertificateAuthority: Could not update certificate authority post csr url |
| 9069 | SMCertificateAuthority: Could not get any certificate authority setup complete |
| 9071 | SMCertificateAuthority: Could not get domain verifications by CA |
| 9072 | SMCertificateAuthority: Could not insert domain verification |
| 9073 | SMCertificateAuthority: Could not delete domain verification |
| 9081 | SMCertificateAuthority: Could not get organization verifications by CA |
| 9091 | SMCertificateAuthority: Could not insert organization verification |
| 9092 | SMCertificateAuthority: Could not delete organization verification |
| 9093 | SMCertificateAuthority: Could not get Entrust domain organization verification |
| 9094 | SMCertificateAuthority: Could not get semaphore error code |
| 9095 | SMCertificateAuthority: Could not update semaphore error code |
| 9096 | SMContact: Could not update contact |
| 9097 | SMContact: Could not update contact active flag |
| 9098 | SMContact: Could not insert contact |
| 9099 | SMContact: Could not get all contacts |
| 9101 | SMContact: Could not get and sort all contacts |
| 9102 | SMContact: Could not get contact |
| 9103 | SMContact: Could not get contact by certificate serial number |
| 9104 | SMContact: Could not get contact certificate serial number |
| 9105 | SMContact: Could not verify user rights |

-continued

| ERROR CODE | DESCRIPTION |
| --- | --- |
| 9106 | SMDatabase: Could not backup database |
| 9107 | SMDatabase: Could not restore database |
| 9108 | SMDatabase: Unable to get all status codes |
| 9112 | SMMailParse: Could not process mail |
| 9113 | SMServer: Could not get all servers |
| 9114 | SMServer: Could not get all server type codes |
| 9115 | SMServer: Could not get and sort all servers |
| 9116 | SMServer: Could not get server |
| 9117 | SMServer: Could not insert server |
| 9118 | SMServer: Could not update the server active flag |
| 9121 | SMServer: Could not update server |
| 9122 | SMServer: Could not get server type code by certificate ID |
| 9123 | SMServer: Could not get server type code |
| 9124 | SMSettings: Could not get all settings |
| 9125 | SMSettings: Could not get settings |
| 9126 | SMSettings: Could not update settings critical error email |
| 9127 | SMSettings: Could not update settings database backup path |
| 9128 | SMSettings: Could not update settings database last backup date |
| 9129 | SMSettings: Could not update settings database last backup path |
| 9130 | SMSettings: Could not update settings database backup interval |
| 9131 | SMSettings: Could not update settings proxy server address |
| 9132 | SMSettings: Could not get settings critical error email |
| 9133 | SMSettings: Could not get settings database backup path |
| 9134 | SMSettings: Could not get settings max attempt number |
| 9135 | SMSettings: Could not get settings automation interval |
| 9136 | SMSettings: Could not get settings server email |
| 9137 | SMSettings: Could not get settings database backup interval |
| 9231 | SMSettings: Could not get settings proxy server address |
| 9232 | ACCryptography: Could not install verisign admin certificate |
| 9233 | ACCryptography: Could not remove verisign admin certificate |
| 9234 | ACCryptography: Exception occurred while reading pfx file |
| 9235 | ACCryptography: Not a valid pfx file |
| 9141 | ACCryptography: Incorrect password |
| 9142 | ACCryptography: Opening of pfx file failed |
| 9143 | ACCryptography: 'MY' system store failed to open in InstallVerisignAdminCertificate |
| 9144 | ACCryptography: Import of certificate to 'MY' store failed |
| 9145 | ACCryptography: Empty parameter for file path passed to InstallVerisignAdminCertificate |
| 9146 | ACCryptography: Empty parameter for password passed to InstallVerisignAdminCertificate |
| 9147 | ACCryptography: 'MY' system store failed to open in Remove VerisignAdminCertificate |
| 9148 | ACCryptography: Failed to remove certificates from 'MY' store |
| 9149 | ACCryptography: Exception occurred while reading pfx file |
| 9150 | ACCryptography: Not a valid pfx file |
| 9151 | ACCryptography: Incorrect password |
| 9152 | ACCryptography: Empty parameter for file path passed to VerifyPfxFile |
| 9160 | ACCryptography: Empty parameter for password passed to VerifyPfxFile |
| 9161 | ACTelnet: Could not receive from server |
| 9162 | ACTelnet: Could not send to server |
| 9163 | ACTelnet: Could not process options |
| 9164 | ACTelnet: Could not respond to options |
| 9165 | ACTelnet: Could not arrange reply |
| 9166 | AutoCertService: Exception in Main( ) |
| 9167 | AutoCertService: Unable to get expiring certificates |
| 9171 | AutoCertService: Unable to generate CSR |
| 9172 | AutoCertService: Unable to post CSR |
| 9173 | AutoCertService: Manual bulk approval failed |
| 9174 | AutoCertService: Unable to approve certificates |
| 9200 | AutoCertService: Unable to retrieve certificates |
| 9201 | AutoCertService: Unable to split certificates |
| 9202 | AutoCertService: Unable to install certificates |
| 9203 | AutoCertService: Unable to verify certificates |
| 9204 | AutoCertService: Unable to set proxy settings |
| 9205 | AutoCertService: Unable to set proxy settings |
| 9206 | Unable to connect to server while creating csr |
| 9207 | Exiting create csr |
| 9208 | Unable to connect to server while installing certificate |
| 9209 | Installation of certificate failed |
| 9210 | Unable to connect to server while creating csr |
| 9211 | Exiting create csr |
| 9212 | Unable to connect to server while installing certificate |
| 9213 | Installation of certificate failed |
| 9214 | Access denied, Please check the username and password (for the Certificate Authority) and try again |
| 9215 | Unable to retrieve the certificate |

-continued

| ERROR CODE | DESCRIPTION |
|---|---|
| 9216 | Unable to approve the certificate |
| 9217 | Unable to post the CSR |
| 9450 | Common name exceeded maximum length |
| 9451 | Domain name must be at the end of the common name |
| 9501 | ServerID not found |
| 9502 | ContactID not found |
| 9503 | Server email not found |
| 9511 | SMCertificateAuthority: Domain Name already exists in the database |
| 9512 | SMCertificateAuthority: Organization Name already exists in the database |
| 9521 | SMCertificate: No certificate given to split |
| 9522 | SMCertificate: Server certificate not found |
| 9600 | Verisign Global Setup: Error occurred while stopping service. |
| 9601 | Verisign Global Setup: Error occurred while starting service. |
| 9602 | Verisign Standard Setup: Error occurred while stopping service. |
| 9603 | Verisign Standard Setup: Error occurred while starting service. |
| 9604 | Command prompt not received after terminal type input |
| 9605 | Command 'genconf' common name prompt not received |
| 9606 | Command 'genconf' country name prompt not received |
| 9607 | Command 'genconf' state prompt not received |
| 9608 | Command 'genconf' city prompt not received |
| 9609 | Command 'genconf' organization name prompt not received |
| 9610 | Command 'genconf' organizational unit prompt not received |
| 9611 | Command 'genconf' Are these correct? prompt not received |
| 9612 | Command 'genconf' command prompt not received |
| 9613 | Command 'genkey' key file already exists |
| 9614 | Command 'genkey' Are these correct? prompt not received |
| 9615 | Command 'genkey' country name prompt not received |
| 9616 | Command 'genkey' state prompt not received |
| 9617 | Command 'genkey' city prompt not received |
| 9618 | Command 'genkey' organization name prompt not received |
| 9619 | Command 'genkey' organizational unit prompt not received |
| 9620 | Command 'genkey' common name prompt not received |
| 9621 | Command 'genkey' second country name prompt not received |
| 9622 | Command 'genkey' second state prompt not received |
| 9623 | Command 'genkey' second city prompt not received |
| 9624 | Command 'genkey' second organization name prompt not received |
| 9625 | Command 'genkey' second organizational unit prompt not received |
| 9626 | Command 'genkey' second common name prompt not received |
| 9627 | Command 'genkey' second hit return prompt not received |
| 9628 | Command 'genkey' encrypt prompt not received |
| 9629 | Command 'genkey' passphrase prompt not received |
| 9630 | Command 'genkey' verify passphrase prompt not received |
| 9631 | Command 'genkey' command prompt not received after verify passphrase |
| 9632 | Command 'cat' command prompt not received |
| 9633 | Command prompt not received after echo |
| 9634 | Command 'genkey' key file already exists |
| 9635 | Command 'genkey' Hit return prompt not received |
| 9636 | Command 'genkey' command prompt not received |
| 9637 | Command 'genkey' remove key prompt not received |
| 9638 | Command 'genkey' command prompt not received after key removed |
| 9639 | Command 'genkey' remove csr prompt not received |
| 9640 | Command 'genkey' command prompt not received after csr remove |
| 9641 | Command 'genkey' remove crt prompt not received |
| 9642 | Command 'genkey' command prompt not received after crt remove |
| 9643 | Command prompt not received after terminal type input |
| 9644 | Command 'genconf' common name prompt not received |
| 9645 | Command 'genconf' country name prompt not received |
| 9646 | Command 'genconf' state prompt not received |
| 9647 | Command 'genconf' city prompt not received |
| 9648 | Command 'genconf' organization name prompt not received |
| 9649 | Command 'genconf' organizational unit prompt not received |
| 9650 | Command 'genconf' Are these correct? prompt not received |
| 9651 | Command 'genconf' command prompt not received |
| 9652 | Command 'genkey' Hit return prompt not received |
| 9653 | Command 'genkey' command prompt not received |
| 9654 | Command 'genkey' remove key prompt not received |
| 9655 | Command 'genkey' command prompt not received after key removed |
| 9656 | Command 'genkey' remove csr prompt not received |
| 9657 | Command 'genkey' command prompt not received after csr remove |
| 9658 | Command 'genkey' remove crt prompt not received |
| 9659 | Command 'genkey' command prompt not received after crt remove |
| 9660 | Command 'genkey' key file already exists |
| 9661 | Command 'genkey' Are these correct? prompt not received |
| 9662 | Command 'genkey' country name prompt not received |
| 9663 | Command 'genkey' state prompt not received |
| 9664 | Command 'genkey' city prompt not received |
| 9665 | Command 'genkey' organization name prompt not received |

-continued

| ERROR CODE | DESCRIPTION |
|---|---|
| 9666 | Command 'genkey' organizational unit prompt not received |
| 9667 | Command 'genkey' common name prompt not received |
| 9668 | Command 'genkey' second country name prompt not received |
| 9669 | Command 'genkey' second state prompt not received |
| 9670 | Command 'genkey' second city prompt not received |
| 9671 | Command 'genkey' second organization name prompt not received |
| 9672 | Command 'genkey' second organizational unit prompt not received |
| 9673 | Command 'genkey' second common name prompt not received |
| 9674 | Command 'genkey' second hit return prompt not received |
| 9675 | Command 'genkey' encrypt prompt not received |
| 9676 | Command 'genkey' passphrase prompt not received |
| 9700 | Command 'genkey' verify passphrase prompt not received |
| 9701 | Command 'genkey' command prompt not received after verify passphrase |
| 9702 | Command 'cat' command prompt not received |
| 9703 | Command prompt not received after echo |
| 9704 | Verisign Retrieve Domains: Unable to start up and connect a browser instance. |
| 9705 | Verisign Retrieve Domains: Could not complete navigation to Verisign's MPKI main page |
| 9776 | Verisign Retrieve Domains: Error occurred during building of user services url |
| 9777 | Verisign Retrieve Domains: Could not complete navigation to user services page |
| 9778 | Verisign Retrieve Domains: Could not complete navigation to domains page |
| 9779 | Verisign Retrieve Domains: Error occurred during retrieving of domain names from page |
| 9801 | A timeout occurred while posting the csr, this may be due to network traffic or the server may be down |
| 9802 | A timeout occurred while approving the csr, this may be due to network traffic or the server may be down |
| 9803 | A timeout occurred while retrieving the certificate, this may be due to network traffic or the server may be down |
| 9804 | Unable to start the Windows2003Ca Process this could be due to a misconfiguration in the Windows 2003 Certificate Authority setup, please check the settings to make sure they are correct |
| −1 | ERROR UNKNOWN |

What is claimed:

1. A certificate management and renewal system for automatically renewing digital certificates in a managed network, comprising:
- a managing device, said managing device including processing facilities for executing software and further including network facilities for electronic communication over a network, said managing device further including a storage device group containing at least one storage device operable to contain operating system files and applications; and
- instructions stored to said storage device group, said instructions being further executable by said processor to achieve the functions of:
  - (i) receiving notifications from a certificate authority regarding a managed digital certificate,
  - (ii) identifying a managed server corresponding to a digital certificate referred to in a received notification from a certificate authority,
  - (iii) communicating with the managed server, the communicating causing the managed server to generate a certificate signing request and return the request to the managing device,
  - (iv) transmitting a generated and received certificate signing request to a certificate authority,
  - (v) receiving a certificate signed by a certificate authority generated from a certificate signing request,
  - (vi) identifying a destination managed server corresponding to a received certificate signed by a certificate authority,
  - (vii) installing a received certificate signed by a certificate authority to an identified destination managed server, and
  - (viii) configuring an identified destination managed server to use a private key corresponding to an installed certificate.

2. A system according to claim 1, wherein said instructions are further executable by said processor to achieve the functions of:
  - (ix) generating a new asymmetric key pair, and
  - (x) installing a generated private key of a new asymmetric key pair to an identified destination managed server;
  - and wherein a generated certificate signing request includes a generated public key of a new asymmetric key pair.

3. A system according to claim 1, wherein said instructions are further executable by said processor to install a received certificate signed by a certificate authority by a network interface provided by a web interface of a web server installed to an identified destination managed server.

4. A system according to claim 1, wherein said instructions are further executable by said processor to install a received certificate signed by a certificate authority by a shell interface to an identified destination managed server.

5. A system according to claim 1, wherein said instructions are further executable by said processor to install a received certificate signed by a certificate authority by an agent program installed to an identified destination managed server.

6. A system according to claim 1, wherein said instructions are further executable by said processor to restart a destination server program.

7. A system according to claim 1, wherein said instructions are further executable by said processor to restart a destination server computer.

8. A system according to claim 1, wherein said instructions are further executable by said processor to notify an administrator to restart a destination server program or destination server computer.

9. A system according to claim 1, wherein said instructions are further executable by said processor to confirm the installation of a received certificate to a destination server following the performance of a set of installation steps.

10. A system according to claim 9, wherein said instructions are further executable to generate an alert to an administrator if the installation of a received certificate to a destination server is not confirmed.

11. A system according to claim 1, wherein said instructions are further executable by said processor to achieve the functions of:
(ix) informing an administrator of a certificate for which a notification has been received from a certificate authority,
(x) prior to said transmitting, requesting approval to renew a certificate for which a notification has been received from a certificate authority, and
(xi) receiving, in response to a request for approval, an indication from an administrator that a certificate is to be renewed.

12. A system according to claim 1, wherein said instructions are further executable by said processor to achieve the functions of:
(ix) following said receiving a certificate signed by a certificate authority, informing an administrator of that renewed certificate,
(x) prior to said installing, requesting approval to install a renewed certificate received from a certificate authority, and
(xi) receiving, in response to a request for approval, an indication from an administrator that a renewed certificate is to be installed.

13. A system according to claim 1, wherein said instructions are further executable by said processor to store a received certificate signed by a certificate authority to a backup storage device.

14. A certificate management and renewal system for automatically renewing digital certificates in a managed network, comprising:
a managing device, said managing device including processing facilities for executing software and further including network facilities for electronic communication over a network, said managing device further including a storage device group containing at least one storage device operable to contain operating system files and applications;
a plurality of servers configured in a network, each of said servers configured to transmit a digital certificate and further configured to provide a service to client devices, each of said servers further including a certificate managing agent installed thereto, each of said certificate managing agents configured to produce certificate signing requests and further to install certificates signed by a certificate authority to the server on which the agent is installed;
and instructions stored to said storage device group, said instructions being further executable by said processor to achieve the functions of:
(i) receiving notifications from a certificate authority regarding a managed digital certificate,
(ii) identifying a managed server corresponding to a digital certificate referred to in a received notification from a certificate authority,
(iii) communicating with the managed server, the communicating causing the managed server to generate a certificate signing request and return the request to the managing device,
(iv) transmitting a generated and received certificate signing request to a certificate authority,
(v) receiving a certificate signed by a certificate authority generated from a certificate signing request,
(vi) identifying a destination managed server corresponding to a received certificate signed by a certificate authority,
(vii) installing a received certificate signed by a certificate authority to an identified destination managed server, and
(viii) configuring an identified destination managed server to use a private key corresponding to an installed certificate.

15. A system according to claim 14, wherein said instructions are further executable by said processor to achieve the functions of:
(ix) generating a new asymmetric key pair, and
(x) installing a generated private key of a new asymmetric key pair to an identified destination managed server; and wherein a generated certificate signing request includes a generated public key of a new asymmetric key pair.

16. A system according to claim 14, wherein said instructions are further executable by said processor to install a received certificate signed by a certificate authority by a network interface provided by a web interface of a web server installed to an identified destination managed server.

17. A system according to claim 14, wherein said instructions are further executable by said processor to install a received certificate signed by a certificate authority by a shell interface to an identified destination managed server.

18. A system according to claim 14, wherein said instructions are further executable by said processor to install a received certificate signed by a certificate authority by an agent program installed to an identified destination managed server.

19. A system according to claim 14, wherein said instructions are further executable by said processor to restart a destination server program.

20. A system according to claim 14, wherein said instructions are further executable by said processor to restart a destination server computer.

21. A system according to claim 14, wherein said instructions are further executable by said processor to notify an administrator to restart a destination server program or destination server computer.

22. A system according to claim 14, wherein said instructions are further executable by said processor to confirm the installation of a received certificate to a destination server following the performance of a set of installation steps.

23. A system according to claim 22, wherein said instructions are further executable to generate an alert to an administrator if the installation of a received certificate to a destination server is not confirmed.

24. A system according to claim 14, wherein said instructions are further executable by said processor to achieve the functions of:
(ix) informing an administrator of a certificate for which a notification has been received from a certificate authority,
(x) prior to said transmitting, requesting approval to renew a certificate for which a notification has been received from a certificate authority, and (xi) receiving, in response to a request for approval, an indication from an administrator that a certificate is to be renewed.

25. A system according to claim 14, wherein said instructions are further executable by said processor to achieve the functions of:
   (ix) following said receiving a certificate signed by a certificate authority, informing an administrator of that renewed certificate,
   (x) prior to said installing, requesting approval to install a renewed certificate received from a certificate authority, and
   (xi) receiving, in response to a request for approval, an indication from an administrator that a renewed certificate is to be installed.

26. A certificate management and renewal system for automatically renewing digital certificates in a managed network, comprising:
   a managing device, said managing device including processing facilities for executing software and further including network facilities for electronic communication over a network, said managing device further including a storage device group containing at least one storage device operable to contain operating system files and applications;
   a plurality of servers configured in a network, each of said servers configured to transmit a digital certificate and further configured to provide a service to client devices, each of said servers further including a certificate managing agent installed thereto, each of said certificate managing agents configured to produce certificate signing requests and further to install certificates signed by a certificate authority to the server on which the agent is installed;
   authentication objects stored to said storage device, said authentication objects including authentication tokens needed to install a certificate to said plurality of servers;
   and instructions stored to said storage device group, said instructions being further executable by said processor to achieve the functions of:
   (i) receiving notifications from a certificate authority regarding a managed digital certificate,
   (ii) receiving, in response to a request for approval, an indication from an administrator that a certificate is to be renewed or installed,
   (iii) identifying a managed server corresponding to a digital certificate referred to in a received notification from a certificate authority,
   (iv) communicating with the managed server, the communicating causing the managed server to generate a new asymmetric key pair, the communicating further causing the managed server to generate a certificate signing request and return the request to the managing device,
   (v) transmitting a generated and received certificate signing request to a certificate authority,
   (vi) receiving a certificate signed by a certificate authority generated from a certificate signing request,
   (vii) identifying a destination managed server corresponding to a received certificate signed by a certificate authority,
   (viii) installing a received certificate signed by a certificate authority to an identified destination managed server, the installing being performed by accessing the identified destination managed server using a corresponding object of said authentication objects, the installing utilizing a protocol selected from the group of a shell interface, an agent interface and a network interface provided by a web interface of a web server,
   (ix) configuring an identified destination managed server to use a private key corresponding to an installed certificate, and
   (x) performing a restart action selected from the group of commanding an identified destination managed server to perform a restart, commanding an identified destination managed server to restart and notifying an administrator to restart a destination server program or destination server computer.

27. A system according to claim 26, wherein said instructions are further executable by said processor to confirm the installation of a received certificate to a destination server following the performance of a set of installation steps.

28. A system according to claim 27, wherein said instructions are further executable to generate an alert to an administrator if the installation of a received certificate to a destination server is not confirmed.

* * * * *